US008510658B2

(12) United States Patent
Priyadarshan et al.

(10) Patent No.: US 8,510,658 B2
(45) Date of Patent: Aug. 13, 2013

(54) POPULATION SEGMENTATION

(75) Inventors: Eswar Priyadarshan, West Roxbury, MA (US); Kenley Sun, Cambridge, MA (US); Dan Marius Grigorovici, Pleasanton, CA (US); Ravikiran Chittari, Cupertino, CA (US); Jayasurya Vadrevu, Lexington, MA (US); Irfan Mohammed, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 409 days.

(21) Appl. No.: 12/854,303

(22) Filed: Aug. 11, 2010

(65) Prior Publication Data

US 2012/0042253 A1 Feb. 16, 2012

(51) Int. Cl.
*G06F 3/14* (2006.01)

(52) U.S. Cl.
USPC ............. 715/733; 715/753; 705/14.1; 706/11

(58) Field of Classification Search
USPC ......... 715/200–277, 700–867; 700/701–866; 709/201–229; 705/50–79; 345/30–111
See application file for complete search history.

(56) References Cited

U.S. PATENT DOCUMENTS

| 5,408,519 | A | 4/1995 | Pierce et al. |
|---|---|---|---|
| 5,613,213 | A | 3/1997 | Naddell et al. |
| 5,678,179 | A | 10/1997 | Turcotte et al. |
| 5,768,521 | A | 6/1998 | Dedrick |
| 5,974,398 | A | 10/1999 | Hanson et al. |
| 5,978,775 | A | 11/1999 | Chen |
| 5,978,833 | A | 11/1999 | Pashley et al. |
| 6,006,197 | A | 12/1999 | d'Eon et al. |
| 6,009,410 | A | 12/1999 | LeMole et al. |
| 6,015,344 | A | 1/2000 | Kelly et al. |
| 6,023,700 | A | 2/2000 | Owens et al. |
| 6,055,512 | A | 4/2000 | Dean et al. |
| 6,055,513 | A | 4/2000 | Katz et al. |
| 6,057,872 | A | 5/2000 | Candelore |
| 6,078,866 | A | 6/2000 | Buck et al. |
| 6,097,942 | A | 8/2000 | Laiho |

(Continued)

FOREIGN PATENT DOCUMENTS

| BE | 1015704 | 7/2005 |
|---|---|---|
| DE | 19941461 | 3/2001 |

(Continued)

OTHER PUBLICATIONS

"Combined Search and Examination Report", for United Kingdom Patent Application No. GB 0816228.1 dated Jan. 6, 2009.

(Continued)

*Primary Examiner* — Ruay Ho
(74) *Attorney, Agent, or Firm* — Novak Druce Connolly Bove + Quigg LLP

(57) ABSTRACT

Segments used to select content to be targeted to a user are recursively refined based on continuously derived user characteristics. Based on information gathered from new requests for targeted content and/or user interaction with previously delivered content the user is assigned to one or additional targeted segments. The targeted segments can be used to select content to be delivered to the user based on the user's assignment to the targeted segments. Accordingly, each user is grouped into one or more targeted segments and based on the user's inclusion in those segments, requests for targeted content can be served to the user.

37 Claims, 43 Drawing Sheets

(56) References Cited

U.S. PATENT DOCUMENTS

| | | |
|---|---|---|
| 6,202,086 B1 | 3/2001 | Maruyama et al. |
| 6,250,557 B1 | 6/2001 | Forslund et al. |
| 6,253,189 B1 | 6/2001 | Feezell et al. |
| 6,269,361 B1 | 7/2001 | Davis et al. |
| 6,286,005 B1 | 9/2001 | Cannon |
| 6,334,110 B1 | 12/2001 | Walter et al. |
| 6,334,145 B1 | 12/2001 | Adams et al. |
| 6,338,044 B1 | 1/2002 | Cook et al. |
| 6,345,279 B1 | 2/2002 | Li et al. |
| 6,381,465 B1 | 4/2002 | Chern et al. |
| 6,393,407 B1 | 5/2002 | Middleton, III et al. |
| 6,405,243 B1 | 6/2002 | Nielsen |
| 6,408,309 B1 | 6/2002 | Agarwal |
| 6,446,261 B1 | 9/2002 | Rosser |
| 6,502,076 B1 | 12/2002 | Smith |
| 6,564,261 B1 | 5/2003 | Gudjonsson |
| 6,598,228 B2 | 7/2003 | Hejna, Jr. |
| 6,647,269 B2 | 11/2003 | Hendrey et al. |
| 6,684,249 B1 | 1/2004 | Frerichs et al. |
| 6,690,394 B1 | 2/2004 | Harui |
| 6,698,020 B1 | 2/2004 | Zigmond et al. |
| 6,718,551 B1 | 4/2004 | Swix et al. |
| 6,820,204 B1 | 11/2004 | Desai et al. |
| 6,886,000 B1 | 4/2005 | Aggarwal et al. |
| 6,889,054 B2 | 5/2005 | Himmel et al. |
| 6,920,326 B2 | 7/2005 | Agarwal et al. |
| 6,920,464 B2 | 7/2005 | Fox |
| 6,990,462 B1 | 1/2006 | Wilcox et al. |
| 7,016,864 B1 | 3/2006 | Notz et al. |
| 7,039,599 B2 | 5/2006 | Merriman et al. |
| 7,072,947 B1 | 7/2006 | Knox et al. |
| 7,076,445 B1 | 7/2006 | Cartwright |
| 7,136,871 B2 | 11/2006 | Ozer et al. |
| 7,149,537 B1 | 12/2006 | Kupsh et al. |
| 7,155,243 B2 | 12/2006 | Baldwin et al. |
| 7,200,633 B2 | 4/2007 | Sekiguchi et al. |
| 7,203,684 B2 | 4/2007 | Carobus et al. |
| 7,251,495 B2 | 7/2007 | Keyani et al. |
| 7,263,535 B2 | 8/2007 | Malik |
| 7,280,979 B1 | 10/2007 | Katz et al. |
| 7,346,630 B2 | 3/2008 | Eichstaedt et al. |
| 7,349,527 B2 | 3/2008 | Yacoub et al. |
| 7,370,002 B2 | 5/2008 | Heckerman et al. |
| 7,386,485 B1 | 6/2008 | Mussman |
| 7,406,307 B2 | 7/2008 | Manto |
| 7,428,555 B2 | 9/2008 | Yan |
| 7,539,652 B2 | 5/2009 | Flinn et al. |
| 7,558,559 B2 | 7/2009 | Alston |
| 7,660,581 B2 | 2/2010 | Ramer et al. |
| 7,660,859 B2 | 2/2010 | MacBeth et al. |
| 7,668,950 B2 | 2/2010 | Horowitz et al. |
| 7,676,405 B2 | 3/2010 | Steelberg et al. |
| 7,685,019 B2 | 3/2010 | Collins |
| 7,698,163 B2 | 4/2010 | Reed et al. |
| 7,729,988 B1 | 6/2010 | Walker et al. |
| 7,730,017 B2 | 6/2010 | Nance et al. |
| 7,730,149 B2 | 6/2010 | Aaltonen et al. |
| 7,734,632 B2 | 6/2010 | Wang |
| 7,764,947 B2 | 7/2010 | Koskinen et al. |
| 7,774,419 B2 | 8/2010 | Aaltonen et al. |
| 7,805,332 B2 | 9/2010 | Wilson |
| 7,856,413 B2 | 12/2010 | Cradick et al. |
| 7,873,708 B2 | 1/2011 | Durand et al. |
| 7,925,283 B2 | 4/2011 | Smith et al. |
| 7,933,799 B2 | 4/2011 | Aaltonen et al. |
| 7,949,561 B2 | 5/2011 | Briggs |
| 7,949,562 B2 | 5/2011 | Collins |
| 7,974,988 B2 | 7/2011 | Nandiwada et al. |
| 7,979,314 B2 | 7/2011 | Ulenas |
| 7,991,140 B2 | 8/2011 | Pines |
| 8,046,810 B2 | 10/2011 | Srivastava |
| 8,086,476 B2 | 12/2011 | Baur et al. |
| 8,099,325 B2 | 1/2012 | Gangadharpalli et al. |
| 8,099,490 B2 | 1/2012 | Deakin |
| 2001/0044739 A1 | 11/2001 | Bensemana |
| 2001/0047272 A1 | 11/2001 | Frietas et al. |
| 2001/0051925 A1 | 12/2001 | Kang |
| 2002/0004743 A1 | 1/2002 | Kutaragi |
| 2002/0006803 A1 | 1/2002 | Mendiola et al. |
| 2002/0010645 A1 | 1/2002 | Hagen et al. |
| 2002/0016736 A1 | 2/2002 | Cannon et al. |
| 2002/0019829 A1 | 2/2002 | Shapiro |
| 2002/0026356 A1 | 2/2002 | Bergh et al. |
| 2002/0029249 A1 | 3/2002 | Campbell et al. |
| 2002/0032602 A1 | 3/2002 | Lanzillo, Jr. et al. |
| 2002/0035568 A1 | 3/2002 | Benthin et al. |
| 2002/0046341 A1 | 4/2002 | Kazaks |
| 2002/0052781 A1 | 5/2002 | Aufricht et al. |
| 2002/0052788 A1 | 5/2002 | Perkes |
| 2002/0075305 A1 | 6/2002 | Beaton et al. |
| 2002/0077130 A1 | 6/2002 | Owensby |
| 2002/0078147 A1 | 6/2002 | Bouthors et al. |
| 2002/0083411 A1 | 6/2002 | Bouthors et al. |
| 2002/0099842 A1 | 7/2002 | Jennings et al. |
| 2002/0111177 A1 | 8/2002 | Castres |
| 2002/0111848 A1 | 8/2002 | White |
| 2002/0120498 A1 | 8/2002 | Gordon et al. |
| 2002/0128908 A1 | 9/2002 | Levin et al. |
| 2002/0137507 A1 | 9/2002 | Winkler |
| 2002/0138291 A1 | 9/2002 | Vaidyanathan et al. |
| 2002/0138400 A1 | 9/2002 | Kitchen et al. |
| 2002/0161770 A1 | 10/2002 | Shapiro et al. |
| 2002/0164977 A1 | 11/2002 | Link, II et al. |
| 2002/0165773 A1 | 11/2002 | Natsuno et al. |
| 2002/0175935 A1 | 11/2002 | Wang et al. |
| 2002/0177431 A1 | 11/2002 | Hamilton et al. |
| 2003/0003935 A1 | 1/2003 | Vesikivi et al. |
| 2003/0023489 A1 | 1/2003 | McGuire et al. |
| 2003/0028597 A1 | 2/2003 | Salmi et al. |
| 2003/0032409 A1 | 2/2003 | Hutcheson et al. |
| 2003/0037103 A1 | 2/2003 | Salmi et al. |
| 2003/0040297 A1 | 2/2003 | Pecen et al. |
| 2003/0040300 A1 | 2/2003 | Bodic et al. |
| 2003/0083931 A1 | 5/2003 | Lang |
| 2003/0101454 A1 | 5/2003 | Ozer et al. |
| 2003/0126015 A1 | 7/2003 | Chan et al. |
| 2003/0126079 A1 | 7/2003 | Roberson |
| 2003/0126146 A1 | 7/2003 | Van Der Riet |
| 2003/0154300 A1 | 8/2003 | Mostafa |
| 2003/0182567 A1 | 9/2003 | Barton et al. |
| 2003/0188017 A1 | 10/2003 | Nomura |
| 2003/0191689 A1 | 10/2003 | Bosarge et al. |
| 2003/0197719 A1 | 10/2003 | Lincke et al. |
| 2003/0220946 A1 | 11/2003 | Malik |
| 2004/0003398 A1 | 1/2004 | Donian et al. |
| 2004/0019637 A1 | 1/2004 | Goodman |
| 2004/0043777 A1 | 3/2004 | Brouwer et al. |
| 2004/0045029 A1 | 3/2004 | Matsuura |
| 2004/0054576 A1 | 3/2004 | Kanerva et al. |
| 2004/0068435 A1 | 4/2004 | Braunzell |
| 2004/0093289 A1 | 5/2004 | Bodin |
| 2004/0103157 A1 | 5/2004 | Requena et al. |
| 2004/0107256 A1 | 6/2004 | Odenwald |
| 2004/0128353 A1 | 7/2004 | Goodman et al. |
| 2004/0133480 A1 | 7/2004 | Domes |
| 2004/0136358 A1 | 7/2004 | Hind et al. |
| 2004/0158612 A1 | 8/2004 | Concannon |
| 2004/0158858 A1 | 8/2004 | Paxton et al. |
| 2004/0185883 A1 | 9/2004 | Rukman |
| 2004/0192359 A1 | 9/2004 | McRaild et al. |
| 2004/0203761 A1 | 10/2004 | Baba et al. |
| 2004/0203851 A1 | 10/2004 | Vetro et al. |
| 2004/0204133 A1 | 10/2004 | Andrew et al. |
| 2004/0209649 A1 | 10/2004 | Lord |
| 2004/0240649 A1 | 12/2004 | Goel |
| 2004/0254993 A1 | 12/2004 | Mamas |
| 2004/0254994 A1 | 12/2004 | Diorio et al. |
| 2004/0259526 A1 | 12/2004 | Goris et al. |
| 2004/0260767 A1 | 12/2004 | Kedem et al. |
| 2005/0004840 A1 | 1/2005 | Wanninger |
| 2005/0010641 A1 | 1/2005 | Staack |
| 2005/0021397 A1 | 1/2005 | Cui et al. |
| 2005/0033700 A1 | 2/2005 | Vogler |
| 2005/0060425 A1 | 3/2005 | Yeh et al. |

| | | | | | | |
|---|---|---|---|---|---|---|
| 2005/0075929 A1 | 4/2005 | Wolinsky et al. | | 2007/0088801 A1 | 4/2007 | Levkovitz et al. |
| 2005/0086141 A1 | 4/2005 | Lewis | | 2007/0088851 A1 | 4/2007 | Levkovitz et al. |
| 2005/0119936 A1 | 6/2005 | Buchanan | | 2007/0094066 A1 | 4/2007 | Kumar et al. |
| 2005/0125289 A1 | 6/2005 | Beyda et al. | | 2007/0100651 A1 | 5/2007 | Ramer et al. |
| 2005/0125397 A1 | 6/2005 | Gross et al. | | 2007/0100653 A1 | 5/2007 | Ramer et al. |
| 2005/0138140 A1 | 6/2005 | Wen et al. | | 2007/0100805 A1 | 5/2007 | Ramer et al. |
| 2005/0160002 A1 | 7/2005 | Roetter et al. | | 2007/0105536 A1 | 5/2007 | Tingo, Jr. |
| 2005/0160165 A1 | 7/2005 | Chen et al. | | 2007/0113243 A1 | 5/2007 | Brey |
| 2005/0177506 A1 | 8/2005 | Rissanen | | 2007/0117571 A1 | 5/2007 | Musial |
| 2005/0192008 A1 | 9/2005 | Desai et al. | | 2007/0118592 A1 | 5/2007 | Bachenberg |
| 2005/0222949 A1 | 10/2005 | Inotay et al. | | 2007/0136457 A1 | 6/2007 | Dai et al. |
| 2005/0228680 A1 | 10/2005 | Malik | | 2007/0149208 A1 | 6/2007 | Syrbe et al. |
| 2005/0228739 A1 | 10/2005 | Leibowitz | | 2007/0162328 A1 | 7/2007 | Reich |
| 2005/0228797 A1 | 10/2005 | Koningstein et al. | | 2007/0174124 A1 | 7/2007 | Zagofsky |
| 2005/0229209 A1 | 10/2005 | Hildebolt et al. | | 2007/0174295 A1 | 7/2007 | Abraham et al. |
| 2005/0233776 A1 | 10/2005 | Allen | | 2007/0180147 A1 | 8/2007 | Leigh |
| 2005/0239495 A1 | 10/2005 | Bayne | | 2007/0192409 A1 | 8/2007 | Kleinstern et al. |
| 2005/0239504 A1 | 10/2005 | Ishii et al. | | 2007/0198485 A1 | 8/2007 | Ramer et al. |
| 2005/0240475 A1 | 10/2005 | Margiloff et al. | | 2007/0214470 A1 | 9/2007 | Glasgow et al. |
| 2005/0249216 A1 | 11/2005 | Jones | | 2007/0226097 A1 | 9/2007 | Keechle |
| 2005/0267798 A1 | 12/2005 | Panara | | 2007/0244750 A1 | 10/2007 | Grannan et al. |
| 2005/0273465 A1 | 12/2005 | Kimura | | 2007/0260624 A1 | 11/2007 | Chung et al. |
| 2005/0273833 A1 | 12/2005 | Soinio | | 2007/0271134 A1 | 11/2007 | Ferry et al. |
| 2005/0281237 A1 | 12/2005 | Heinonen et al. | | 2007/0288950 A1 | 12/2007 | Downey et al. |
| 2005/0289113 A1 | 12/2005 | Bookstaff | | 2007/0290787 A1 | 12/2007 | Fiatal et al. |
| 2006/0026063 A1 | 2/2006 | Collins | | 2008/0004046 A1 | 1/2008 | Mumick et al. |
| 2006/0026067 A1 | 2/2006 | Nicholas et al. | | 2008/0013537 A1 | 1/2008 | Dewey et al. |
| 2006/0031164 A1 | 2/2006 | Kim | | 2008/0032703 A1 | 2/2008 | Krumm et al. |
| 2006/0031327 A1 | 2/2006 | Kredo | | 2008/0032717 A1 | 2/2008 | Sawada et al. |
| 2006/0040642 A1 | 2/2006 | Boris et al. | | 2008/0052158 A1 | 2/2008 | Ferro et al. |
| 2006/0041470 A1 | 2/2006 | Filho et al. | | 2008/0057917 A1 | 3/2008 | Oria |
| 2006/0048059 A1 | 3/2006 | Etkin | | 2008/0057920 A1 | 3/2008 | Pettit |
| 2006/0053208 A1 | 3/2006 | Laurila | | 2008/0065474 A1 | 3/2008 | Sharma et al. |
| 2006/0053225 A1 | 3/2006 | Poikselka | | 2008/0065491 A1 | 3/2008 | Bakman |
| 2006/0059133 A1 | 3/2006 | Moritani | | 2008/0070579 A1 | 3/2008 | Kankar et al. |
| 2006/0068845 A1 | 3/2006 | Muller et al. | | 2008/0071875 A1 | 3/2008 | Koff et al. |
| 2006/0075425 A1 | 4/2006 | Koch et al. | | 2008/0071929 A1 | 3/2008 | Motte et al. |
| 2006/0095511 A1 | 5/2006 | Munarriz et al. | | 2008/0082686 A1 | 4/2008 | Schmidt et al. |
| 2006/0117378 A1 | 6/2006 | Tam et al. | | 2008/0086369 A1 | 4/2008 | Kiat et al. |
| 2006/0123014 A1 | 6/2006 | Ng | | 2008/0091796 A1 | 4/2008 | Story et al. |
| 2006/0129455 A1 | 6/2006 | Shah | | 2008/0103895 A1 | 5/2008 | Burdick et al. |
| 2006/0141923 A1 | 6/2006 | Goss | | 2008/0109519 A1 | 5/2008 | Aaltonen |
| 2006/0148555 A1 | 7/2006 | Dent et al. | | 2008/0134043 A1* | 6/2008 | Georgis et al. ................ 715/733 |
| 2006/0161520 A1 | 7/2006 | Brewer et al. | | 2008/0140508 A1 | 6/2008 | Anand et al. |
| 2006/0161599 A1 | 7/2006 | Rosen | | 2008/0201731 A1 | 8/2008 | Howcroft |
| 2006/0168616 A1 | 7/2006 | Candelore | | 2008/0215436 A1 | 9/2008 | Roberts |
| 2006/0190331 A1 | 8/2006 | Tollinger et al. | | 2008/0221989 A1 | 9/2008 | Messer et al. |
| 2006/0194595 A1 | 8/2006 | Myllynen et al. | | 2008/0228568 A1 | 9/2008 | Williams et al. |
| 2006/0200460 A1 | 9/2006 | Meyerzon et al. | | 2008/0228893 A1 | 9/2008 | MacDonald et al. |
| 2006/0200461 A1 | 9/2006 | Lucas et al. | | 2008/0235342 A1 | 9/2008 | Aaltonen |
| 2006/0206586 A1 | 9/2006 | Ling et al. | | 2008/0243619 A1 | 10/2008 | Sharman et al. |
| 2006/0212583 A1 | 9/2006 | Beadle | | 2008/0244024 A1 | 10/2008 | Aaltonen |
| 2006/0240850 A1 | 10/2006 | Kaplan | | 2008/0249850 A1 | 10/2008 | Szybalski et al. |
| 2006/0253327 A1 | 11/2006 | Morris et al. | | 2008/0263460 A1 | 10/2008 | Altberg et al. |
| 2006/0271438 A1 | 11/2006 | Shotland et al. | | 2008/0271068 A1 | 10/2008 | Ou et al. |
| 2006/0276170 A1 | 12/2006 | Radhakrishnan et al. | | 2008/0281606 A1 | 11/2008 | Kitts et al. |
| 2006/0276213 A1 | 12/2006 | Gottschalk et al. | | 2008/0288476 A1 | 11/2008 | Kim et al. |
| 2006/0282328 A1 | 12/2006 | Gerace et al. | | 2008/0306820 A1 | 12/2008 | Passmore |
| 2006/0286963 A1 | 12/2006 | Koskinen et al. | | 2008/0319836 A1 | 12/2008 | Aaltonen et al. |
| 2006/0286964 A1 | 12/2006 | Polanski et al. | | 2009/0006194 A1 | 1/2009 | Sridharan et al. |
| 2006/0288124 A1 | 12/2006 | Kraft et al. | | 2009/0029721 A1 | 1/2009 | Doraswamy |
| 2007/0004333 A1 | 1/2007 | Kavanti | | 2009/0037239 A1 | 2/2009 | Wong et al. |
| 2007/0004380 A1 | 1/2007 | Ylikoski | | 2009/0043644 A1 | 2/2009 | Wilkman |
| 2007/0011344 A1 | 1/2007 | Paka et al. | | 2009/0048905 A1 | 2/2009 | Feng et al. |
| 2007/0022021 A1 | 1/2007 | Walker et al. | | 2009/0049090 A1 | 2/2009 | Shenfield et al. |
| 2007/0027703 A1 | 2/2007 | Hu et al. | | 2009/0063249 A1 | 3/2009 | Tomlin et al. |
| 2007/0027760 A1 | 2/2007 | Collins et al. | | 2009/0106100 A1 | 4/2009 | Mashinsky |
| 2007/0033104 A1 | 2/2007 | Collins et al. | | 2009/0106111 A1 | 4/2009 | Walk et al. |
| 2007/0037562 A1 | 2/2007 | Smith-Kerker et al. | | 2009/0125377 A1 | 5/2009 | Somji et al. |
| 2007/0047523 A1 | 3/2007 | Jiang | | 2009/0132395 A1 | 5/2009 | Lam et al. |
| 2007/0050372 A1 | 3/2007 | Boyle | | 2009/0138304 A1 | 5/2009 | Aharoni et al. |
| 2007/0060109 A1 | 3/2007 | Ramer et al. | | 2009/0141875 A1 | 6/2009 | Demmitt |
| 2007/0061195 A1 | 3/2007 | Liu et al. | | 2009/0197619 A1 | 8/2009 | Colligan et al. |
| 2007/0061300 A1 | 3/2007 | Ramer et al. | | 2009/0199107 A1 | 8/2009 | Lewis et al. |
| 2007/0066295 A1 | 3/2007 | Wennberg | | 2009/0216847 A1 | 8/2009 | Krishnaswamy et al. |
| 2007/0072631 A1 | 3/2007 | Mock et al. | | 2009/0222316 A1 | 9/2009 | Boinepalli et al. |
| 2007/0074262 A1 | 3/2007 | Kikkoji et al. | | 2009/0240677 A1 | 9/2009 | Parekh et al. |
| 2007/0083602 A1 | 4/2007 | Heggenhougen et al. | | 2009/0275315 A1 | 11/2009 | Alston |
| 2007/0088687 A1 | 4/2007 | Bromm et al. | | 2009/0276317 A1 | 11/2009 | Dixon et al. |

| | | | |
|---|---|---|---|
| 2009/0282052 A1 | 11/2009 | Evans et al. | |
| 2009/0286520 A1 | 11/2009 | Nielsen et al. | |
| 2009/0287619 A1* | 11/2009 | Liang et al. | 706/11 |
| 2009/0298483 A1 | 12/2009 | Bratu et al. | |
| 2010/0010887 A1 | 1/2010 | Karlin et al. | |
| 2010/0082439 A9 | 1/2010 | Patel et al. | |
| 2010/0082397 A1 | 4/2010 | Blegen | |
| 2010/0082401 A1 | 4/2010 | Vee et al. | |
| 2010/0088152 A1 | 4/2010 | Bennett | |
| 2010/0106606 A1 | 4/2010 | Filice et al. | |
| 2010/0114654 A1 | 5/2010 | Lukose et al. | |
| 2010/0121694 A1 | 5/2010 | Bharadwaj et al. | |
| 2010/0125505 A1 | 5/2010 | Puttaswamy | |
| 2010/0131352 A1 | 5/2010 | Malhotra et al. | |
| 2010/0138271 A1 | 6/2010 | Henkin | |
| 2010/0153216 A1 | 6/2010 | Liang et al. | |
| 2010/0161424 A1 | 6/2010 | Sylvain | |
| 2010/0169157 A1 | 7/2010 | Muhonen et al. | |
| 2010/0169176 A1 | 7/2010 | Turakhia | |
| 2010/0205541 A1* | 8/2010 | Rapaport et al. | 715/753 |
| 2010/0228603 A1 | 9/2010 | Bolder et al. | |
| 2011/0087526 A1* | 4/2011 | Morgenstern et al. | 705/14.1 |
| 2011/0106840 A1 | 5/2011 | Barrett et al. | |
| 2011/0137941 A1 | 6/2011 | Hoffman et al. | |
| 2011/0209067 A1 | 8/2011 | Bogess et al. | |
| 2011/0225048 A1 | 9/2011 | Nair | |
| 2011/0238485 A1 | 9/2011 | Haumont et al. | |
| 2011/0276401 A1 | 11/2011 | Knowles et al. | |

FOREIGN PATENT DOCUMENTS

| | | |
|---|---|---|
| DE | 10061984 | 6/2002 |
| DE | 20008040 | 3/2005 |
| EP | 1003344 | 5/2000 |
| EP | 1043905 | 11/2000 |
| EP | 1061465 | 12/2000 |
| EP | 1073293 | 1/2001 |
| EP | 1107137 | 6/2001 |
| EP | 1109371 | 6/2001 |
| EP | 1161093 | 12/2001 |
| EP | 1182845 | 2/2002 |
| EP | 1193955 | 4/2002 |
| EP | 1195701 | 4/2002 |
| EP | 1220132 | 7/2002 |
| EP | 1239392 | 9/2002 |
| EP | 1239395 | 9/2002 |
| EP | 1253542 | 10/2002 |
| EP | 1280087 | 1/2003 |
| EP | 1298945 | 4/2003 |
| EP | 1303107 | 4/2003 |
| EP | 1320214 | 6/2003 |
| EP | 1324250 | 7/2003 |
| EP | 1365604 | 11/2003 |
| EP | 1408705 | 4/2004 |
| EP | 1455511 | 9/2004 |
| EP | 1509024 | 2/2005 |
| EP | 1528827 | 5/2005 |
| EP | 1542482 | 6/2005 |
| EP | 1594287 | 9/2005 |
| EP | 1587332 | 10/2005 |
| EP | 1613102 | 1/2006 |
| EP | 1615455 | 1/2006 |
| EP | 1633100 | 3/2006 |
| EP | 1677475 | 7/2006 |
| EP | 1772822 | 4/2007 |
| FR | 2867931 | 9/2005 |
| GB | 2343051 | 4/2000 |
| GB | 2352856 | 2/2001 |
| GB | 2356777 | 5/2001 |
| GB | 2369218 | 5/2002 |
| GB | 2372867 | 9/2002 |
| GB | 2383149 | 6/2003 |
| GB | 2406996 | 4/2005 |
| GB | 2407002 | 4/2005 |
| GB | 2414621 | 11/2005 |
| GB | 2416887 | 2/2006 |
| GB | 2424546 | 9/2006 |
| JP | 2002/140272 | 5/2002 |
| JP | 2007/087138 | 4/2007 |
| JP | 2007/199821 | 8/2007 |
| WO | 96/24213 | 8/1996 |
| WO | 97/33421 | 9/1997 |
| WO | 98/21713 | 5/1998 |
| WO | 98/36585 | 8/1998 |
| WO | 98/37685 | 8/1998 |
| WO | 00/052621 | 9/2000 |
| WO | 00/070848 | 11/2000 |
| WO | 02/071626 | 9/2002 |
| WO | 02/096056 | 11/2002 |
| WO | 02/100121 | 12/2002 |
| WO | 03/058524 | 7/2003 |
| WO | 03/073304 | 9/2003 |
| WO | 2004/034671 | 4/2004 |
| WO | 2004/054205 | 6/2004 |
| WO | 2004/057578 | 7/2004 |
| WO | 2004/084532 | 9/2004 |
| WO | 2004/086791 | 10/2004 |
| WO | 2004/093044 | 10/2004 |
| WO | 2004/100470 | 11/2004 |
| WO | 2004/100521 | 11/2004 |
| WO | 2004/102993 | 11/2004 |
| WO | 2004/104867 | 12/2004 |
| WO | 2004/114109 | 12/2004 |
| WO | 2005/015806 | 2/2005 |
| WO | 2005/020578 | 3/2005 |
| WO | 2005/029769 | 3/2005 |
| WO | 2005/062637 | 7/2005 |
| WO | 2005/073863 | 8/2005 |
| WO | 2005/076650 | 8/2005 |
| WO | 2006/005001 | 1/2006 |
| WO | 2006/011164 | 2/2006 |
| WO | 2006/016189 | 2/2006 |
| WO | 2006/024003 | 3/2006 |
| WO | 2006/026505 | 3/2006 |
| WO | 2006/040749 | 4/2006 |
| WO | WO 2006/040749 | 4/2006 |
| WO | 2006/093284 | 9/2006 |
| WO | WO 2006/093284 | 9/2006 |
| WO | 2006/105202 | 10/2006 |
| WO | 2006/110446 | 10/2006 |
| WO | 2006/122042 | 11/2006 |
| WO | 2007/001118 | 1/2007 |
| WO | 2007/031708 | 3/2007 |
| WO | 2007/056698 | 5/2007 |
| WO | 2007/060451 | 5/2007 |
| WO | 2007/091089 | 8/2007 |
| WO | 2008/013437 | 1/2008 |
| WO | 2008/024852 | 2/2008 |
| WO | 2008/053062 | 5/2008 |
| WO | 2008/147919 | 12/2008 |
| WO | 2009/061914 | 5/2009 |
| WO | 2009/061914 A1 | 5/2009 |
| WO | 2009/158097 | 12/2009 |
| WO | 2010/018584 | 2/2010 |

OTHER PUBLICATIONS

"Combined Search and Examination Report dated Mar. 7, 2008", for United Kingdom Patent Application No. GB 0721863.9, Mar. 7, 2008.

"Combined Search and Examination Report under Sections 17 and 18(3)", U.K. Patent Office in related U.K Application No. GB 0818647.0, Jan. 7, 2009.

"Communication (Combined Search and Examination Report under Sections 17 and 18(3)) dated Jan. 30, 2009 issued from the United Kingdom Patent Office", in related United Kingdom Application No. GB 0818145.5 (8 pages).

"Communication (Communication Pursuant to Article 94(3) EPC)", European Patent Office in connection with related European Patent Application No. 07 822 138.9, Mar. 8, 2010,.

"Communication (European Search Report) dated Jun. 26, 2008", in European Patent Application No. EP 08101394.

"Communication (European Search Report) dated Oct. 17, 2008 issued by the European Patent Office", in counterpart European Patent Application EP 08156763.

"Communication (International Search Report along with Written Opinion of International Searching Authority)", International Searching Authority in counterpart International Application PCT/EP2008/056342, Oct. 8, 2008.

"Communication (Notification Concerning Transmittal of International Preliminary Report on Patentability, International Preliminary Report on Patentability, and Written Opinion of the International Searching Authority)", issued in connection with related International Application PCT/EP 2008/051489 and mailed on Sep. 24, 2009 (6 pages).
"Communication (Search Report under Section 17 along with Examination Report under Section 18(3)", United Kingdom Intellectual Property Office in counterpart U.K. Application GB 0809321.3, Oct. 6, 2008.
"Communication Pursuant to Article 94(3) EPC (European Examination Report) dated Oct. 23, 2008", issued in counterpart European Patent Application No. EP 08101394.8-1238.
"Communication Pursuant to Article 94(3) EPC dated Aug. 13, 2009 issued by the European Patent Office", in related European Patent Application No. 07802544.2 (4 pages).
"Communication Pursuant to Article 94(3) EPC dated Nov. 21, 2008", issued in connection with counterpart European Application No.08802544.2.
"Communication Pursuant to Article 94(3) EPC dated Oct. 30, 2009", European Patent Application No. 08 166 443.5 (1 page).
"Communication pursuant to Article 94(3) EPC issued Jan. 14, 2011", European Patent Office in related European Application No. 08 761.022.6 (6 pages).
"Copy of Communication pursuant to Article 94(3) EPC", European Patent Application 07 822 138.9 (4 pages), Mar. 10, 2011.
"ETSI TS 100 900 V7.2.0 (Jul. 1999):", Digital Cellular Telecommunication.System (Phase 2+); Alphabets and language-specific information (GSM.03.38 Version 7.2.0 Release 1998), European Telecommunications Standards Institute 1999.
"European Search Report date May 23, 2008", European Patent Application No. 08101226.
"Examination Report", for counterpart European Patent Application No. 08153257.4 issued Jun. 2, 2009.
"Examination Report dated Nov. 9, 2009", for European Patent Application No. EP 08159355.0, Sep. 11, 2009.
"Examination Report dated Jun. 17, 2009", issued in counterpart U.K Application No. GB 0803273.2 by U.K. Intellectual Property Office (4 pages).
"Examination Report under section 18(3)", dated Jan. 23, 2009. issued in related UK Application No. GB 0802989.4 (5 pages).
"Extended European search Report dated Mar. 17, 2008", European Application No. 08101544.8.
"International Preliminary Report on Patentability", Issued Nov. 24, 2009 in International Application No. PCT/IB2008/002897 (1 page).
"International Preliminary Report on Patentability and Written Opinion", mailed Dec. 30, 2009 in related International Application PCT/EP2008/057438 (1 page).
"International Preliminary Report on Patentability", International Application PCT/EP2008/056342 (1 page), Nov. 24, 2009.
"International Preliminary Report on Patentability and Written Opinion, mailed Jan. 7, 2010", International Application PCT/EP2008/057880 (1 page), Jan. 7, 2010.
"International Search Report", for International Application No. PCT/FI2006/050455, dated Jul. 25, 2007.
"International Search Report (Form PCT/ISA/206)", issued in connection with corresponding International Application PCT/EP 2007/058243.
"International Search Report (Form PCT/ISA/210) and Written Opinion, mailed Jan. 22, 2009", International Application No. PCT/EP2008/057438.
"International Search Report (Form PCT/ISA/210) mailed Feb. 7, 2008", issued in connection with corresponding International Application PCT /EP 2007/058243.
"International Search Report and Written Opinion mailed on Aug. 26, 2011", for PCT/US 2011/034927 titled "Content Delivery Based on User Terminal Events," to Apple Inc.
"International Search Report and Written Opinion of the International.Search Authority mailed Jun. 19, 2009", for International Application No. PCT/EP 2008/056069, Jun. 19, 2009.
"International Search Report and Written Opinion of the International.Searching Authority mailed Feb. 11, 2009, issued by the International Searching Authority", in related International Application PCT/EP 2008/063839 (11 pages).
"Invitation to Pay Additional Fees and Communication Relating to the Results of the Partial International Search dated Apr. 28, 2008", in corresponding International Application PCT/GB 2007/050723.
"Notice of Allowance", U.S. Appl. No.11/888,850 (11 pages), Apr. 2, 2010.
"Notice of Allowance dated Apr. 29, 2011", U.S. Appl. No. 11/888,680, 13 pages.
"Notification of Transmittal of the International Search Report", Written Opinion of the International Searching Authority mailed Feb. 27, 2009 issued by the International Searching Authority in related International Application PCT/EP2008/063712 (3 pages).
"Notification of Transmittal of the International Search Report and the Written Opinion of the International Searching Authority mailed Mar. 24, 2009", in related PCT International Application No. PCT/EP 2008/063326 (1 page).
"Notification of Transmittal of the International Search Report of the International Searching Authority", Declaration mailed Jan. 14, 2010 in related International Application PCT/EP2009/062713 (3 pages).
e Written Opinion of the International Searching Authority, Declaration mailed Jan. 14, 2010 in related International Application PCT/EP2009/062713.
"Office Action dated Apr. 15, 2010", U.S. Patent Office in connection with related U.S. Appl. No. 12/077,045 (14 pages).
"Office Action dated Feb. 18, 2011 issued by USPTO", Related U.S. Appl. No. 12/288,690 (38 pages).
"Office Action dated Feb. 2, 2009", issued in related U.S. Appl. No. 12/075,853, Feb. 2, 2009.
"Office Action dated Feb. 5, 2009", U.S. Appl. No. 12/077,089.
"Office Action dated Mar. 3, 2009", issued in related U.S. Appl. No. 12/075,862 (24 pages).
"Office Action dated Mar. 31, 2010 issued by the USPTO", U.S. Appl. No. 12/077,089(7 pages).
"Office Action dated Mar. 31, 2011", Issued in Related U.S. Appl. No. 12/290,140.
"Office Action dated Mar. 31, 2011 issue by the U.S. Patent Office", in related U.S. Appl. No. 12/080,124 (29 pages).
"Office Action dated Sep. 3, 2009", issued in related U.S. Appl. No. 12/075,862 (19 pages).
"Office Action from the USPTO dated Jun. 4, 2009", in related U.S. Appl. No. 11/888,446 (43 pages).
"Office Action issued by USPTO dated Dec. 23", issued in related U.S. Appl. No. 12/075,853 (9 pages).
"Office Action issued from the USPTO dated Aug. 18, 2009", U.S. Appl. No. 11/888,850 (9 pages).
"Office Action issued from the USPTO dated Aug. 20, 2009", issued in related U.S. Appl. No. 12/075,593 (14 pages).
"Office Action issued from the USPTO dated Aug. 4, 2009", U.S. Appl. No. 12/077,045 (14 pages).
"Office Action issued from the USPTO dated Aug. 6, 2009", U.S. Appl. No. 12/077,089.
"Office Action issued Mar. 17, 2010", in related U.S. Appl. No. 12/075,593 (11 pages).
"Office Action Issued Oct. 15, 2010 by the U.S. Patent Office", in related U.S. Appl. No. 12/080,124 (28 pages).
"Office Action issued Oct. 19, 2010", USPTO in related U.S. Appl. No. 12/290,140 (11 pages).
"Office Action issued from the USPTO dated Sep. 29, 2009", issued in related U.S. Appl. No. 12/075,853 (10 pages).
"Partial European Search Report", dated Apr. 25, 2008 for European Application No. EP 08151800.3.
"PCT International search report and Written Opinion issued in a related International Application No. PCT/EP2008/057880", Apr. 22, 2009.
"PCT International Search Report and Written Opinion issued in related PCT Application No. PCT/EP2007/061792", International Searching Authority mailed Mar. 7, 2008.
"PCT Written Opinion from PCT International Searching Authority", mailed May 8, 2009 in a related PCT Application No. PCT/EP2009/050144 (5 pages).

"PCT PCT International Search Report and Written Opinion issued in related PCT Application No. PCT/EP2007/061792", International Bureau of WIPO (7 pages), May 5, 2009.

"Search Report under Section 17 dated Jul. 7, 2008", in related U.K. Application GB 0803273.2.

"U.K Further Search Report under Section 17", U.K. Application No. GB0621874.7, Jul. 25, 2007.

"U.K. Search Report Under Section 17", U.K Application No. GB0716954.3, Jan. 2, 2008.

"U.K. Search Report under Section 17 dated Apr. 17, 2007", issued in connection with corresponding U.K. Application No. GB 0705651.8.

"U.K. Search Report under Section 17 dated Jun. 4, 2008", U.K. Application No. GB0803468.8.

"U.K. Search Report under Section 17 dated Nov. 20, 2006", issued in connection with corresponding U.K. Application No. GB 0615833.1.

"U.K. Search Report under Section 17 dated Oct. 23, 2007", in U.K. Application No. 0712280.7.

"U.K. Search Report under Section 17", U.K. Application No. GB0621874.7, Feb. 23, 2007.

"U.K. Search Report under Section 17", U.K. Patent Application No. GB0802986.0, Jun. 26, 2008.

"UKIPO Search Report dated May 30, 2008", UK Application No. GB0802175.0.

"United Kingdom Search Report dated Sep. 18, 2007", United Kingdom Patent Application No. GB0709331.3.

"WAG UAProf Version Oct. 20, 2001; Wireless Application Protocol WAP-248-UAPROF-20011020-a", Wireless Application Protocol Forum, Ltd. 2001; http://www.wapforum.org/what/copyright.htm.

"Written Opinion of the International Searching Authority", issued Nov. 24, 2009 in International Application PCT/IB2008/002897 (5 pages).

"International Search Report Written Opinion of the International Searching Authority issued Nov. 24, 2009", in International Application PCT/EP 2008/056342 (6 pages).

"XP002456252—Statement in Accordance with the Notice from the European Patent Office dated Oct. 1, 2007", concerning business methods (OJ Nov. 2007; p. 592-593), Nov. 1, 2007, 592-593.

Krallman, Schwiegelshohn Y., "On the Design and Evaluation of Job Scheduling Algorithms", Lecture Notes in Computer Science, vol. 1659, Jan. 1, 1999, pp. 17-42 (26 pages).

Mueller, Milton, "Telecommunication Access in Age of Electronic Commerce: Toward a Third-Generation Service Policy", Nov. 1996, HeinOnline, 49. Fed. Comm L.J., Nov. 1, 1996, 655-665.

Perkins, Ed, "When to buy airfare", http://www.smartertrael.com/travel-advice/when-to-buy-airfare.html?id=1628038, Nov. 21, 2006 (4 pages).

"Advertisement System, Method and Computer Program Product", IP.com Prior Art Database Disclosure, Pub No. IPCOM000138557D, dated Jul. 24, 2006, IP.com, Amherst, NY (Available online at http://priorartdatabase.com/IPCOM/000138557, last visited Aug. 30, 2010).

"Specific Media Behavioral Targeting Index", Specific Media, Inc., Irvine, CA, 2010, Available online at http://www.specificmedia.com/behavioral-targeting.php.

Langheinrich, Marc et al., "Unintrusive Customization Techniques for Web Advertising", Computer Networks: The International Journal of Computer and Telecommunications Networking, vol. 31, No. 11, May 1999, pp. 1259-1272, Elsevier North-Holland, Inc., New York, NY, 1999., May 11, 1999, 1259-1272.

Shaikh, Baber M. et al., "Customized User Segments for Ad Targeting", IP.com Prior Art Database Disclosure, Pub No. IPCOM000185640D, dated Jul. 29, 2009 UTC, IP.com, Amherst, NY (Available online at http://priorartdatabase.com/IPCOM/000185640, last visited Aug. 30, 2010).

\* cited by examiner

← 700

| UUID | Gender | Age Range | Music Category Purchase History | Movie Category Purchase History | App Category Purchase History | TV Category Purchase History |
|---|---|---|---|---|---|---|
| 1 | M | 19-24 | Jazz | Action & Adventure | Games | Action & Adventure |
| 2 | F | 19-24 |  | Comedy | Social Networking | Drama |
| 3 | M | 19-24 |  | Action & Adventure | Games |  |
| 4 | M | 19-24 | Rock | Action & Adventure |  | Action & Adventure |

| UUID | Gender | Age Range | Music Category Purchase History | Movie Category Purchase History | App Category Purchase History | TV Category Purchase History |
|---|---|---|---|---|---|---|
| 1 | M | 19-24 | Jazz | Action & Adventure | Games | Action & Adventure |
| 2 | F | 19-24 |  | Comedy | Social Networking | Drama |
| 3 | M | 19-24 |  | Action & Adventure | Games | Action & Adventure |
| 4 | M | 19-24 | Rock | Action & Adventure |  | Action & Adventure |

FIG. 7B

POPULATION SEGMENTATION

BACKGROUND

1. Technical Field

The present disclosure relates to electronic content delivery and more specifically to intelligent targeting of invitational content to a user based on user characteristics.

2. Introduction

Targeted content delivery has long been an accepted means of conveying a desired message to an audience. Instead of creating a single message and delivering it to every member of the general public, content providers attempt to identify a particular segment of the population that is likely to have the greatest interest in their message. For example, a content provider might wish to convey a message regarding a service offered in a particular city. To convey this message, the content provider could send out a flyer to all residents of the city. However, if the service is only of interest to residents that own their own home, then targeting all residents of the city is suboptimal for the content provider. Instead, the content provider will attempt to segment the population of city residents into home owners and non-home owners and then only distribute their message to the segment of the population that are home owners. Population segmentation enables content providers to optimize their resources.

The development of digital content delivery has enabled new techniques of identifying population segments. For example, segments characterized by mobile device users or users that visit social networking sites. However, these segmentation techniques are often overly simplistic or too broad because they are based on a limited number of user characteristics.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present technology provides mechanisms for compiling user characteristics, using those characteristics to associate users with one or more segments of the population, ordering or providing a priority to those segments based on user interest, content provider goals, and/or content delivery system goals, and ultimately delivering targeted invitational content to the user.

When a user, or a user's device, makes a request for targeted content from the content delivery system, the user is sharing some amount of information about him in the request. For example, at a minimum, the user must share some information about the device identification number so that the content delivery system knows which device to send the content back to. Frequently, requests for content can include a much richer collection of data including information about software running on the device, a particular application requesting the content, the connection type of the device, etc. Often a device is associated with an account and in such instances account information is also known and stored as user characteristics. In short, the user shares a good deal of information about him, even if the data isn't about personal attributes, when he makes a request for data. All of this data can be stored in association with the user as a user characteristic.

Further user characteristics can be learned by the content delivery system by mechanisms other than through the actual request for content. In some embodiments, information about a user's interaction with content, searches conducted by a user, and other usage data can be learned. Additionally, data can be looked up in public databases and associated with a user. For example, if a user's home address is known, Census data can be used to learn potential demographic information about the user based on the predominate characteristics of the population of people that live in the user's home town. Again, all of this information can be stored as user characteristics.

Knowing characteristics of a user can be valuable in selecting which content is most suitable for delivery to a user. Accordingly, the present technology provides for compiling a collection of user characteristics. Using characteristics that are already known about the user, the present technology can look up additional characteristics or can infer additional characteristics.

Of course some user characteristics are considered personal in nature or private and such information should be handled with care. As is discussed in more detail below, such user characteristics are handled only in accordance with applicable laws and governing privacy policies. In many instances, the user is further able to opt-in or opt-out of data collection and/or usage. Further steps can also be taken including deleting user characteristics after they have been used to infer other less personal characteristics or used to select content to be delivered to the user.

As addressed above, in some embodiments, user characteristics are inferred from a limited set of known user characteristics. This can be done in a variety of fashions. In some embodiments, a first user can be compared against all other users to find a similar user and user characteristics for the first user can be inferred to be the same as those associated with the similar user.

In some embodiments, user characteristics can be inferred using a series of assignment algorithms. In one example, a user's gender can be inferred from the preferred salutation they use. A user having a salutation of "Mr." is likely male, and a user having a salutation of "Mrs." is likely female. Thus gender can be inferred for some users. A variety of other user characteristics can be inferred from the limited set of information already known about the user.

Since many user characteristics are being inferred, it is also useful to provide confidence scores to indicate the likelihood that a given user characteristic is correct. For example, in the embodiments where a gender is inferred from a salutation the system might assign a confidence score of 95% because a user's salutation usually is a good indication of their gender. However, in the embodiments wherein a user's characteristics are based on other similar users, the confidence score might only be 50%.

In instances wherein the confidence score is not sufficient, the system can continue to pursue that user characteristic to gain additional confidence in it. If the system derives the same characteristic values repeatedly, the confidence might be increased. Another way to have greater confidence in an inferred or derived user characteristic is by having a larger sample size. For example, if there are many similar users and they all have the same value for a given characteristic then inferring that the first user has the same characteristic might be likely.

Another way of deriving user characteristics is through a user's products. Products should be broadly thought of as any product or content that a user owns, has previously purchased, is considering purchasing, has viewed in an online store or advertisement, etc. From a collection of products the system can infer many user characteristics. For example, if the user owns an item of digital content targeted at teenagers, the system can infer that the user is a teenager. Of course, inferences made based on one product might have a low confidence score because of the small sample size. One way to increase the sample size is to look more broadly at all the content or, more generally, products that the user owns and infer that the user is a member of the predominate age group for which those products were targeted or intended or purchased. Another way to increase the sample size is to use a similarity algorithm, such as a product similarity software routine to find similar products to one or more products associated with the user. The similarity algorithm can identify other products that co-occur with the first product in other users' purchase histories or content libraries. Accordingly, the collection of similar products will provide a better data set from which to infer a user characteristic, such as age.

As will be discussed below, there are many other ways to infer user characteristics. The goal being to derive a complete set of quality user characteristic data. The library of user characteristics is used to identify and place the user into one or more targeted segments, which are associated with content to be delivered to the users in the targeted segments. Accordingly, each user is grouped into one or more targeted segments and, based on the user's inclusion in those segments, requests for targeted content can be served to the user. The list of targeted segments to which a user belongs is also stored by the content delivery system.

The collection of targeted segments to which a user belongs is repeatedly updated. The content delivery system is always learning and user characteristics are always being refined and, in some instances, even changing. Based on the new and additional information the system can recompile or update the list of segments to which a user belongs.

In some embodiments, the content delivery system can send an item of targeted invitational content to a user based on the user's inclusion in a segment. Based on the user's interaction with the targeted content, and/or one or more other user characteristics, the system can assign the user to a new segment and then target invitational content to the user based on the user's inclusion in the new segment.

While greater detail on individual segments is provided below, a user can be assigned to one or more segments based on demographics, behaviors, inferred interests, progress along a conversion continuum, location, etc. For example, some segments are purely demographic wherein a user is assigned to a segment because the user is of a specified gender and age range—for example, male age 25-39. Segments can be based on inferred interests such as based on the inference that a user is interested in purchasing an automobile based on user characteristics indicating a recent string of searches for automobiles or an increase in time spent viewing automotive related content. Segments can be based on how likely a user is to convert a given item of invitational content based on how much time a user has spent viewing related content or whether the user has clicked on the invitational content in the past. Segments can be based on location such as when user characteristic data indicates a user lives in California, but her current location is New York, the user can be placed into a segment for travelers. Segments can also be assigned based on any blending of user characteristics such as car buyers with the money to purchase a car.

Not only can segments be created and assigned by the content delivery system, but in some embodiments content providers can create their own segments. Since the content providers are often creating the content with a specific target audience in mind, the content delivery system provides a user interface to allow the content providers or other users of the system to create custom targeted segments. The system can provide a user interface with all user characteristics collected by the system or all targeted segments available. Using the interface, the content provider can select different user characteristics or segments and mix and match the categories to result in a new segment. The interface also presents all available values associated with a user characteristic category for more refined selection by the content provider. The content provider can select one or more values or ranges of values in creating the custom segment.

The interface also allows assignment of weights to be associated with the selected categories to refine the created custom segment. In some embodiments, the system allows a content provider to specify at least one weighting function for causing the content delivery system to provide a differential selection of content associated with a portion of the collection of characteristic values during fulfillment of the booked electronic campaign.

In some embodiments, the custom segment is created by selecting a plurality of target users and using characteristics that the target users have in common to define the custom segment.

In some embodiments, the system can also save the custom segments for later use by the provider or other providers.

In some embodiments, the segments the user is assigned to can be a reflection of a user's context or mode. A user's context includes a user's behavioral patterns, state-of-mind, or interest in one or more topics, content, or products in general. A user's mode includes a user's context in a broader sense of any factor relevant to how a user might view or respond to being presented with targeted content.

While a user can be assigned to many different segments, the user is likely to be most interested in content that she is presently interested in. While the user might be in a segment for her demographic of female, married, with a child, and accordingly one of her interests is frequently parenting content, today she is planning a vacation so the content that is most suited to the user is vacationing related content. In such an example, the user may have been assigned to segments related to parenting and travel, but the more recent user characteristics suggest that traveling is on her mind. In such an example, both the parenting segment and the travel segment should not be considered equal by the system. Thus the system can prioritize or rank or order segments based on the user's present interests, contexts, or modes. In such an example, the system selects travel related targeted content to send to the user before, or more often than, parenting content.

Just as the system can order the segments according to the user's context, the system can also order or prioritize or rank segments based on the content provider's or content delivery system's goal or priorities. A content provider might desire for its content to be delivered to users in specific segments, or might desire for its content to be viewed by a certain number of users. In some embodiments, the content delivery system can have obligated itself to meet the goals of the content provider. Of course, it can be appreciated that given the limited number of users, and the potentially competing goals or interests of the content delivery system to meet each of its obligations to each of the content providers with the interests of the individual content providers, the prioritization of some targeted segments over others can require optimization to meet the needs of all parties to the system.

Accordingly, the content delivery system can monitor its performance in meeting any known goals, and should the content delivery system recognize that its progress towards meeting a goal is not satisfactory, the content delivery system can prioritize some segments over others to meet one or more goals.

It should be recognized that reprioritizing a selection of segments can impact other system and content provider goals. Accordingly, the system can also be provided with a performance predictor. The performance predictor is a "what if" scenario engine that can run a series of prediction models to predict the optimum prioritization of segments to result in the best performance of the system. Such a performance predictor can predict performance based on past, observed results from serving similar content in the past. For example, in previous campaigns it can be known that if the system targets a user expected to be looking for a rental car with content related to a first rental car company, that more often than not, the user will not click or convert targeted content related to a second rental car company. Based on such past performance, the system can predict that rearranging the priorities of the system might negatively impact one or more campaigns and look for a different arrangement of priorities to optimize the performance of the system towards meeting all system and provider goals.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7A illustrates an exemplary collection of user characteristic values collected from a population of users;

FIG. 7B illustrates an exemplary collection of user characteristic values collected from a population of users with a derived value;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. The present disclosure addresses the need in the art for improved methods of selecting targeted content presented to a user based on characteristics descriptive of the user and/or the user's interaction with one or more items of targeted content.

Figure 1:
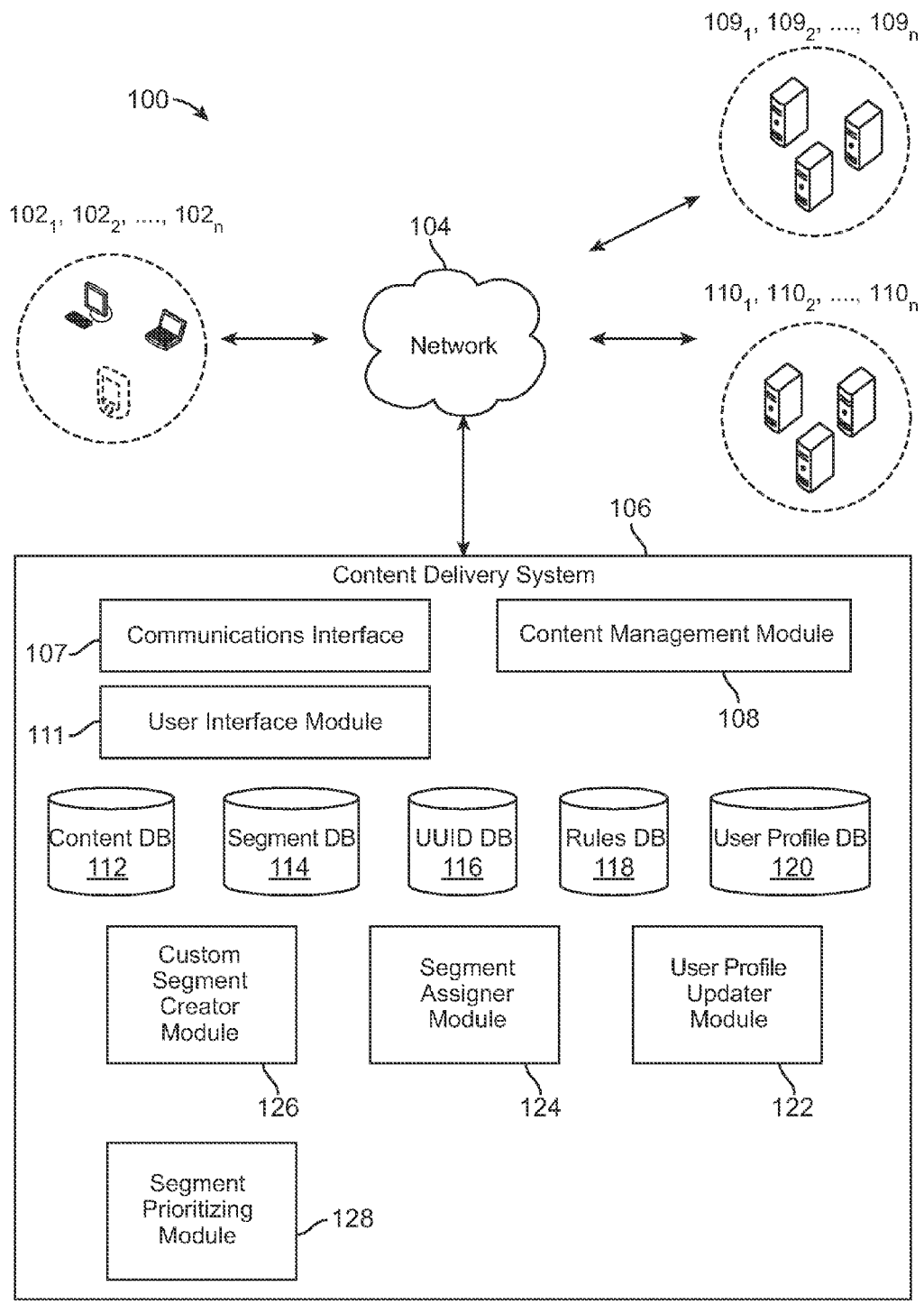
FIG. 1 illustrates an exemplary configuration of devices and a network.

The presently disclosed system and method is particularly useful for matching targeted content with a user in a manner that leads to a higher probability of conversion. An exemplary system configuration 100 is illustrated in FIG. 1 wherein electronic devices communicate via a network for purposes of exchanging content and other data. The system can be configured for use on a local area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, content packages are delivered to user terminals $102_1 \ldots 102_n$ (collectively "102") connected to a network 104 by direct and/or indirect communications with a content delivery system 106. In particular, the content delivery system 106 receives a request for an electronic content, such as a web page, an application, or media, etc., from one of user terminals 102. Thereafter, the content delivery system 106 assembles the content package in response to the request and transmits the assembled content package to the requesting one of user terminals 102. In some embodiments, the server has preselected the content package before the request is received. The assembled content package can include text, graphics, audio, video, executable code or any combination thereof. Further, the assembled content packages can include invitational content designed to inform or elicit a pre-defined response from the user and content that can vary over time. For example, the assembled content package can include one or more types of advertisements from one or more advertisers. The content delivery system can include a communications interface 107 to facilitate communications with the user terminals 102 and any other components familiar to those of ordinary skill in the art.

The content delivery system 106 includes a content management module 108 that facilitates generation of the assembled content package, which can include invitational content. Specifically, the content management module can combine content from one or more primary content providers $109_1 \ldots 109_n$ (collectively "109") and content from one or more secondary content providers $110_1 \ldots 110_n$ (collectively "110") to generate the assembled content package for the user terminals 102. For example, in the case of a web page being delivered to a requesting one of user terminals 102, the content management module 108 can assemble a content package by requesting the data for the web page from one of the primary content providers 109 maintaining the web page. For the invitational content on the web page provided by the secondary content providers 110, the content management module 108 can request the appropriate data according to the arrangement between the primary and secondary content providers 109 and 110.

Although, primary and secondary providers 109 and 110 are presented herein as separate entities, this is for illustrative purposes only. In some cases, the primary and secondary providers 109 and 110 can be the same entity. Thus, a single entity can define and provide both the primary and the secondary content.

Although the content management module 108 can be configured to request that content be sent directly from content providers 109 and 110, a cached arrangement can also be used to improve performance of the content delivery system 106 and improve overall user experience. That is, the content delivery system 106 can include a content database 112 for locally storing/caching content maintained by content providers 109 and 110. The data in the content database 112 can be refreshed or updated on a regular basis to ensure that the content in the database 112 is up to date at the time of a request from a user terminal. However, in some cases, the content management module 108 can be configured to retrieve content directly from content providers 109 and 110 if the metadata associated with the data in content database 112 appears to be outdated or corrupted.

In the various embodiments, the content delivery system 106 can also include a unique user identifier (UUID) database 116 that can be used for managing sessions with the various user terminal devices 102. The UUID database 116 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, e.g. mobile phones, smart phones, tablets, or other types of user terminals connecting using multiple or non-persistent network sessions, multiple requests for content from such devices may be assigned to a same entry in the UUID database 116. The delivery system 106 can analyze the attributes of requesting devices to determine whether such requests can be attributed to the same device. Such attributes can include device or group-specific attributes.

As described above, content maintained by the content providers 109 and 110 can be combined according to a pre-defined arrangement between the two content providers, which can be embodied as a set of rules. In an arrangement where the content delivery system assembles the content package from multiple content providers, these rules can be stored in a rules database 118 in content delivery system 106. The content management module 108 can be configured to assemble the content package for user terminals 102 based on these rules. The rules specify how to select content from secondary content providers 110 and primary content providers 109 in response to a request from one of user terminals 102. For example, in the case of a web page maintained by one of primary content providers 109 and including variable advertisement portions, the rules database 118 can specify rules for selecting one of the secondary providers 110. The rules can also specify how to select specific content from the selected one of secondary providers 110 to be combined with the content provided by one of primary providers 109. Once assembled, the assembled content package can be sent to a requesting one of user terminals 102. However, the content package is not limited to the content from content providers 109 and 110. Rather, the content package can include other data generated at the content delivery systems 106.

One concern with the arrangement typically entered into by secondary content providers 110 is that they can result in invitational content of little or no interest being presented to users. As a result, even though a desired number of impressions can be achieved, the rate of response to such invitational content may be low and/or the resulting targeted audience may be incorrect or suboptimal. Additionally, in most content delivery environments, such as that of system 100, the number and type of providers 109 and 110 are generally not static. For example, the number of primary content providers 109 and the amount and type of space they provide for secondary content providers 110 can vary over time. Further, the number of secondary content providers 110 can vary over time, as well as the amount and types of space they require from primary content providers 109. Further, the types of users and user terminals of interest to the secondary content providers 110 can also vary over time. As a result, selecting optimal invitational content to present to a user can quickly become complicated in such a dynamic environment.

The various embodiments disclosed herein provide systems and methods for intelligently targeting invitational content to a user based on user characteristics. A first aspect of the present technology provides systems and methods for deriving uncertain user characteristics based on known data. A second aspect of the present technology provides systems and methods for generating a custom targeted segment. A third aspect of the present technology provides systems and methods for assigning a user to one or more demographic segments. A fourth aspect of the present technology provides systems and methods for assigning a user to one or more behavioral segments. A fifth aspect of the present technology provides systems and methods for prioritizing targeted segments associated with a user.

As used herein, the term "user characteristics" refers to the characteristics of a particular user associated with one or more of user terminals 102. User characteristics can include channel characteristics, demographic characteristics, behavioral characteristics, and spatial-temporal characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a date, a time, or any other characteristic that defines a geographic location and/or a time for delivery of the content package. Demographic characteristics can define characteristics of the users targeted by the content or associated with the content. For example, demographic characteristics can include age, income, ethnicity, gender, occupation, or any other user characteristics. Behavioral characteristics can define user behaviors for one or more different types of content, separately or in combination with any other user characteristics. That is, different behavioral characteristics may be associated with different channel, demographic, or spatial-temporal characteristics. User characteristics can also include characteristics descriptive of a user's state of mind including characteristics indicative of how likely a user is to click on or convert an item of invitational content if it were displayed to the user.

Figure 2:
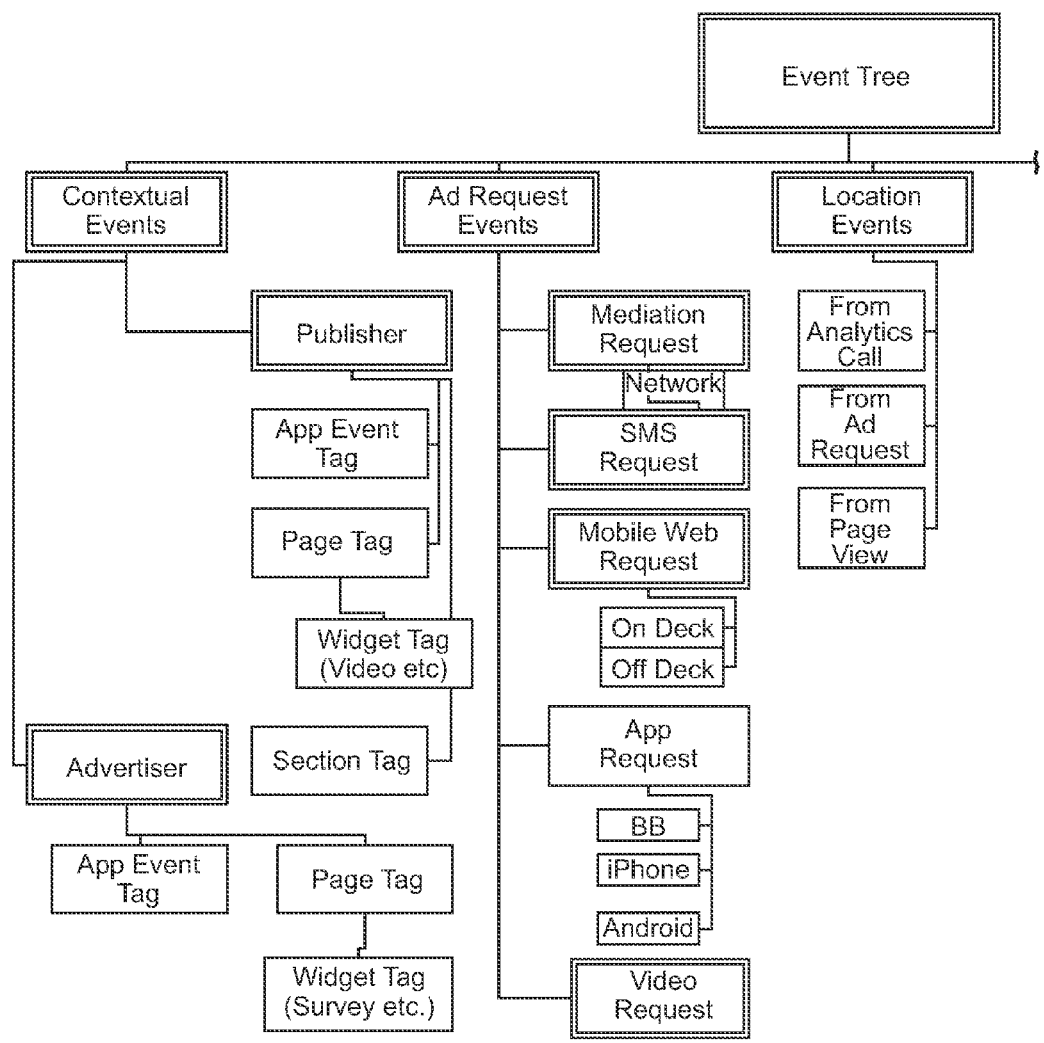
FIG. 2 illustrates a sampling of events that can be known to the content delivery network.
Figure 2:
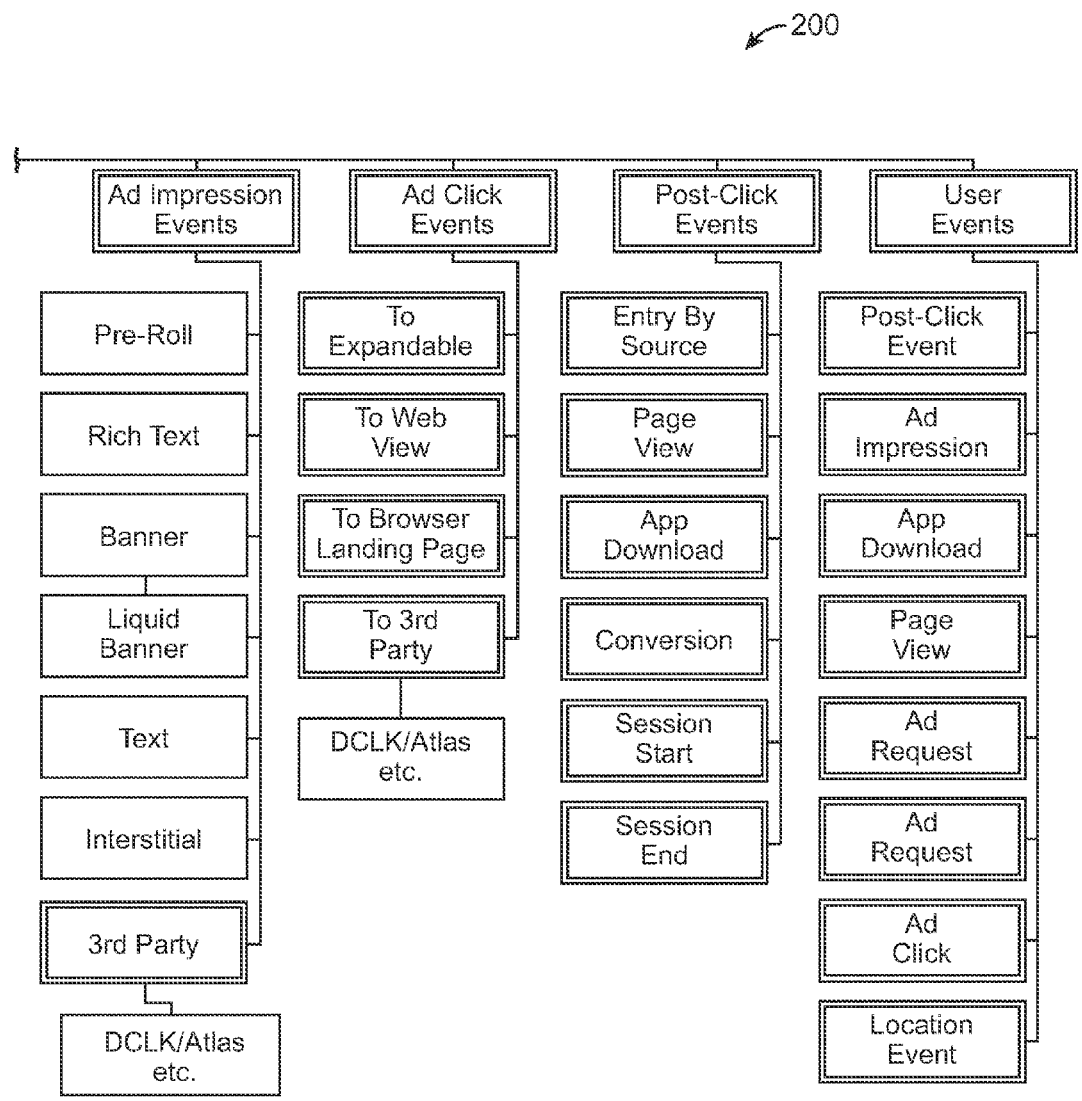

User characteristics can be learned directly or derived indirectly from a variety of sources. For example, the graph 200 in FIG. 2 illustrates a sampling of events from which the delivery system 106 can directly learn user characteristics and/or derive other user characteristics. Even though FIG. 2 illustrates a fair number of events as data sources, the figure should not be considered limiting. As will become apparent from the rest of this disclosure, the delivery system can learn of or derive user characteristics from any number of other information sources.

In some embodiments, the invitational content provided by the secondary content providers 110 is associated with one or more targeted segments. A targeted segment can be viewed as defining a space or region in k-dimensional space, where each of the k dimensions is associated with one of a plurality of user characteristics. This is conceptually illustrated in FIG. 3. In the various embodiments, the k dimensions can include both orthogonal and non-orthogonal dimensions. That is, some of the k dimensions can overlap or can be related in some aspect. For example, if separate dimensions are specified for city and state, these dimensions are non-orthogonal.

Figure 3:
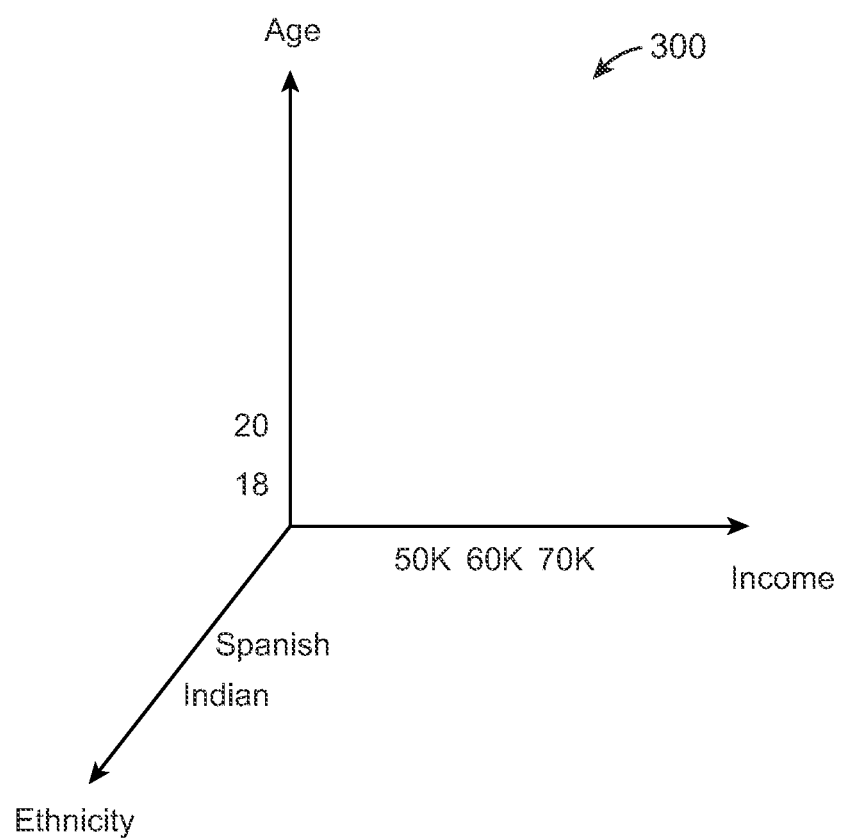
FIG. 3 illustrates a schematic diagram of a user characteristic space.

FIG. 3 is a schematic diagram of a user characteristics space 300. As shown in FIG. 3, the space 300 is defined by demographic characteristics, specifically age, income, and ethnicity. Each targeted segment in space 300 is associated with one or more user characteristics. A content provider wishing to present an item of invitational content to Spanish users aged between 18 and 20 and having an income between $50,000 and $70,000, would associate the invitational content with a targeted segment defined by those characteristics and values. However, a broader targeted segment could also be associated with the item, such as a targeted segment defined by the user characteristic age and the value 18 to 20. Although, the space 300 in FIG. 3 is defined in terms of a few demographic user characteristics, other user characteristics can also be used, such as channel, behavioral, and spatial-temporal characteristics described herein.

Referring back to FIG. 1, in some embodiments, the content delivery system 106 can include a user-profile database 120. The user-profile database 120 can, at least in part, be constructed based on recorded user characteristics related to one or more users. In some cases, the user-profile database may contain uncertain or incomplete user characteristic values.

The user-profile database 120 can be updated using a user-profile-updater module 122. In some embodiments, the user-profile-updater module 122 can be configured to add additional profile data, update profile data, fill in missing profile data, or derive uncertain user characteristic values from trusted data. A method of deriving uncertain user characteristics based on trusted data is described in greater detail in FIG. 6 below.

The updater module 122 can also be configured to maintain the profile database 120 to include only more recently acquired data or to re-derive any uncertain characteristics in order to ensure that the user profile is an accurate reflection of the current state of the user (location, state of mind, behaviors, demographics, etc. can change rapidly). For example, the updater module 122 can be configured to maintain the profile database 120 to include only data from the last two to three months. However, the updater module 122 can be configured to adjust the data in profile database 120 to cover any span of time. In some instances the updater module 122 can update the profile database 120 in real-time. In some instances, the updater module 122 can update the profile database 120 at least every week, or every day. In some cases, the delivery system 106 can receive a direct request to update one or more user profiles. The update request can come directly from the user's device or any other device capable of communicating with the delivery system 106, such as other content delivery networks or websites. In some cases, the delivery system 106 can receive an indirect request to update one or more user profiles. An indirect request can be the result of receiving new user characteristic values. An update request can occur at any time.

In some embodiments, the content delivery system 106 can include a segment database 114 that is used to aid in selecting invitational content to target to users. The segment database 114 stores defined segments and associations between the segments and users and/or invitational content that should be targeted to users associated with the segments. As described above, a targeted segment can be defined based on one or more user characteristics or derivatives thereof and can be associated with one or more items of invitational content. Additionally, a targeted segment can be associated with one or more users. In some embodiments, by associating a targeted segment with both a user and an item of invitational content, the delivery system can match invitational content with users. In some embodiments, the delivery system 106 can update the segment database 114 to add newly defined targeted segments or to delete targeted segments.

In some cases a targeted segment can be as simple as a single user characteristic identifier and a single user characteristic value. For example, the common demographic identifiers of gender, age, ethnicity, or income can each be used in defining corresponding targeted segments. A characteristic value can also be assigned to the identifier. For example, the values of male, 19, Indian, and $20,000-$30,000 can be assigned to the user characteristics of gender, age, ethnicity, and income, respectively. However, more complex targeted segments can also be defined that consist of one or more identifiers with one or more values associated with each identifier. For example, a targeted segment can be defined to target a user with the following characteristics: gender, male; age, 19-24; location, Northern California but not San Francisco. Additional exemplary segments are described throughout this disclosure. Furthermore, targeted segments can correspond to one or more segments that content providers are likely to easily understand and thus can quickly identify as being relevant to their content. Additionally, in some embodiments, content providers 109 and 110 can define a custom targeted segment.

In some embodiments, the delivery system 106 can include a custom segment creator module 126. A content provider 109 and 110 can interact either directly or indirectly with the creator module 126 to define a custom targeted segment. A custom segment can be defined based on one or more user characteristics known to the delivery system 106. In some cases, a custom targeted segment can be saved to the segment database 114 to use later in selecting invitational content. Alternatively, the custom targeted segment can be used immediately to identify invitational content with or without saving the segment to the segment database 114. An example for custom segment generation is described in greater detail below and in FIG. 29.

In some embodiments, the content delivery system 106 can provide a segment assigner module 124. The segment assigner module 124 can apply a set of user characteristics associated with a user (including segments to which a user has been previously assigned) to assign the user to one or more targeted segments. The assigner module 124 can obtain the set of user characteristic values from the user profile database 120 and/or from the user's activities during the current session. The segment assigner module 124 can assign a user to one or more defined targeted segments in the segment database 114, or alternatively, a user can be assigned to a custom targeted segment defined to meet specific goals of a content provider.

Based on the assigned segments, the user profile database 120 can be updated to reflect the segment assignments. Additionally, the delivery system 106 can use the segment assignments to select targeted content. In some cases, the user profile data in the user profile database 120 can change over time so the segment assigner module 124 can be configured to periodically update the segment assignments in the user profile database 120. The segment assignment update can be triggered at specified intervals, upon detection of a change in the user profile database 120, and/or upon detection of a specified activity in the delivery system 106.

Figure 4A:
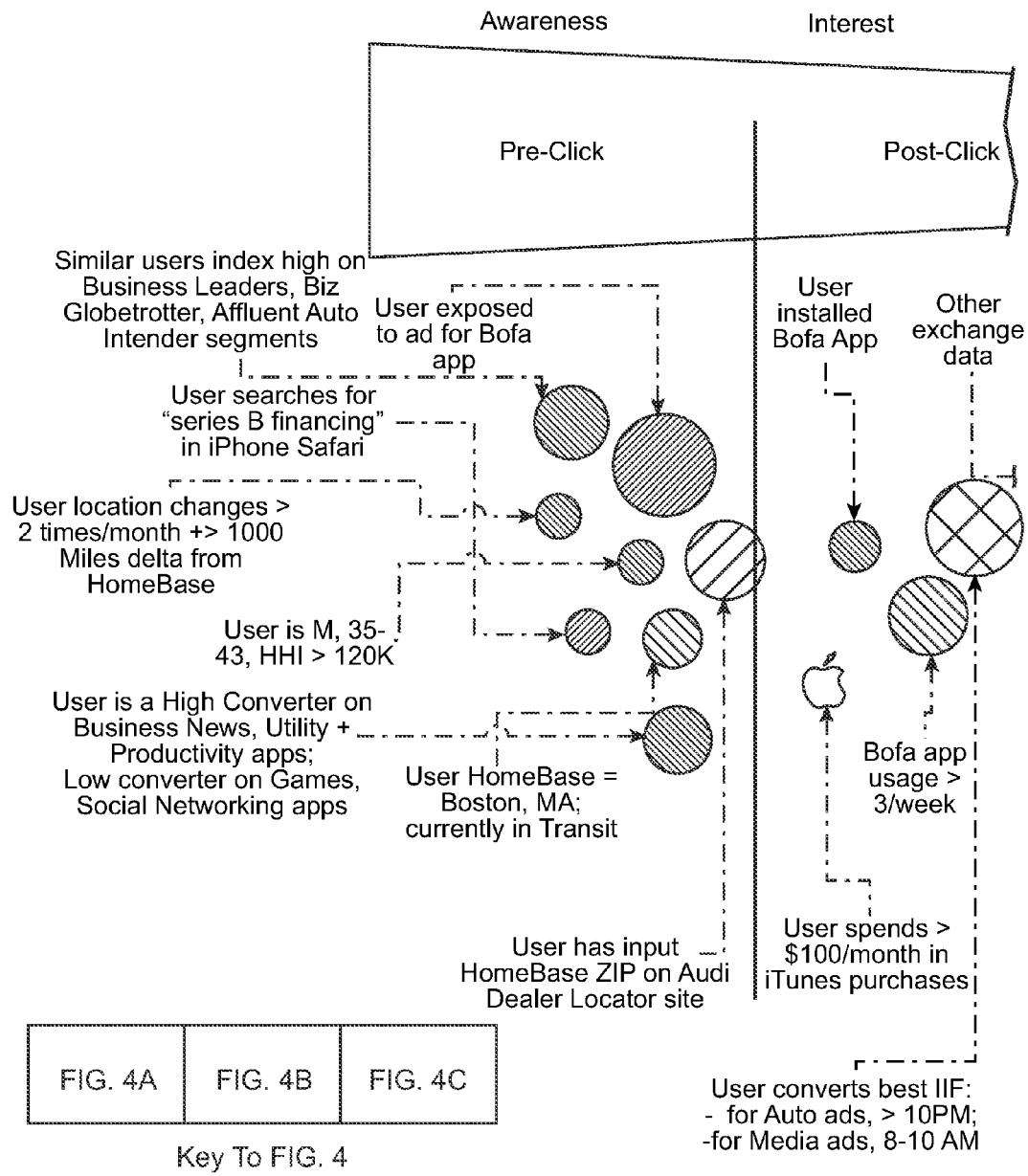
FIGS. 4A-C illustrate an overview of matching invitational content with users via segmentation.
Figure 4B:
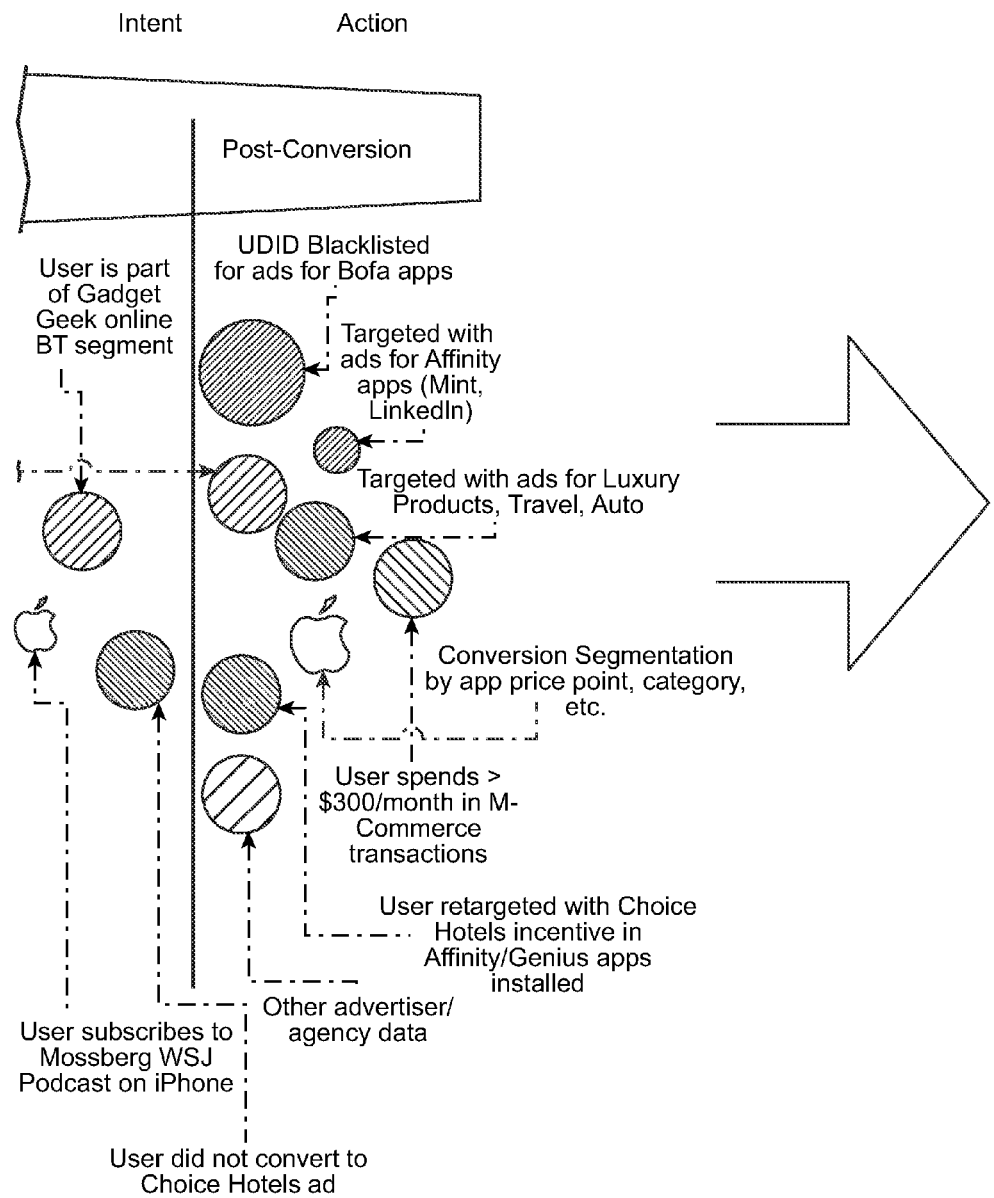
Figure 4C:
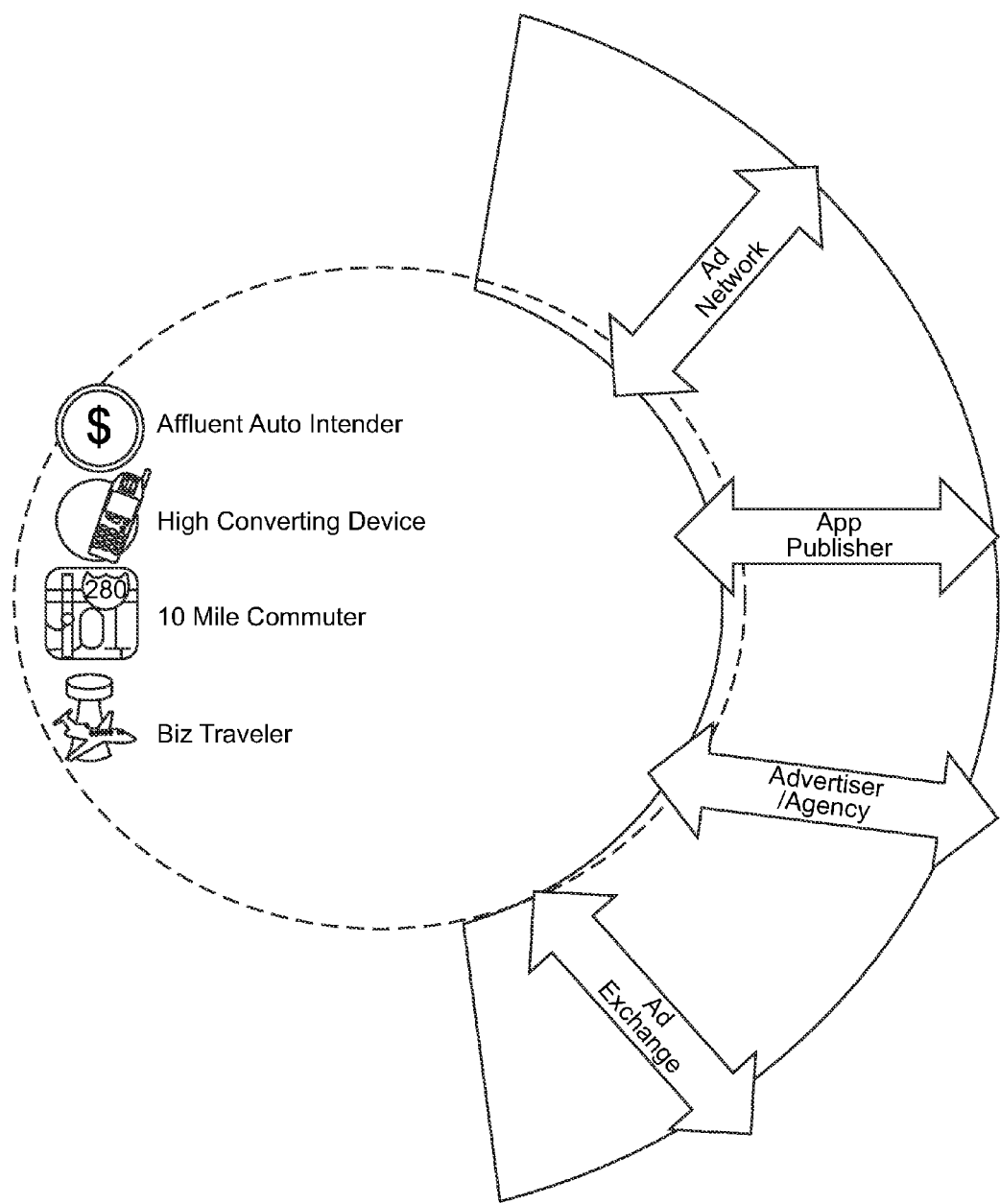

FIGS. 4A-C are collectively an overview of assigned segments that can be used to select targeted invitational content to be presented to a user and a process of refining the segment assignments for the user based on additional information and user characteristics learned as the user interacts with or fails to interact with invitational content presented to him along the conversion process. As a user interacts with content over one or more sessions, the delivery system 106 begins to gain additional knowledge about the user. This knowledge is enhanced when the user completes certain actions, such as clicking or not clicking on a link and/or completing a conversion. This information can then be used to assign the user to one or more targeted segments, such as Affluent Auto Intender, High Converting Device, 10 Mile Commuter, Biz Traveler, etc. Using the targeted segments, content providers can target invitational content that is likely to be of greater interest to the user. Methods for segment assignments are described in greater detail below.

In some embodiments, the content delivery system 106 can provide a segment-prioritizing module 128 for ordering the targeted segments assigned to a user. The prioritization can be influenced by a number of factors, which include the user's context (state of mind of a user with respect to interest in certain types of content, subject matter of content, progress along a conversion continuum, etc.), a content provider's campaign goals, and/or content that is currently available for display to the user. A request to prioritize the targeted segments can be made explicitly or implicitly by any component in the system 100. For example, a secondary content provider 110 can explicitly request that the content delivery system 106 prioritize the targeted segments or the request can be implicit as part of a request for an assembled content package. The resulting prioritized list can be provided, for example, to the content management module 108, which can then use the information to assemble and deliver a content package. Additionally, the prioritized list can be stored, for example in the user profile, for later use. A method of prioritizing targeted segments is described in greater detail.

Figure 5:
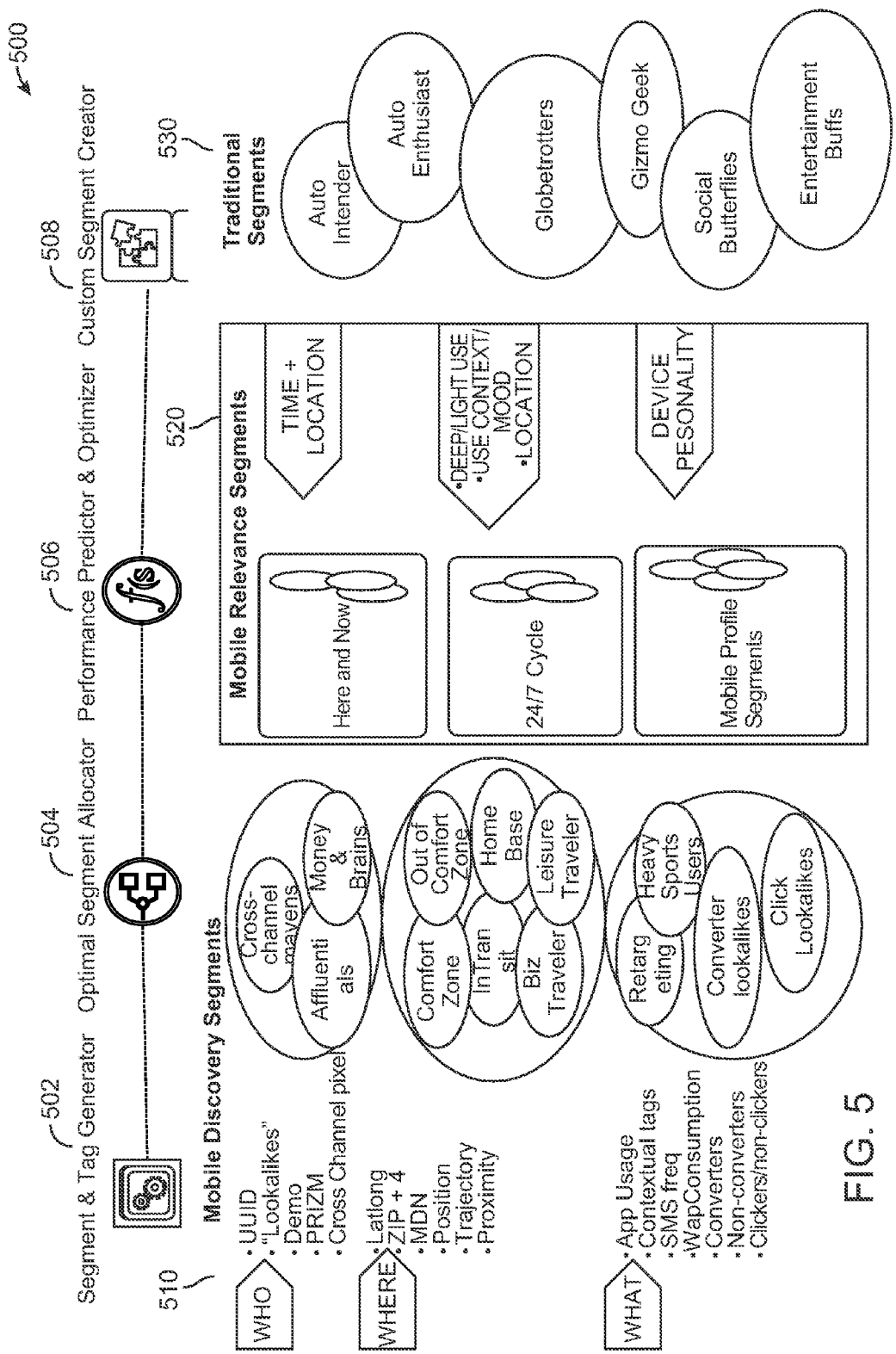
FIG. 5 illustrates an overview of an exemplary user segmentation process.

FIG. 5 is an overview of an exemplary user segmentation process 500. The delivery system 106 starts with a variety of user characteristics. Based on these characteristics, a segment generator 502, such as the segment assigner module 124, can assign the user to a variety of segments, such as the mobile discovery segments 510, mobile relevance segments 520, and traditional segments 530. An optimal segment allocator 504, such as the segment prioritizing module 128, can order the segments assigned to the user so that segments that are more relevant to the user's current context are at the top of the list. The delivery system 106 can also include module(s) that carry out the tasks of a performance predictor and optimizer 506. Such module(s) can further prioritize the assigned segments by predicting user behavior and/or prioritize segments based on campaign goals and/or context. Furthermore, the delivery system 106 can include a custom segment creator 508, such as the custom segment creator module 126, which allows content providers to create custom segments.

In the various embodiments, the one or more databases described herein can be implemented using any type of data structures. Such data structures include, but are not limited to, data structures for relational databases, key/value stores, graph databases, hierarchical databases, and distributed or columnar stores. Accordingly, although the various embodiments described herein may refer to specific data structures, in other embodiments such data structures can be substituted for any other type of data structure.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data in the present technology can be used to the benefit of users. For example, the personal information data can be used to better understand user behavior, facilitate and measure the effectiveness of advertisements, applications, and delivered content. Accordingly, use of such personal information data enables calculated control of the delivered content. For example, the system can reduce the number of times a user receives a given ad or other content and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can configure their devices or user terminals to prevent storage or use of cookies and other objects from which personal information data can be discerned. The present disclosure also contemplates that other methods or technologies may exist for blocking access to their personal information data.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The information gathered about a user, whether public or private can be used directly or indirectly to create the UUID database 116. In many of the embodiments discussed herein, a user is first identified in the UUID database 116 to retrieve, update or write data associated with the user in the UUID database 116.

Identification of the same user in the UUID database can be performed in a variety of ways and the methods employed to identify the user can vary depending on the user's connection type. In one example of identifying a user in the UUID database 116, when the delivery system 106 receives a request for a content package, the request can include some identifying information associated with the requesting user terminal or the associated user. This information can then be correlated to an entry in the UUID database 116 to retrieve an identity of the user. In other configurations, the delivery system 106 can analyze the attributes of the requesting device to determine whether such requests can be attributed to a same device. In some embodiments, a user's behavior in visiting the same content channels can be used to identify the user. Of course combinations of the methods for identifying a user on one or more connection types can be used.

As mentioned above a set of user characteristic values can also be associated with a user in the UUID database 116. In some embodiments, the set of user characteristic values are descriptive of the user. For example, the characteristic values could be demographic characteristics, such as gender, age, ethnicity, and/or income. In some embodiments, the set of user characteristic values are descriptive of the user's interaction with one or more items of content within a network of targeted content delivery channels. For example, the characteristic values can include details of the user's conversion history with respect to previously presented invitational content. The conversion history can be limited to whether or not the user converted or could be more detailed to include where on the conversion continuum the user abandoned the process, details about the invitational content presented, and/or where or when the invitational content was presented. The collected values can further include the channel, the device the user was using, the time of day, and/or day of week. In general, the values can be descriptive of any characteristics associated with the user and the user's actions such as channel, demographic, behavioral, and/or spatial-temporal characteristics. The more extensive the data set the more effective the targeting.

In some embodiments, the user characteristic values can be collected from one or more databases. For example, if the user is registered with an online media service, such as the ITUNES store maintained by Apple Inc. of Cupertino, Calif., the collected data could include the user's registration information and purchase history within the different categories of available media. Possible purchase history characteristics include, but are not limited to, preferred purchase categories, spend level, and recent purchase frequency. Each of these characteristics can be further specialized so as to apply to the various types of media available, such as apps, music, movies, television shows, and books. Some of the purchase history characteristics, as well as other user characteristics in general, can be relative to other users. For example, spend level can be based on a predefined scale or it can be based on the user's spending habits in relation other users, e.g. the user could be a high, average, or low spender.

In some embodiments, the delivery system 106 can determine user characteristic values associated with user characteristics that are pre-defined in the delivery system 106. For example, age is a possible user characteristic that might be pre-defined in the delivery system 106. A particular age, such as 19, is a user characteristic value that the delivery system 106 can collect and associate with the age user characteristic.

Figure 6:
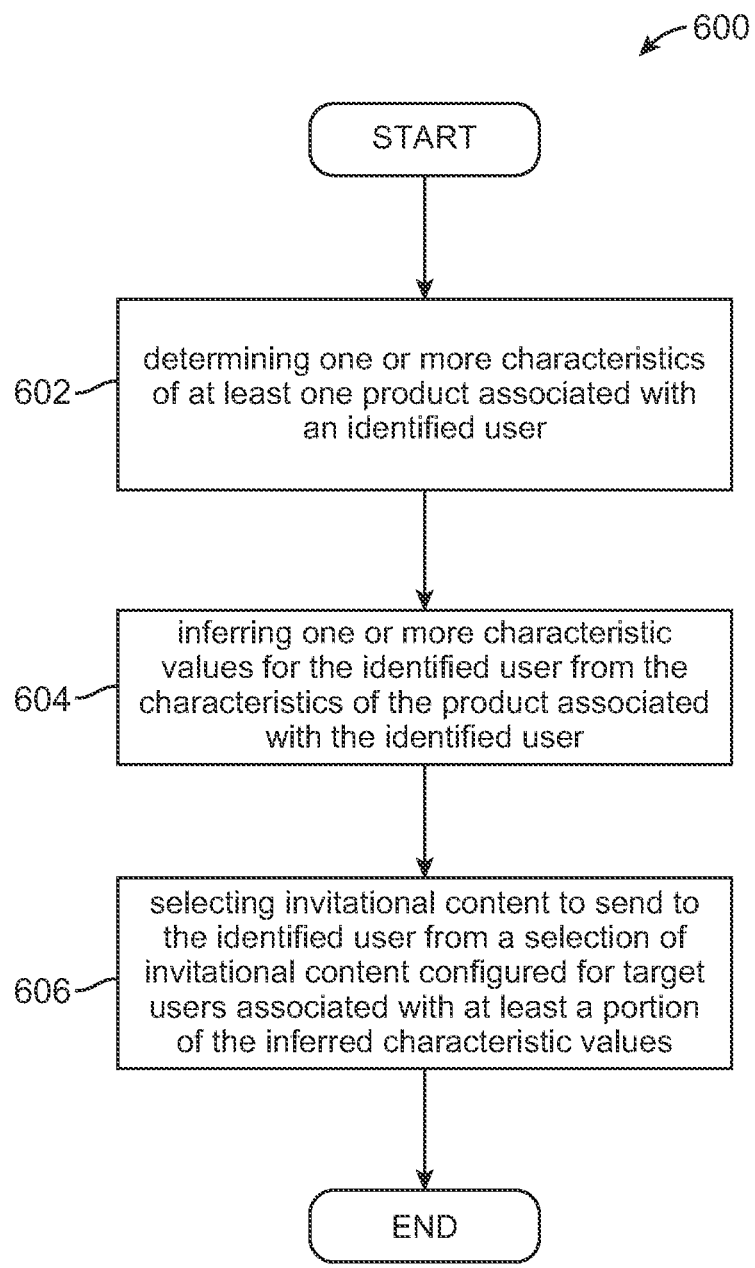
FIG. 6 illustrates an exemplary method embodiment for deriving unknown user characteristics.

In some embodiments, the delivery system 106 is configured to derive uncertain user characteristics. FIG. 6 is a flowchart illustrating steps in an exemplary method 600 for deriving uncertain user characteristics associated with a user. For the sake of clarity, this method is discussed in terms of an exemplary system such as is shown in FIG. 1. Although specific steps are shown in FIG. 6, in other embodiments a method can have more or less steps than shown.

Periodically, the content delivery system 106 determines one or more characteristics of at least one product associated with an identified user (602). A product associated with the identified user can include products that the user has viewed in an online store, products that a user has purchased from an online store, products that are in a user's multimedia library, etc. Even products that are known to have been advertised to the user can be considered a product associated with the user. The characteristics of a product are similarly wide ranging. They can include demographics commonly associated with the products such as age range of targeted or typical purchasers, content category, genre (if applicable), product type, product color, size, etc.

From the product characteristics, user characteristics can be inferred (604). For example, a user's age range can be inferred based on the targeted demographic of the product, or from the known ages of other users that bought the same products. A user's interest in music, or type of music and movies, can also be inferred from the product characteristics. More generally, the type of products that the user is interested in can also be inferred.

Based on the characteristics inferred from the product characteristics, the delivery system 106 selects invitational content to send to the identified user from a selection of invitational content configured for target users associated with at least a portion of the inferred characteristic values (606). In some embodiments, the user characteristics are first used to categorize a user into one or more targeted segments and invitational content is then delivered to the user based on their inclusion in the targeted segments.

In some embodiments, inferring data from products associated with the user might not be possible or at least not useful because only a small number of products are associated with the user. In such instances, it can be helpful to use a similarity algorithm to identify additional products that are similar to the few that are directly associated with the user. By using the similarity algorithm, the sample size can be increased and the data derived therefrom is more likely to be reliable. Accordingly, a benefit of the similarity algorithm is that it can result in an increased confidence score associated with the derived value.

In a similar fashion to that explained above, user characteristics can be derived or inferred from many sources of data. In some embodiments, the delivery system 106 infers one or more uncertain user characteristic values by comparing one or more trusted user characteristic values with a database of data and then inferring the one or more uncertain user characteristic values from the comparison. Whether the delivery system 106 considers a value trusted can vary depending on the configuration of the system. For example, in some cases any value can be considered trusted. However, in other cases, the delivery system 106 may only trust values that have an associated confidence score greater than a specified threshold value. In some configurations, the delivery system 106 can detect that certain values may not be completely accurate. For example, the delivery system 106 may be able to detect that a user has entered a business address for their home address and thus not consider it a trusted value for the purpose of deriving other user characteristic values. For example, a user may enter a home address of 1 Infinite Loop, Cupertino, Calif. 95014, which is known to be a commercial address.

Comparison data can be obtained from any type of database such a public database, like the U.S. Census database, or a private third party database that is accessible to the delivery system 106 or has been incorporated into the delivery system 106. To illustrate, if one of the trusted characteristics is the user's address, which was obtained from the user's registration information, then the delivery system 106 can compare that address with the U.S. Census data to infer the user's estimated income, ethnicity, gender, religion inter alia. A confidence score can also be assigned to the inferred values. For example, if in a particular town identified in the Census data, eighty percent of the people living in that town fall into the same income range, then the system can infer that it is eighty percent likely that a user in that town falls into that income range and thus, have an eighty percent confidence in the inferred value being accurate.

In some embodiments, the delivery system 106 infers one or more uncertain user characteristic values by comparing the set of user characteristic values with a collection of user characteristic values collected from a population of users. In some configurations, the delivery system 106 can obtain the collection of user characteristic values for the population of users from the user profile database 120.

To illustrate a method of deriving an uncertain user characteristic value from a collection of user characteristic values collected from a population of users, consider the table 700 in FIG. 7A. The table 700 represents a collection of user characteristic values. Each of the users in the table 700 has at least one uncertain characteristic value. That is, each user is missing a characteristic value. In this example, the delivery system 106 is attempting to derive one or more uncertain characteristic values for the user with UUID 3, so the system compares user 3 with the other three users.

From the comparison, the delivery system 106 can identify another user among the population of users with user characteristic values similar to the user. Another user among the population of users can be identified in a number of different ways. In some embodiments, the delivery system 106 can represent the user and each user in the population of users as a vector. Then the delivery system 106 can compute the angle between the vector associated with the user and the vectors associated with each user in the population of users. The delivery system 106 selects one or more users in the population of users in which the computed angle is less than a threshold value and can infer missing values in the user's profile from the similar user in the population.

In some embodiments, the delivery system 106 can construct a "model" user from a population of users. The "model" user can be constructed by averaging the user characteristic values of a population of users. In some configurations, other methods of combining the user characteristic values of a population of users can be used. The delivery system 106 can then use the "model" user as a basis for inferring uncertain user characteristic values for the user.

In some embodiments, the delivery system 106 can identify another user among the population of users by computing an overall similarity value. For each pairing of the user and another user in the population of users, the delivery system 106 first computes a similarity value for each user characteristic. For example, consider the user characteristic age. If the user has an age characteristic value of 19 and another user has the same age user characteristic, then the delivery system 106 can assign a similarity value of 1 for the age user characteristic. However, if the another user has an age user characteristic value of 21, then the delivery system 106 can assign a similarity value that is less than or equal to 1. In some configurations, the delivery system 106 can assign a similarity value of 1 because the user and the another user are in the same age range, e.g. 19-24. However, the delivery system 106 can assign a value less than 1 even though the user's age user characteristic value and the another user's age user characteristic value are in the same range. Other methods of computing the similarity between two values for a particular user characteristic value are possible. In some configurations, a different method of computing similarity can be used for each user characteristic value. The delivery system 106 is not limited to a similarity value scale of 0 to 1, other scales are also possible, e.g. 0-100.

The delivery system 106 then combines the similarity values for the individual user characteristic values to create an overall similarity value for the pairing of the user and the another user in the population of users. For example, the overall similarity value can be computed by averaging the individual user characteristic similarity values for the pairing of the user and the another user. In some embodiments, the similarity value for an individual user characteristic can be weighted to give it a greater or lesser impact on the overall similarity value. In some embodiments, the delivery system 106 uses a subset of the user characteristic values to compute the similarity between the user and other users in the population. Finally, the delivery system 106 selects one or more users in the population of users in which the overall similarity for the pairing is greater than a threshold value and infers additional user characteristic values for the user from values associated with the one or more users in the population of users.

Returning to the example based on table 700 in FIG. 7A, the delivery system 106 determines that User 3 exhibits a sufficient similarity to the users with UUID 1 and 4. User 1 is selected because all four of User 3's trusted user characteristic values are an exact match with user characteristic values associated with User 1, i.e. Gender, Age Range, Movie Category Purchase History, and App Category Purchase History. User 4 is selected even though only three of his user characteristic values match with User 3, i.e. Gender, Age Range, and Movie Category Purchase History. The 75% match was a sufficient level of similarity for the configuration of the system. In this case, the delivery system 106 is configured such that trusted simply means characteristic values exist.

Then the delivery system 106 infers the one or more unknown characteristic values about the user from the another user with contextual characteristic values similar to the user. Based on the table 700, user 3 is missing contextual characteristic information for two characteristics: Music Category Purchase History and TV Category Purchase History. In this case, because User 1 and User 4 have differing values for the Music Category Purchase History characteristic, the delivery system 106 is unable to infer a value for User 3 for this characteristic. In some configurations, the delivery system 106 can infer the Music Category Purchase History characteristic from User 1 because User 3 exhibits a greater degree of similarity with User 1.

The delivery system 106 is able to infer a value for the TV Category Purchase History. Based on the characteristics of the similar users, the delivery system 106 infers that User 3 is likely to be interested in the Action & Adventure TV Category. This is reflected in the updated collection of user characteristic values in table 750 in FIG. 7B.

In some embodiments, the delivery system 106 infers the one or more uncertain user characteristic values by inferring the one or more uncertain characteristic values from the set of user characteristic values. There are some user characteristics that the delivery system 106 can infer simply based on other user characteristics known about the user. For example, gender, age, and life stage are illustrative user characteristics that can, in some cases, be inferred from other characteristics known about the user. As an illustration, if one of the known characteristics is the user's preferred salutation, then it may be possible to infer the user's gender. In the case where the preferred salutation is insufficient to make a determination, such as when the preferred salutation is Dr., then the delivery system 106 can attempt to infer the gender from other user characteristics such as the user's purchase history. For example, if the user's purchase history skews towards categories that are traditionally associated with one gender or the other, then the delivery system 106, knowing this information, can infer the user's gender. A method for inferring a gender characteristic value is described in greater detail below in FIG. 8. Similarly, purchase history can be used to infer both age and life stage characteristics. For example, if the user's purchase history contains a mix of children and adult categories, the delivery system 106 may be able to infer that the user's life stage is that of a parent. Methods for inferring age and life stage characteristic values are described in greater detail below in FIG. 21-23.

In some embodiments, the delivery system 106 assigns a confidence score to the values in the set of user characteristic values, where the confidence score represents the likelihood that the particular characteristic value is valid and/or correct for the user. For example, a characteristic can be assigned a value in the range [0,1], where 0 indicates no confidence and 1 indicates full confidence. Other relative indicators of confidence can also be used such as a percentage.

The calculation of a confidence score can depend on a variety of factors. In some configurations, the user characteristic and/or how the characteristic is obtained can be a factor in the confidence score. For example, a different method may be used to calculate a confidence score for a demographic characteristic versus a behavioral characteristic. Furthermore, if there is more than one method to derive a particular characteristic value, as is illustrated with the life stage characteristic in FIGS. 21 and 22 below, there can be different methods of calculating the associated confidence score. In some cases, the confidence score can be related to the number of characteristics considered in deriving the value. The confidence score can also be related to the strength of the inference used in deriving a new user characteristic. In the case where the derived value is based on a collection of characteristic values from a population of users or products, the number (sample size) of users in the population or products can also factor into the confidence score. In some embodiments, if the confidence score for a characteristic value is less than a specified threshold value, then the system 106 can, at some point, attempt to re-derive the value to improve the confidence score. Values that are affirmed by multiple methods of attempts to derive a characteristic can likewise be given a higher confidence score.

To illustrate one method of calculating a confidence score, suppose the characteristic is content-driven, e.g. extracted from the content using text mining. First, the characteristic value is assigned a score based on the frequency of the value within the content relative to the inverse of the frequency of the value within all content known to the delivery system 106. Then the score is updated to reflect how the value applies to the particular user. For example, the score can be updated based on how often the user actually interacts with the content. This score can be called a relevancy score. Finally, the relevancy score gets converted into the confidence score based on how well the value applies to the user given the context.

Figure 8:
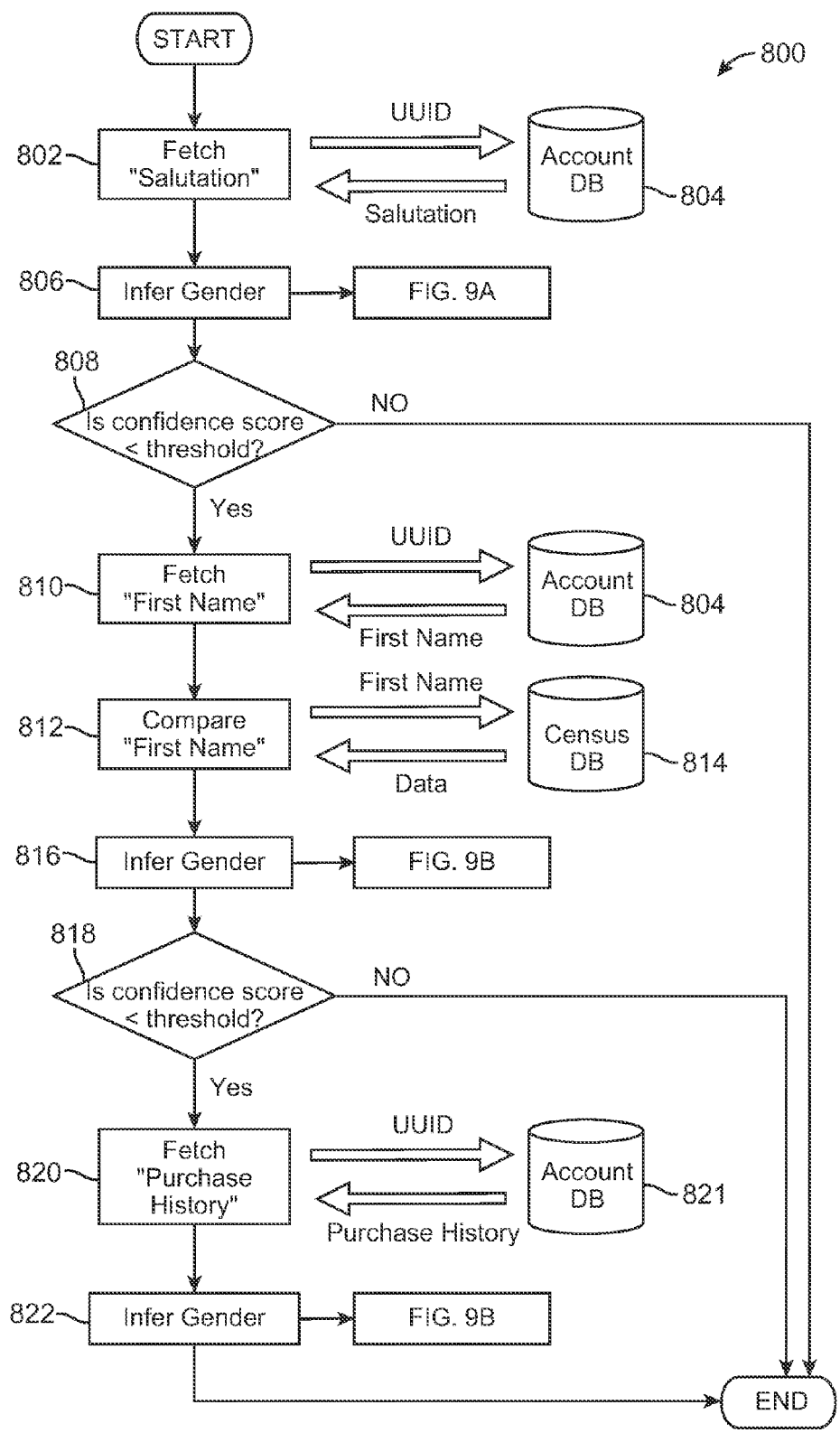
FIG. 8 illustrates an exemplary method deriving an unknown gender characteristic.
Figure 9A:
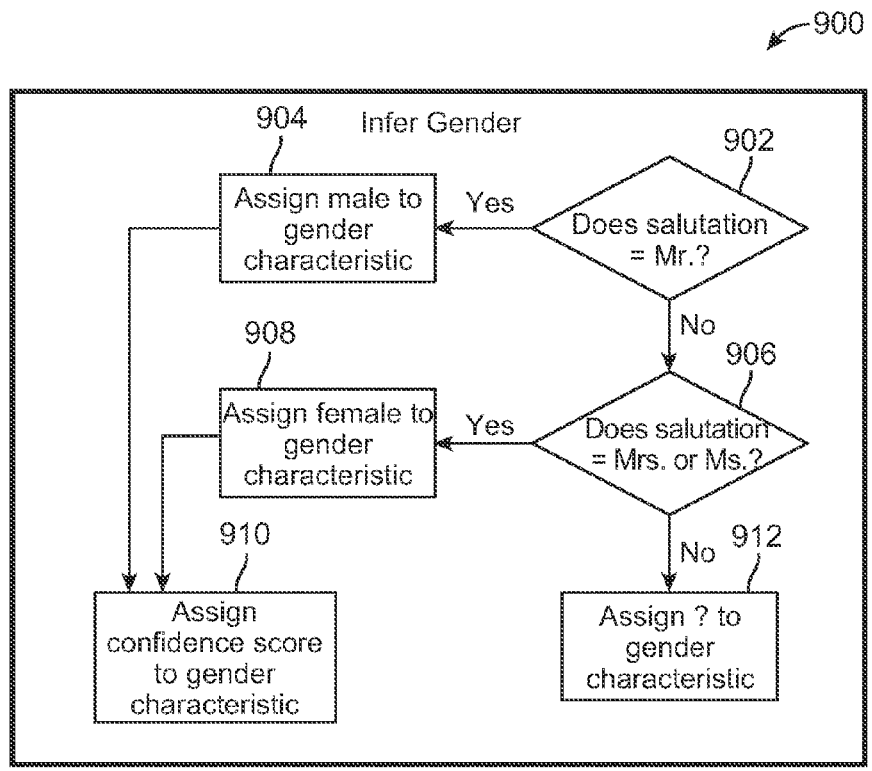
FIG. 9A illustrates a first exemplary method for inferring the gender characteristic.

In some cases, deriving an uncertain user characteristic value can require using one or more derivation methods to arrive at a trusted value. For example, FIG. 8 illustrates a full process for deriving a gender characteristic value. The derivation method 800 begins at 802, where the delivery system 106 fetches the user's preferred salutation from the account database 804. The salutation characteristic could have been collected from another database, such as the ITUNES database maintained by Apple Inc. of Cupertino, Calif., which stores the user's account information. The delivery system 106 then attempts to infer the user's gender from the fetched salutation (806). FIG. 9A illustrates a method 900 that can be used to infer gender from the preferred salutation. First, the delivery system 106 checks if the salutation is Mr. (902). If so, the delivery system 106 assigns male to the gender characteristic (904) and assigns a confidence score of 1 (910), where the confidence score ranges from 0 to 1 and 1 indicates full or nearly full confidence. If the salutation is not Mr., then the delivery system 106 checks if the salutation is Ms. or Mrs. (906). If so, the delivery system 106 assigns female to the gender characteristic (908) and assigns a confidence score of 1 (910). If the salutation is not Mrs. or Ms., then the delivery system 106 assigns "?" to the gender characteristic (912). Values other than "?" can also be used to indicate that the value is unknown. After assigning a "?" value, the delivery system 106 does not need to update the confidence score because it already had a confidence score of 0 for the gender characteristic for this user.

Figure 9B:
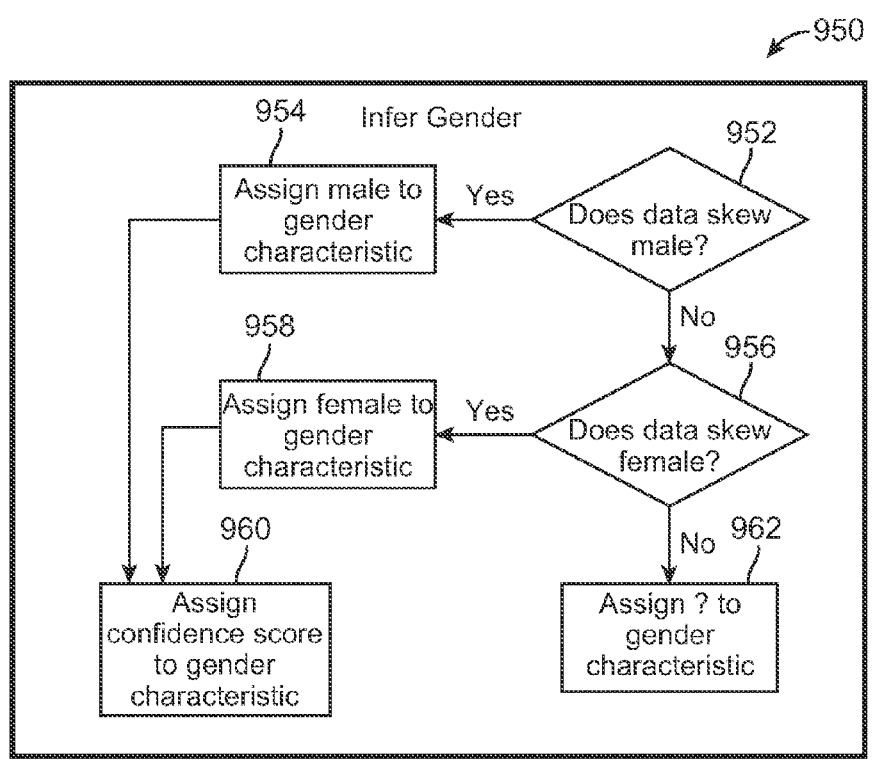
FIG. 9B illustrates a second exemplary method for inferring the gender characteristic.

After attempting to infer the user's gender at step 806, the delivery system 106 checks the confidence score (808). If the confidence score has exceeded a specified threshold, then the derivation process is complete. Alternatively, the delivery system 106 could also check the gender characteristic field to determine if a valid value has been entered. However, if the delivery system 106 is not yet confident that the derived value, if any, can reliably be used to select targeted content for the user, then the delivery system 106 fetches the user's first name at step 810 from the account database 804. The delivery system 106 then compares the user's first name at step 812 with the U.S. Census database 814. Using the Census data, the delivery system 106 again attempts to infer the user's gender (816). FIG. 9B illustrates a method 950 that can be used to infer the user's gender from the Census data. First, the delivery system 106 checks if the data skews male (952). That is, the delivery system 106 checks if the Census data indicates that the first name is predominately male. If so, the delivery system 106 assigns male to the gender characteristic (954) and assigns a confidence score (960). In this case, the confidence score is assigned based on the probability that the first name is male. Historically, there are certain first names that are traditionally only given to males or females, some that lean towards one sex, and others that are completely unisex. If the data does not skew male, then the delivery system 106 checks if the data skews female (956). If so, the delivery system 106 assigns female to the gender characteristic (958) and assigns a confidence score (960). If the delivery system 106 is unable to infer a gender from the Census data, then the delivery system 106 assigns "?" to the gender characteristic (962).

After attempting to infer the user's gender at step 816, the delivery system 106 again checks the confidence score (818). If the confidence score has exceeded a specified threshold, then the derivation process is complete. However, if the delivery system 106 is not yet confident in the derived value, which can happen if the Census data is only slightly skewed towards one gender, then the delivery system 106 fetches the user's purchase history from the account database 821 at step 820. The account database 821 can be the same database as account database 804. Using the purchase history, the delivery system 106 again attempts to infer the user's gender (822). The method 950, illustrated in FIG. 9B, can again be used to infer the user's gender, only this time from the purchase history. First, the delivery system 106 checks if the data skews male (952). That is, the delivery system 106 checks if the categories from which the user purchased content are those predominately purchased by male users. If so, the delivery system 106 assigns male to the gender characteristic (954) and assigns a confidence score (960). If the purchase history data does not skew male, then the delivery system 106 checks if the data skews female (956). If so, the delivery system 106 assigns female to the gender characteristic (958) and assigns a confidence score (960). If the delivery system 106 still cannot infer whether the user is male or female, then the delivery system 106 assigns "?" to the user's gender characteristic (962).

At this point, the delivery system 106 has used all available data in an attempt to derive the unknown characteristic. If the characteristic is still unknown at the end of the method 800, then the delivery system 106 can make another attempt to derive the data at a later time or by a different methodology, such as the population similarity method illustrated through FIGS. 7A and 7B discussed above.

In some embodiments, the delivery system 106 can receive a direct request to derive one or more unknown user characteristic values and/or a request can be included with a request for invitational content. In some embodiments, the delivery system 106 can derive the uncertain characteristic value in response to a need for the value, such as when the delivery system 106 is assigning a user to a particular targeted segment that relies on the value. In some embodiments, the delivery system 106 can derive uncertain user characteristic values at regular intervals.

Figure 10:
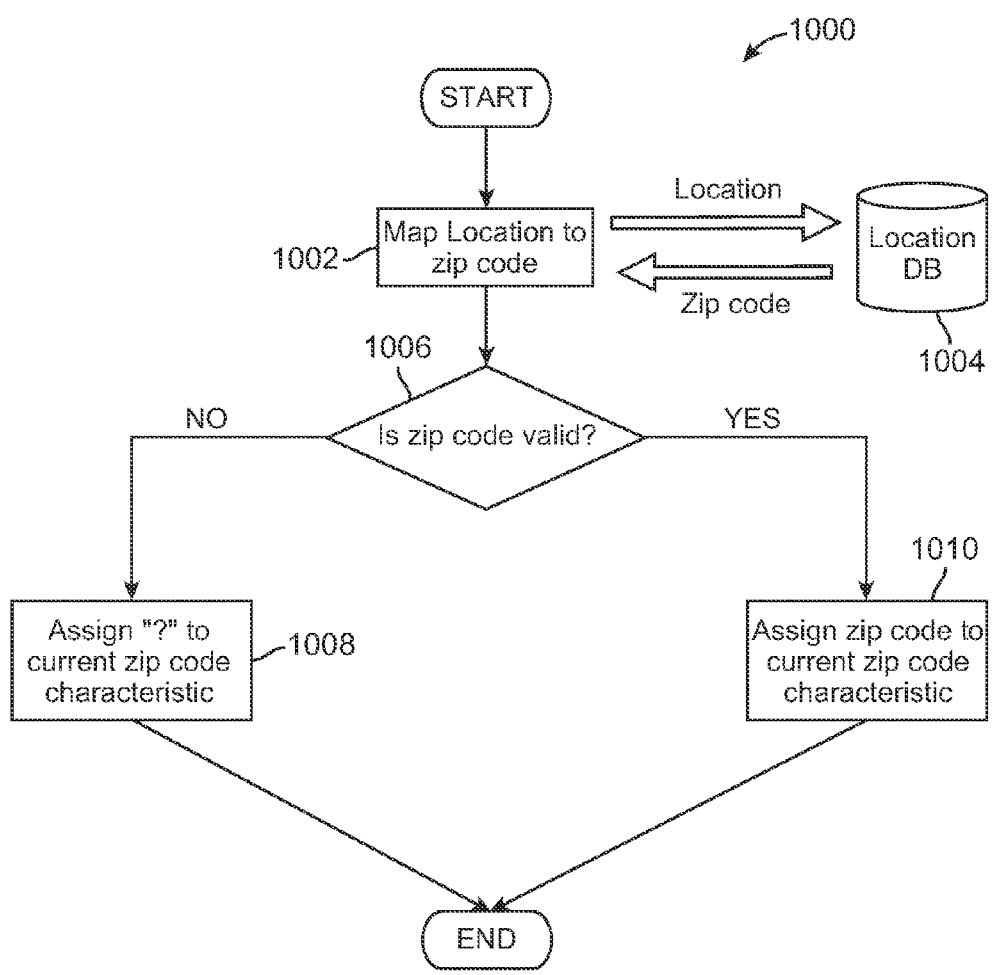
FIG. 10 illustrates an exemplary method for deriving a current zip code user characteristic value.

FIG. 10 illustrates another example of deriving an uncertain user characteristic value. The method 1000 in FIG. 10 can be used to derive a current zip code characteristic value. The derivation method 1000 begins at 1002, where the delivery system 106 maps the user's current location to a zip code. In some embodiments, the user's location can be provided as a latitude and/or longitude value, however, other methods of expressing location are also possible. The location value can be provided as part of the request for a content package or can be obtained through other interaction with the user. To map the location to a zip code, the delivery system 106 queries the location database 1004. The delivery system 106 then checks if the value returned from the location database 1004 is valid (1006). Checking for validity can be as simple as verifying that the zip code value is composed of valid characteristics and is an appropriate length. If the zip code value is not valid, then the delivery system 106 can assign "?" to the current zip code characteristic (1008). Values other than "?" can also be used to indicate that the value is unknown. Otherwise, the delivery system 106 assigns the returned zip code value to the current zip code characteristic (1010). In some embodiments, the delivery system 106 can also assign a confidence score to the current zip code characteristic. Once the value is derived, the delivery system 106 can update the user's profile in the user profile database 120 and/or use the data during the session to aid in selecting appropriate invitational content.

After completing the derivation method 1000, there are a number of cases in which the delivery system 106 may need to repeat this action. Such scenarios include, but are not limited to, at the end of method 1000 the current zip code characteristic is still unknown, an assigned confidence score is less than a threshold value, the user's location changed, and/or a specified period of time has expired.

Figure 11:
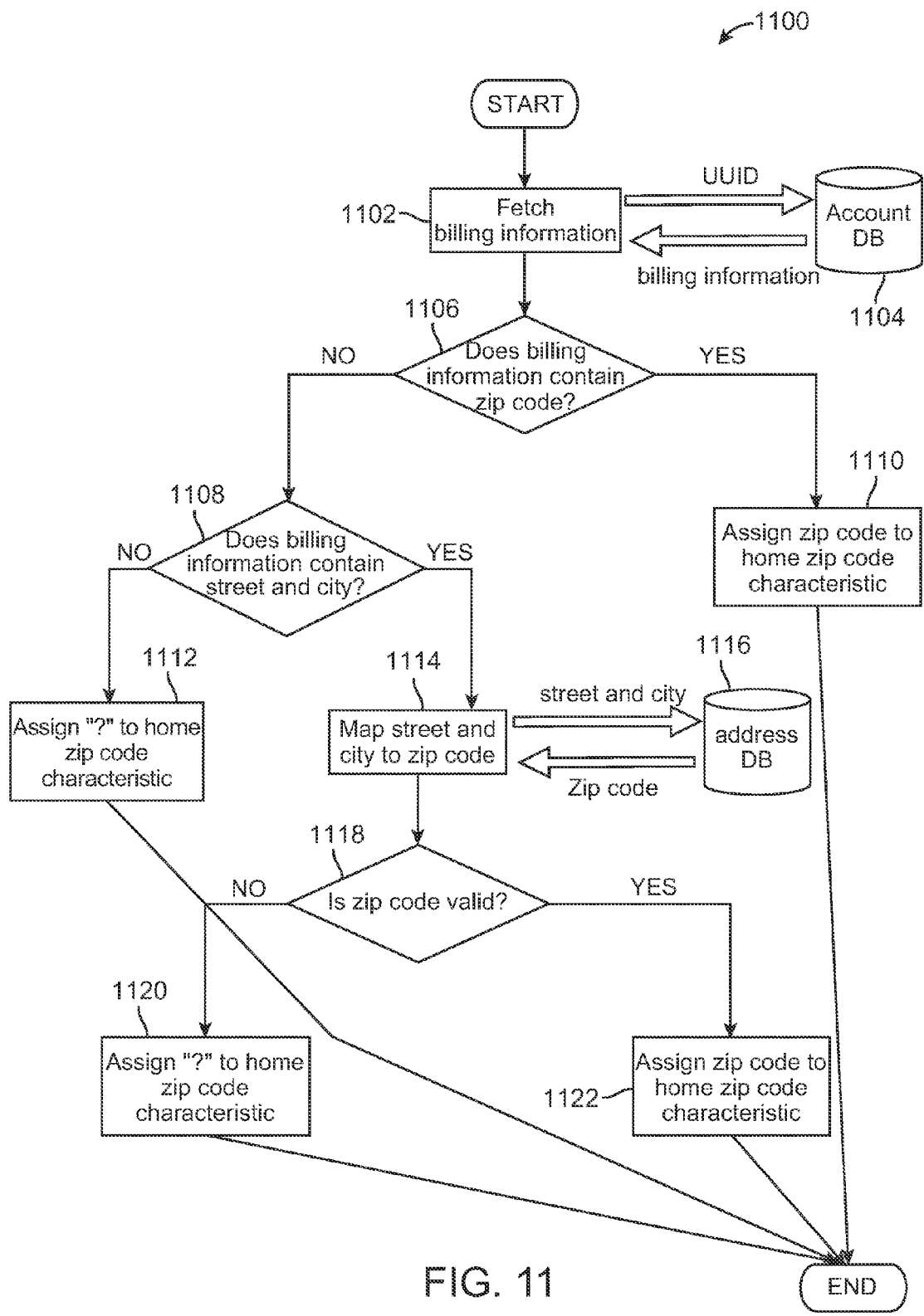
FIG. 11 illustrates an exemplary method for deriving a home zip code user characteristic value.

FIG. 11 illustrates another example of deriving an uncertain user characteristic value. The method 1100 in FIG. 11 can be used to derive a home zip code characteristic value. The derivation method 1100 begins at 1102, where the delivery system 106 fetches the user's billing information from an account database 1104. The account database 1104 can be the user profile database 120 or it could be another database, such as the ITUNES database maintained by Apple Inc. of Cupertino, Calif., which stores user account information. The delivery system 106 then checks the billing information to see if it contains a zip code (1106). If there is a zip code, then delivery system 106 assigns it to the home zip code characteristic (1110). In some embodiments, the delivery system 106 can verify that the zip code value is valid prior to assigning it to the home zip code characteristic. Checking for validity can be as simple as verifying that the zip code value is composed of valid characteristics and is an appropriate length. However, if the billing information is lacking a zip code, the delivery system 106 checks the billing information for a street and city (1108). If the billing information also lacks this information, the delivery system 106 assigns "?" to the home zip code characteristic (1112). Values other than "?" can also be used to indicate that the value is unknown. If the delivery system 106 did find a street and city in the billing information, the delivery system 106 maps the information to a zip code (1114). To map the street and city to a zip code the delivery system 106 queries the address database 1116. The delivery system 106 then checks if the value returned from the address database 1116 is valid (1118). If the zip code value is not valid, then the delivery system 106 can assign "?" to the home zip code characteristic (1120). Otherwise, the delivery system 106 assigns the returned zip code value to the home zip code characteristic (1122). In some embodiments, the delivery system 106 can also assign a confidence score to the home zip code characteristic. Once the value is derived, the delivery system 106 can update the user's profile in the user profile database 120 and/or use the data during the session to aid in selecting appropriate invitational content.

After completing the derivation method 1100, there are a number of cases in which the delivery system 106 may need to repeat this action. Such scenarios include, but are not limited to, at the end of method 1100 the home zip code characteristic is still unknown, an assigned confidence score is less than a threshold value, the user's billing information changes, and/or a specified period of time has expired.

Figure 12:
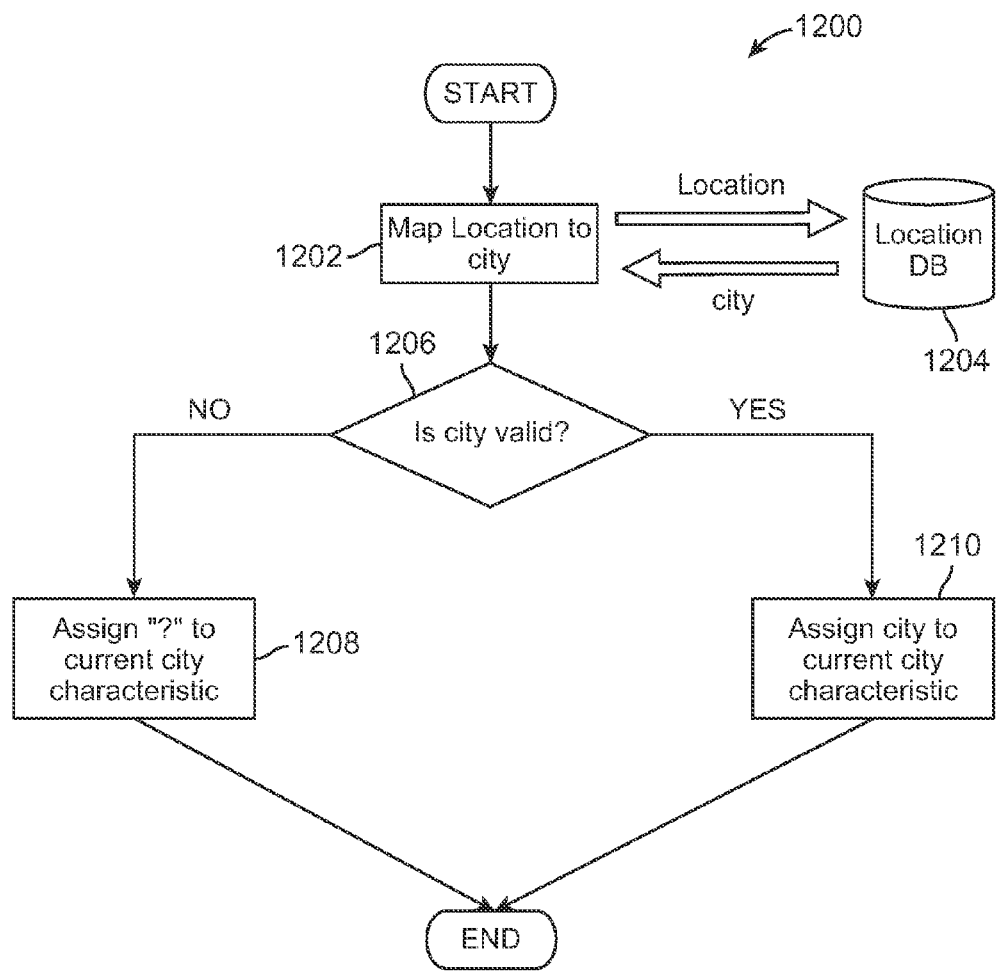
FIG. 12 illustrates an exemplary method for deriving a current city user characteristic value.

FIG. 12 illustrates another example of deriving an uncertain user characteristic. The method 1200 in FIG. 12 can be used to derive a current city characteristic value. The derivation method 1200 begins at 1202, where the delivery system 106 maps the user's current location to a city. In some embodiments, the user's location can be provided as a latitude and/or longitude value, however, other methods of expressing location are also possible. The location value can be provided as part of the request for a content package or can be obtained through other interactions with the user. To map the location to a city, the delivery system 106 queries the location database 1204. The delivery system 106 then checks if the value returned from the location database 1204 is valid (1206). Checking for validity can be as simple as verifying that the value is non-null, that the value is composed of valid characters, or that the value is the name of a known city. If the city value is not valid, then the delivery system 106 can assign "?" to the current city characteristic (1208). Values other than "?" can also be used to indicate that the value is unknown. Otherwise, the delivery system 106 assigns the returned city value to the current city characteristic (1210). In some embodiments, the delivery system 106 can also assign a confidence score to the current city characteristic. Once the value is derived, the delivery system 106 can update the user's profile in the user profile database 120 and/or use the data during the session to aid in selecting appropriate invitational content.

After completing the derivation method 1200, there are a number of cases in which the delivery system 106 may need to repeat this action. Such scenarios include, but are not limited to, at the end of method 1200 the current city characteristic is still unknown, an assigned confidence score is less than a threshold value, the user's location changed, and/or a specified period of time has expired.

Figure 13:
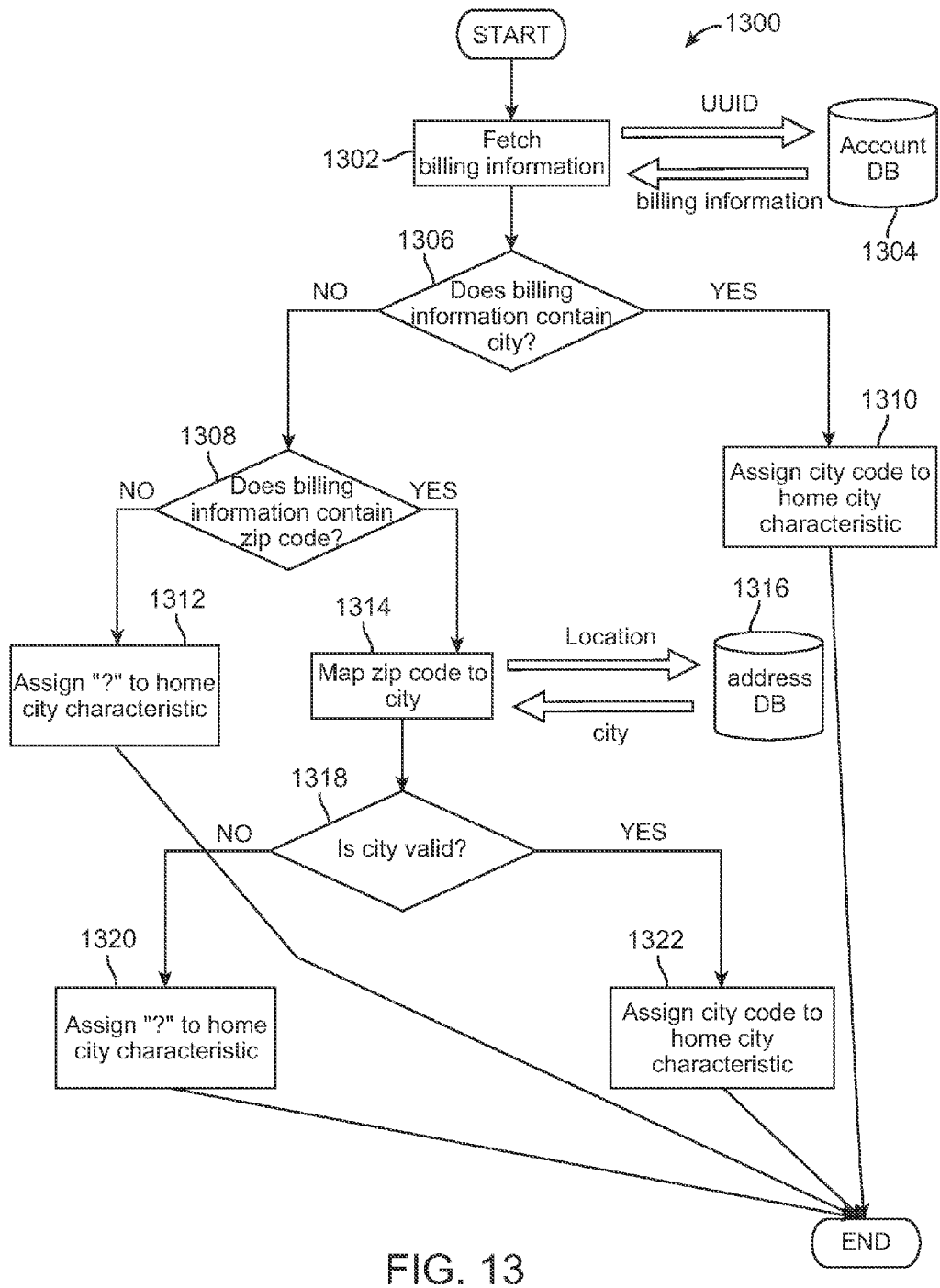
FIG. 13 illustrates an exemplary method for deriving a home city user characteristic value.

FIG. 13 illustrates another example of deriving an uncertain user characteristic value. The method 1300 in FIG. 13 can be used to derive a home city characteristic value. The derivation method 1300 begins at 1302, where the delivery system 106 fetches the user's billing information from an account database 1304. The account database 1304 can be the user profile database 120 or it could be another database, such as the ITUNES database maintained by Apple Inc. of Cupertino, Calif., which stores user account information. The delivery system 106 then checks the billing information to see if it contains a city (1306). If there is a city, then delivery system 106 assigns it to the home city characteristic (1310). However, if the billing information is lacking a city, the delivery system 106 checks the billing information for a zip code (1308). If the billing information also lacks this information, the delivery system 106 assigns "?" to the home city characteristic (1312). Values other than "?" can also be used to indicate that the value is unknown. If the delivery system 106 did find a zip code in the billing information, the delivery system 106 maps the information to a city (1314). To map the zip code to a city the delivery system 106 queries the address database 1316. The delivery system 106 then checks if the value returned from the address database 1316 is valid (1318). Checking for validity can be as simple as verifying that the value is non-null, that the value is composed of valid characters, or that the value is the name of a known city. If the city value is not valid, then the delivery system 106 can assign "?" to the home city characteristic (1320). Otherwise, the delivery system 106 assigns the returned city value to the home city characteristic (1322). In some embodiments, the delivery system 106 can also assign a confidence score to the home city characteristic. Once the value is derived, the delivery system 106 can update the user's profile in the user profile database 120 and/or use the data during the session to aid in selecting appropriate invitational content.

After completing the derivation method 1300, there are a number of cases in which the delivery system 106 may need to repeat this action. Such scenarios include, but are not limited to, at the end of method 1300 the home city characteristic is still unknown, an assigned confidence score is less than a threshold value, the user's billing information changes, and/or a specified period of time has expired.

Figure 14:
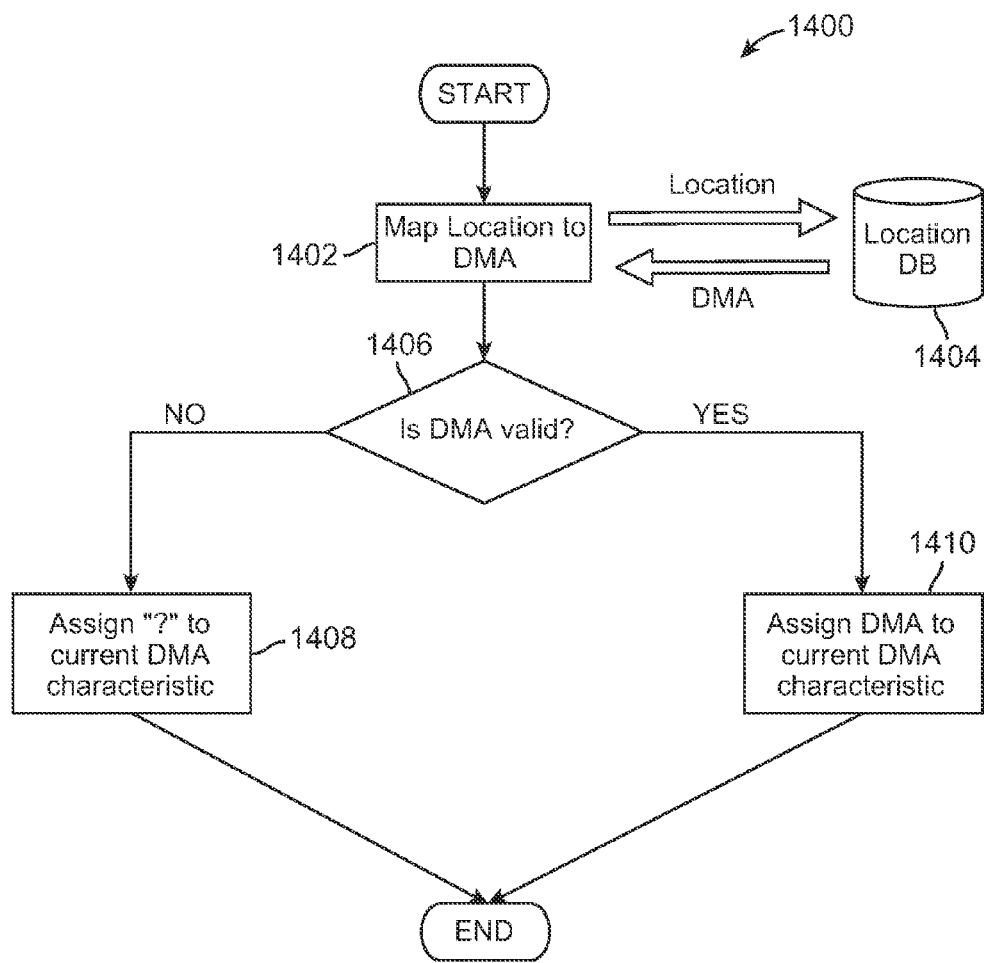
FIG. 14 illustrates an exemplary method for deriving a current DMA user characteristic value.

FIG. 14 illustrates another example of deriving an uncertain user characteristic value. The method 1400 in FIG. 14 can be used to derive a current designated market area (DMA) characteristic value. The derivation method 1400 begins at 1402, where the delivery system 106 maps the user's current location to a DMA. In some embodiments, the user's location can be provided as a latitude and/or longitude value, however, other methods of expressing location are also possible. The location value can be provided as part of the request for a content package or can be obtained through other interaction with the user. To map the location to a DMA, the delivery system 106 queries the location database 1404. The delivery system 106 then checks if the value returned from the location database 1404 is valid (1406). Checking for validity can be as simple as verifying that the value is non-null, that the value is composed of valid characters, or that the value is the name of a known DMA. If the DMA value is not valid, then the delivery system 106 can assign "?" to the current DMA characteristic (1408). Values other than "?" can also be used to indicate that the value is unknown. Otherwise, the delivery system 106 assigns the returned DMA value to the current DMA characteristic (1410). In some embodiments, the delivery system 106 can also assign a confidence score to the current DMA characteristic. Once the value is derived, the delivery system 106 can update the user's profile in the user profile database 120 and/or use the data during the session to aid in selecting appropriate invitational content.

After completing the derivation method 1400, there are a number of cases in which the delivery system 106 may need to repeat this action. Such scenarios include, but are not limited to, at the end of method 1400 the current DMA characteristic is still unknown, an assigned confidence score is less than a threshold value, the user's location changed, and/or a specified period of time has expired.

Figure 15:
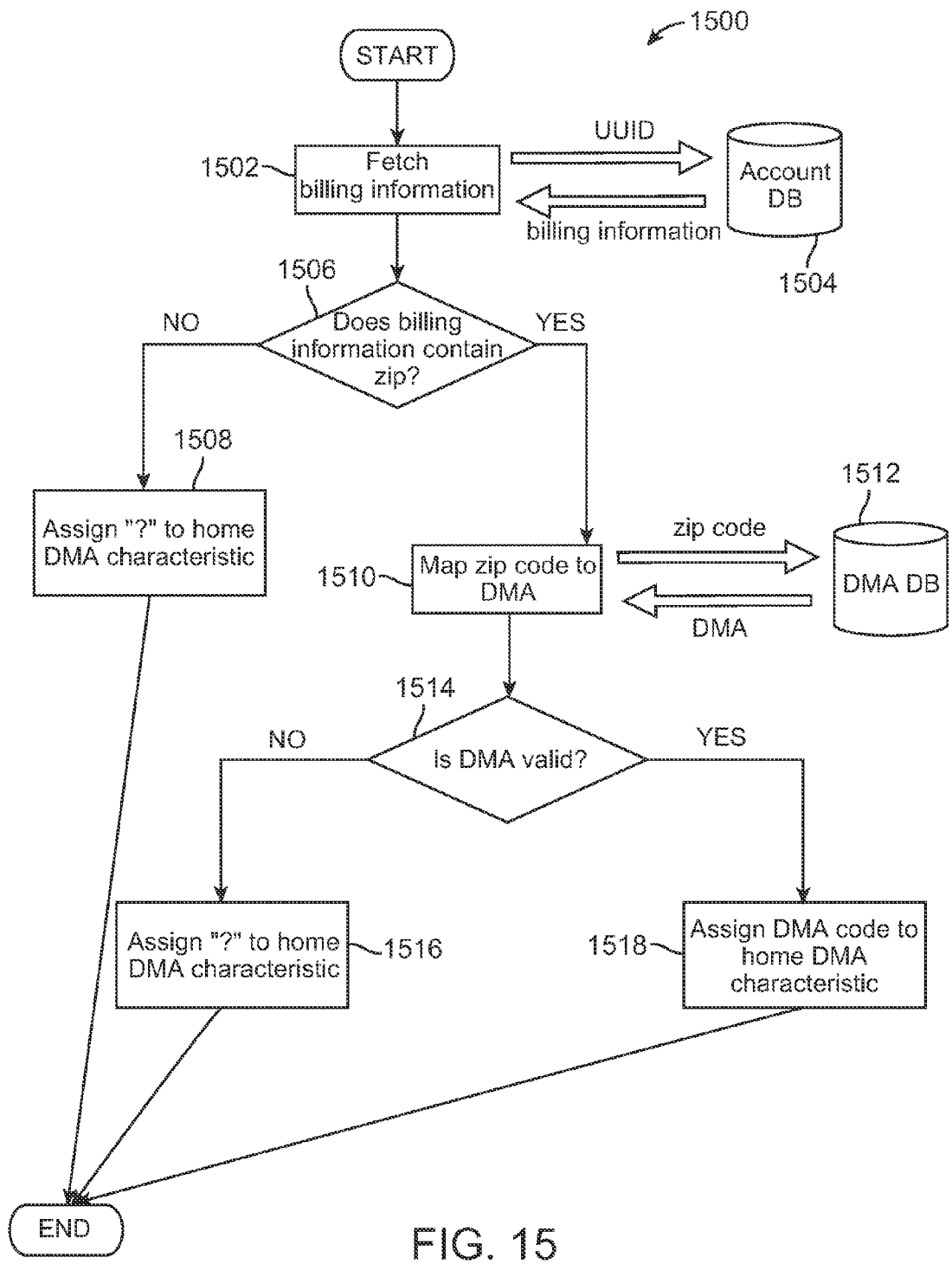
FIG. 15 illustrates an exemplary method for deriving a home DMA user characteristic value.

FIG. 15 illustrates another example of deriving an uncertain user characteristic value. The method 1500 in FIG. 15 can be used to derive a home designated market area (DMA) characteristic value. The derivation method 1500 begins at 1502, where the delivery system 106 fetches the user's billing information from an account database 1504. The account database 1504 can be the user profile database 120 or it could be another database, such as the ITUNES database maintained by Apple Inc. of Cupertino, Calif., which stores user account information. The delivery system 106 then checks the billing information to see if it contains a zip code (1506). If the billing information lacks a zip code, the delivery system 106 assigns "?" to the home DMA characteristic (1508). However, if the delivery system 106 did find a zip code in the billing information, the delivery system 106 maps the information to a DMA (1510). To map the zip code to a DMA, the delivery system 106 queries the DMA database 1512. The delivery system 106 then checks if the value returned from the DMA database 1512 is valid (1514). Checking for validity can be as simple as verifying that the value is non-null, that the value is composed of valid characters, or that the value is the name of a known DMA. If the DMA value is not valid, then the delivery system 106 can assign "?" to the home DMA characteristic (1516). Otherwise, the delivery system 106 assigns the returned DMA value to the home DMA characteristic (1518). In some embodiments, the delivery system 106 can also assign a confidence score to the home DMA characteristic. Once the value is derived, the delivery system 106 can update the user's profile in the user profile database 120 and/or use the data during the session to aid in selecting appropriate invitational content.

After completing the derivation method 1500, there are a number of cases in which the delivery system 106 may need to repeat this action. Such scenarios include, but are not limited to, at the end of method 1500 the home DMA characteristic is still unknown, an assigned confidence score is less than a threshold value, the user's billing information changes, and/or a specified period of time has expired.

Figure 16:
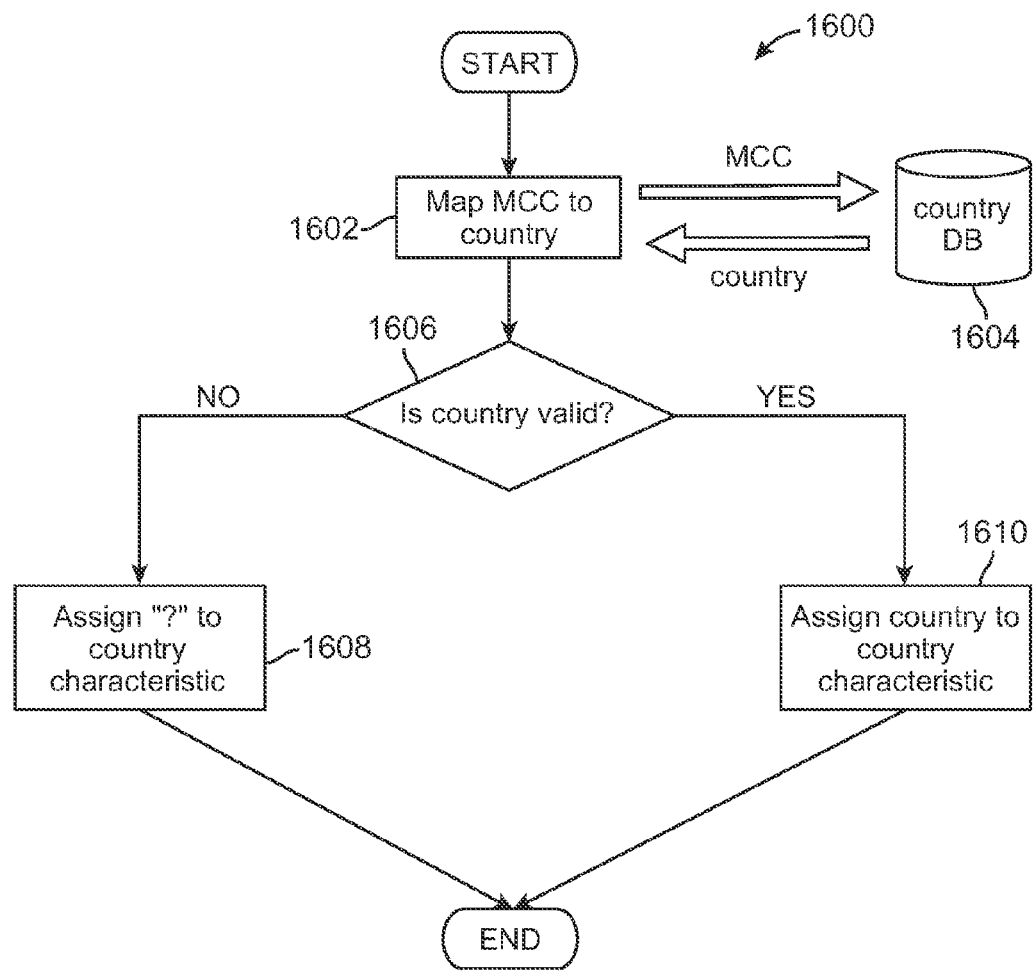
FIG. 16 illustrates an exemplary method for deriving a country user characteristic value.

FIG. 16 illustrates another example of deriving an uncertain user characteristic value. The method 1600 in FIG. 16 can be used to derive a country characteristic value. The derivation method 1600 begins at 1602, where the delivery system 106 maps the user's mobile country code (MCC) to a country. In some embodiments, the user's MCC value can be provided as part of the request for a content package or can be obtained through other interaction with the user. To map the MCC to a country, the delivery system 106 queries the country database 1604. The delivery system 106 then checks if the value returned from the country database 1604 is valid (1606). Checking for validity can be as simple as verifying that the value is non-null, that the value is composed of valid characters, or that the value is the name of a known country. If the country value is not valid, then the delivery system 106 can assign "?" to the current country characteristic (1608). Values other than "?" can also be used to indicate that the value is unknown. Otherwise, the delivery system 106 assigns the returned country value to the country characteristic (1610). In some embodiments, the delivery system 106 can also assign a confidence score to the country characteristic. Once the value is derived, the delivery system 106 can update the user's profile in the user profile database 120 and/or use the data during the session to aid in selecting appropriate invitational content.

After completing the derivation method 1600, there are a number of cases in which the delivery system 106 may need to repeat this action. Such scenarios include, but are not limited to, at the end of method 1600 the country characteristic is still unknown, an assigned confidence score is less than a threshold value, the user's MCC changed, and/or a specified period of time has expired.

Figure 17:
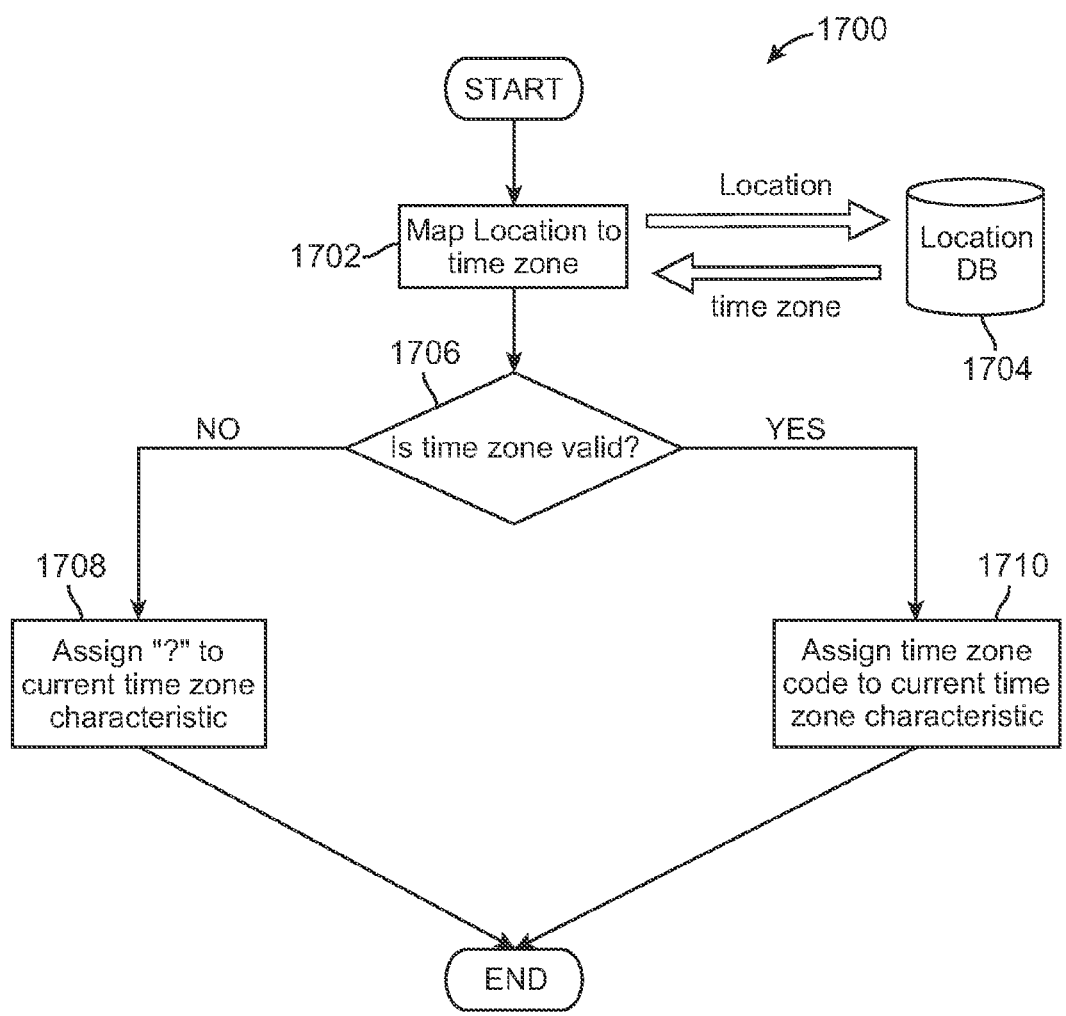
FIG. 17 illustrates an exemplary method for deriving a current time zone user characteristic value.

FIG. 17 illustrates another example of deriving an uncertain user characteristic value. The method 1700 in FIG. 17 can be used to derive a current time zone characteristic value. The derivation method 1700 begins at 1702, where the delivery system 106 maps the user's current location to a time zone. In some embodiments, the user's location can be provided as a latitude and/or longitude value, however, other methods of expressing location are also possible. The location value can be provided as part of the request for a content package or can be obtained through other interaction with the user. To map the location to a time zone, the delivery system 106 queries the location database 1704. The delivery system 106 then checks if the value returned from the location database 1704 is valid (1706). Checking for validity can be as simple as verifying that the value is non-null, that the value is composed of valid characters, or that the value is the name of a known time zone. If the time zone value is not valid, then the delivery system 106 can assign "?" to the current time zone characteristic (1708). Values other than "?" can also be used to indicate that the value is unknown. Otherwise, the delivery system 106 assigns the returned time zone value to the current time zone characteristic (1710). In some embodiments, the delivery system 106 can also assign a confidence score to the current time zone characteristic. Once the value is derived, the delivery system 106 can update the user's profile in the user profile database 120 and/or use the data during the session to aid in selecting appropriate invitational content.

After completing the derivation method 1700, there are a number of cases in which the delivery system 106 may need to repeat this action. Such scenarios include, but are not limited to, at the end of method 1700 the current time zone characteristic is still unknown, an assigned confidence score is less than a threshold value, the user's location changed, and/or a specified period of time has expired.

Figure 18:
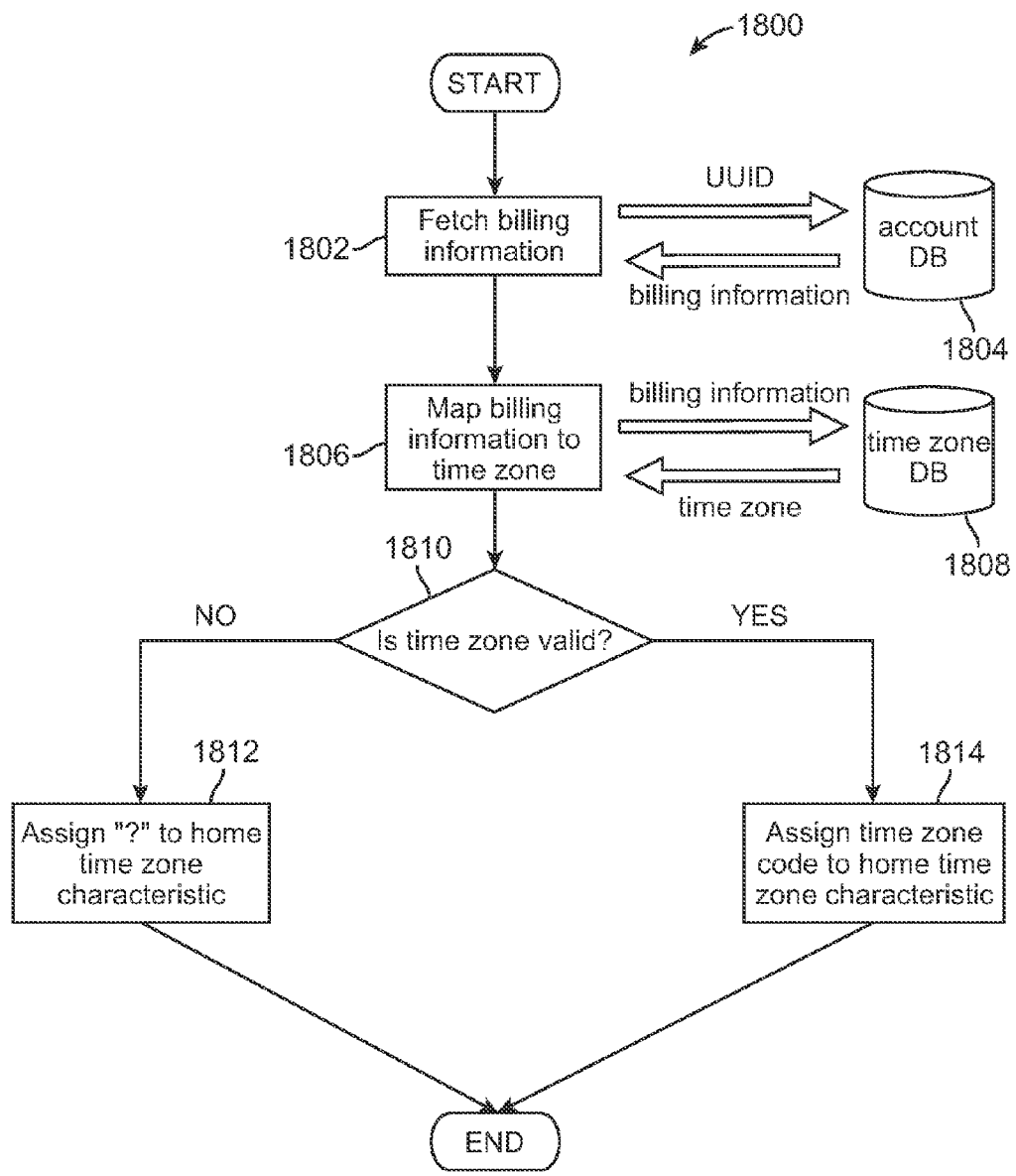
FIG. 18 illustrates an exemplary method for deriving a home time zone user characteristic value.

FIG. 18 illustrates another example of deriving an uncertain user characteristic value. The method 1800 in FIG. 18 can be used to derive a home time zone characteristic value. The derivation method 1800 begins at 1802, where the delivery system 106 fetches the user's billing information from an account database 1804. The account database 1804 can be the user profile database 120 or it could be another database, such as the ITUNES database maintained by Apple Inc. of Cupertino, Calif., which stores user account information. The delivery system 106 then maps the billing information to a time zone (1806). To map the billing information to a time zone, the delivery system 106 queries the time zone database 1808. The query could be based on the entire billing address, the zip code, the city and state, or any combination of values found in the billing address. The delivery system 106 then checks if the value returned from the location database 1808 is valid (1810). Checking for validity can be as simple as verifying that the value is non-null, the value is a single value, that the value is composed of valid characters, or that the value is the name of a known time zone. If the time zone value is not valid, then the delivery system 106 can assign "?" to the current time zone characteristic (1812). Values other than "?" can also be used to indicate that the value is unknown. Otherwise, the delivery system 106 assigns the returned time zone value to the home time zone characteristic (1814). In some embodiments, the delivery system 106 can also assign a confidence score to the home time zone characteristic. Once the value is derived, the delivery system 106 can update the user's profile in the user profile database 120 and/or use the data during the session to aid in selecting appropriate invitational content.

After completing the derivation method 1800, there are a number of cases in which the delivery system 106 may need to repeat this action. Such scenarios include, but are not limited to, at the end of method 1800 the home time zone characteristic is still unknown, an assigned confidence score is less than a threshold value, the user's billing information changed, and/or a specified period of time has expired.

Figure 19:
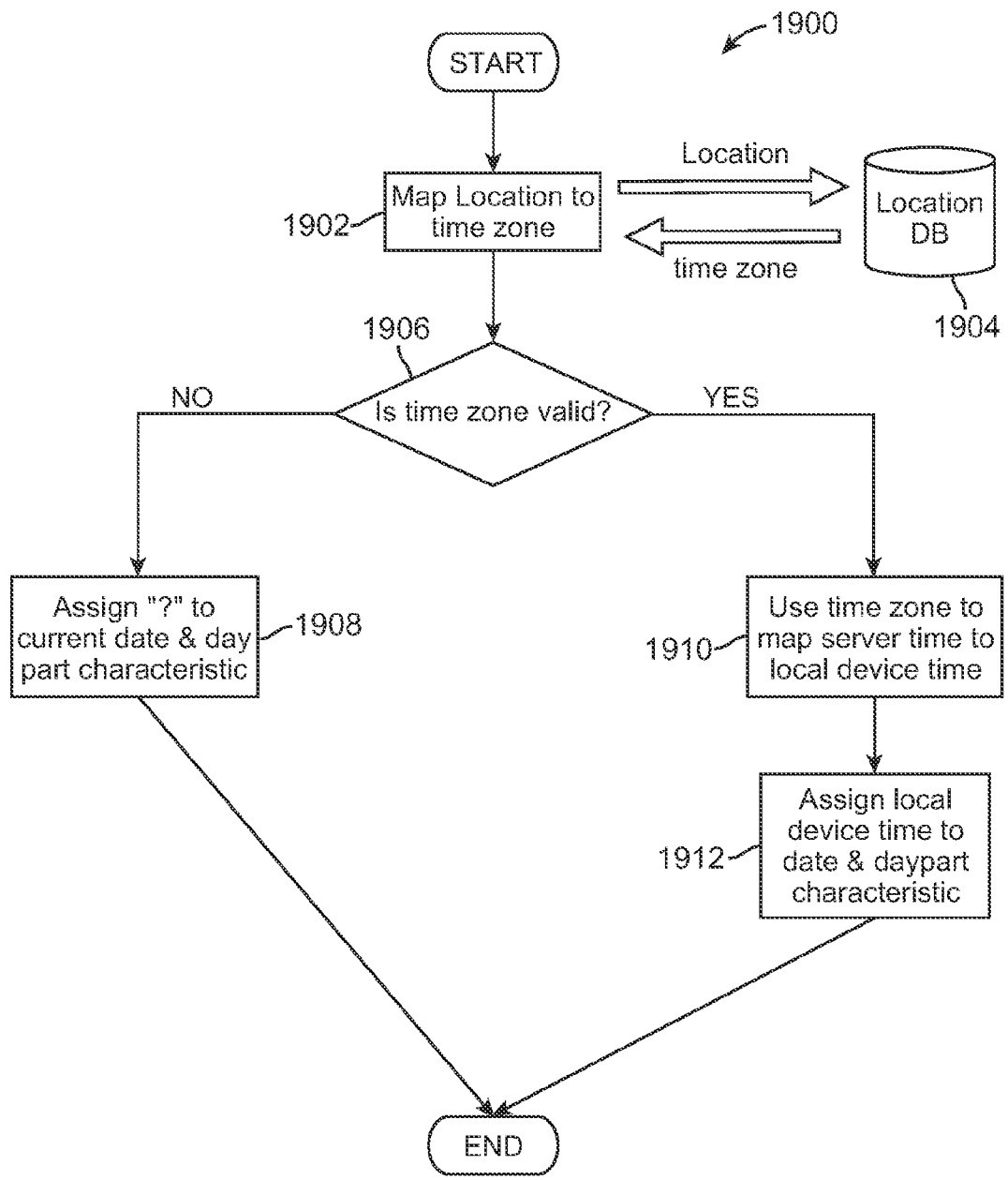
FIG. 19 illustrates an exemplary method for deriving a date and day part user characteristic value.

FIG. 19 illustrates another example of deriving an uncertain user characteristic value. The method 1900 in FIG. 19 can be used to derive a date and day part characteristic value. The date and day part user characteristic is associated with a day and time of day value. The time of day can be values descriptive of a time of day such as dawn, dusk, morning, noon, lunch time, afternoon, commuting hours, etc. or a particular time during the day, e.g. 7 am. The date can be a particular day of the week, e.g. Monday; a value descriptive of a part of the week, e.g. workday, weekend; a day of the month, e.g. January 1; or any other value that describes a date.

The derivation method 1900 begins at 1902, where the delivery system 106 maps the user's current location to a time zone. In some embodiments, the user's location can be provided as a latitude and/or longitude value, however, other methods of expressing location are also possible. The location value can be provided as part of the request for a content package or can be obtained through other interactions with the user. To map the location to a time zone, the delivery system 106 queries the location database 1904. The delivery system 106 then checks if the value returned from the location database 1904 is valid (1906). Checking for validity can be as simple as verifying that the value is non-null, that the value is composed of valid characters, or that the value is the name of a known time zone. If the time zone value is not valid, then the delivery system 106 can assign "?" to the date and day part characteristic (1908). Values other than "?" can also be used to indicate that the value is unknown. Otherwise, the delivery system 106 uses the time zone value to map the server time to local device time (1910). Based on the local device time, the delivery system 106 assigns the date and day part value to the date and day part characteristic (1912). In some embodiments, the delivery system 106 can also assign a confidence score to the date and day part characteristic. Once the value is derived, the delivery system 106 can update the user's profile in the user profile database 120 and/or use the data during the session to aid in selecting appropriate invitational content.

After completing the derivation method 1900, there are a number of cases in which the delivery system 106 may need to repeat this action. Such scenarios include, but are not limited to, at the end of method 1900 the date and day part characteristic is still unknown, an assigned confidence score is less than a threshold value, the user's location changed, and/or a specified period of time has expired.

Figure 20:
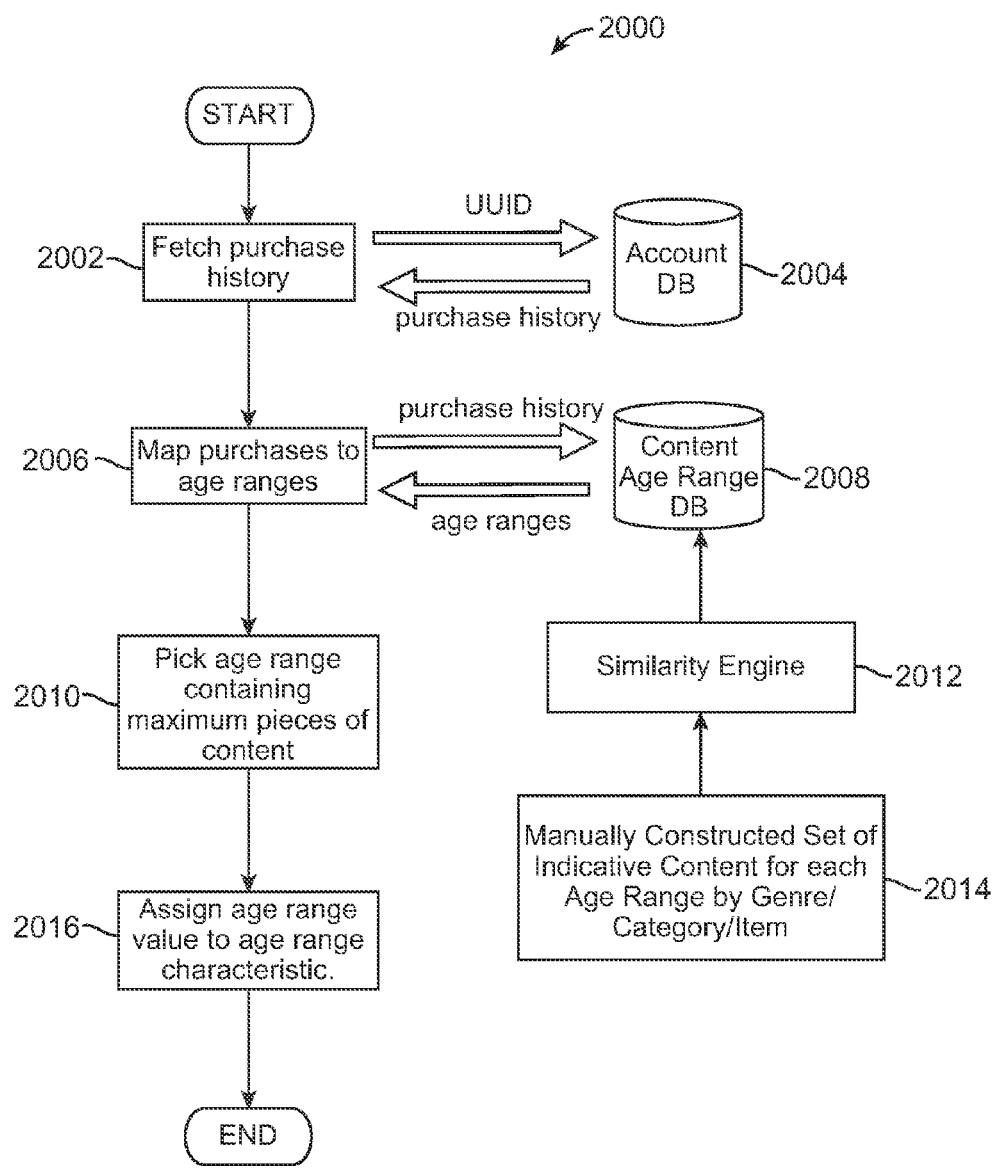
FIG. 20 illustrates an exemplary method for deriving an age range user characteristic value.

FIG. 20 illustrates another example of deriving an uncertain user characteristic value. The method 2000 in FIG. 20 can be used to derive an age range characteristic value. The derivation method 2000 begins at 2002 where the delivery system 106 fetches the purchase history from an account database 2004. The account database 2004 could be the user profile database 120 or it could be another database, such as the ITUNES database maintained by Apple Inc. of Cupertino, Calif., which stores account information. After fetching the purchase history, the delivery system 106 maps the user's purchases to age ranges (2006). To map the purchased content to age ranges, the delivery system 106 queries the content age range database 2008. The content age range database 2008 contains associated age ranges for a variety of content. This database can be populated by first manually constructing sets of representative content for each age range by genre, category, item, etc. (2014). For example, educational apps could be assigned an age range of 5-13. This type of age range classification can be performed for all types of content available for purchase, e.g. apps, music, movies, television shows, books, etc. The representative sets can then be fed to a recommendation system or similarity engine, to expand the set(s) of items (2012).

Using the obtained age ranges for the purchased content, the delivery system 106 picks the age range with maximum pieces of content (2010). For example, if eighty percent of the content purchased is associated with the age range 5-13, then the delivery system 106 picks the 5-13 age range. In some embodiments, the delivery system 106 can be configured to pick an age range based on the age ranges associated with a single type of content. Alternatively, the delivery system 106 can be configured to pick from the age ranges associated with multiple types of content. Finally, the delivery system 106 assigns the selected age range to the age range characteristic (2016).

In some cases, the delivery system may not be able to select a single age range because the user has not purchased any content, the content is evenly distributed across multiple age ranges, or the content distribution does not weigh heavily enough towards one age range. In this case, the delivery system 106 can assign "?" to the age range characteristic. Values other than "?" can also be used to indicate that the value is unknown. In some embodiments, the delivery system 106 can also assign a confidence score to the age range characteristic. Once the value is derived, the delivery system 106 can update the user's profile in the user profile database 120 and/or use the data during the session to aid in selecting appropriate invitational content.

After completing the derivation method 2000, there are a number of cases in which the delivery system 106 may need to repeat this action. Such scenarios include, but are not limited to, at the end of method 2000 the age range characteristic is still unknown, an assigned confidence score is less than a threshold value, the user's purchase history has changed, and/or a specified period of time has expired.

Figure 21:
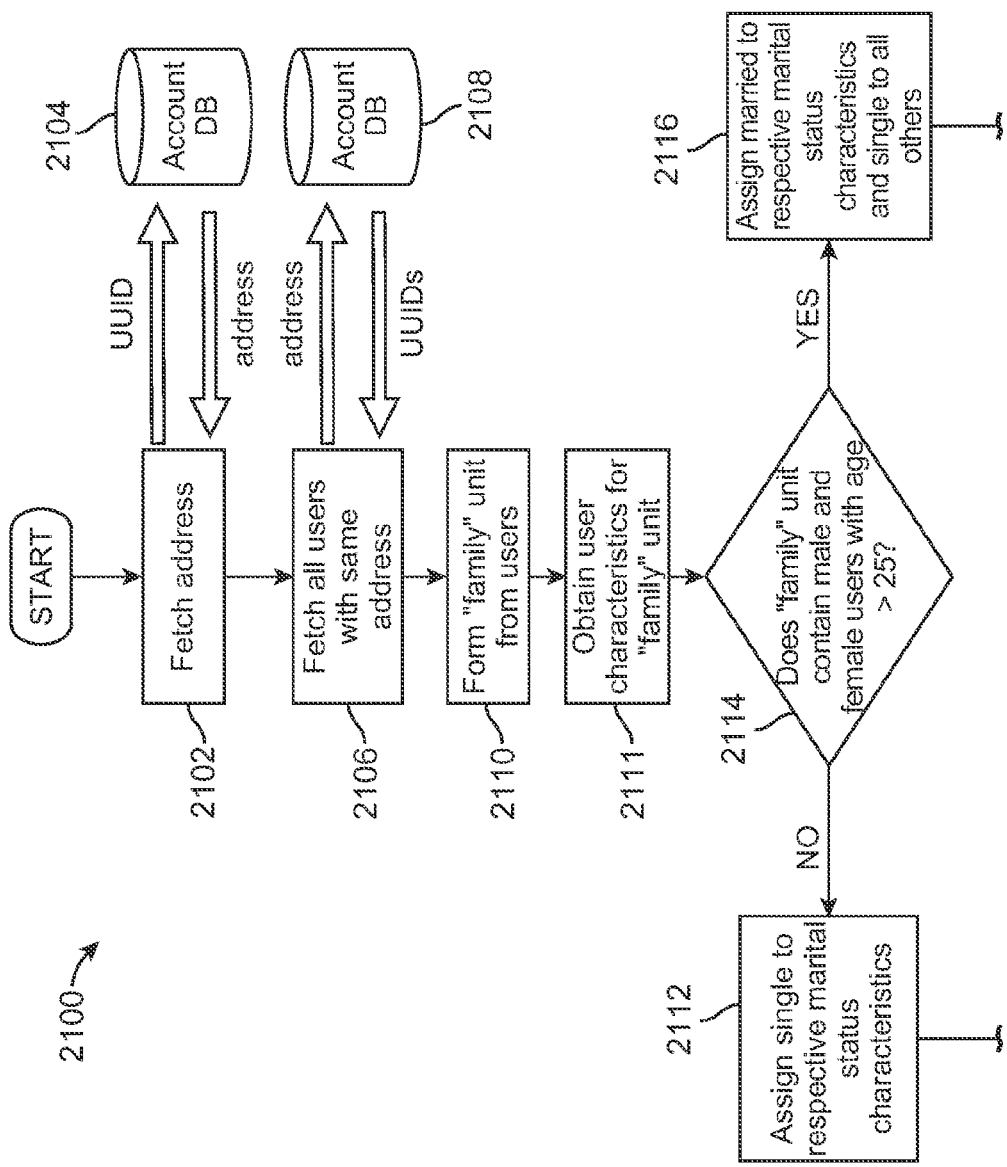
FIG. 21 illustrates an exemplary method for deriving life stage and marital status user characteristic values.
Figure 21:
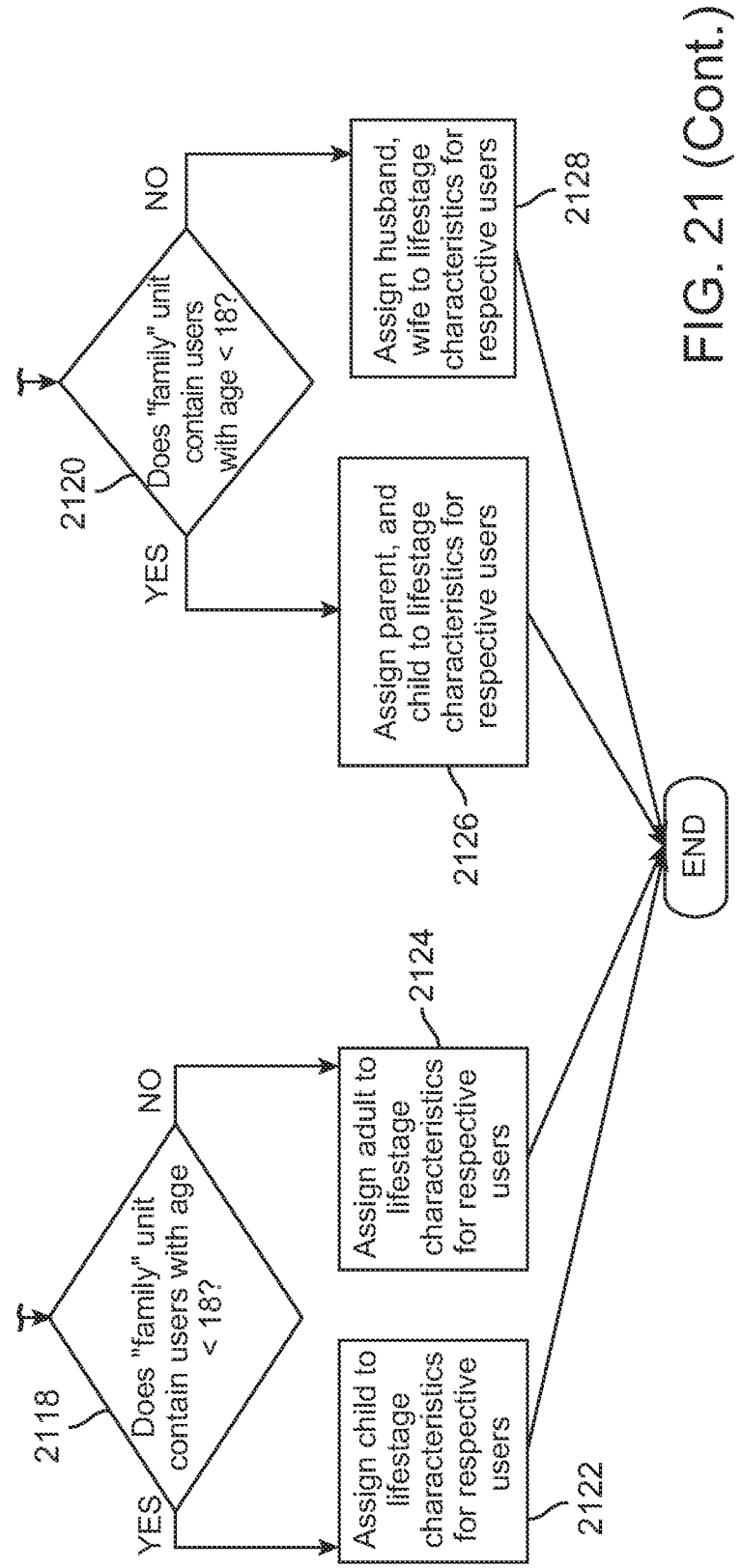

FIG. 21 illustrates another example of deriving an uncertain user characteristic value. The method 2100 in FIG. 21 can be used to derive life stage and marital status characteristic values. The derivation method 2100 begins at 2102, where the delivery system 106 fetches the user's address from an account database 2104. The account database 2104 can be the user profile database 120 or it could be another database, such as the ITUNES database maintained by Apple Inc. of Cupertino, Calif., which stores user account information. The delivery system 106 then fetches all users with the same address from the account database 2108 (2106). The account database 2108 can be the same database as the account database 2104 or it can be another database. After collecting all users with the same address, the delivery system 106 forms a "family" unit from the users (2110). Before the delivery system 106 can characterize the users in the "family" unit, the delivery system 106 has to obtain the user characteristics for each user in the "family" unit (2111). In some embodiments, the delivery system can obtain the user characteristics from the user profile database 120. In some cases, the gender and/or age characteristics may be missing from the user profile. In this case, the delivery system can derive the missing characteristic(s) using the methods 800 or 2000 described above or some other derivation method.

To derive the life stage and marital status characteristic values, the delivery system 106 examines the gender and age characteristics of each of the users in the "family" unit. First, the delivery system 106 checks if the "family" unit contains both a male and female user with age greater than the marital status age threshold, 25 in this example (2114). If the delivery system 106 identifies such users, then they are each assigned a marital status characteristic of married (2116). Any additional, users in the "family" unit can be assigned the marital status characteristic of single. If the check for a male and female user with age greater than the marital status age threshold fails, the delivery system 106 assigns a marital status characteristic value of single to each user in the "family" unit (2112). In this example the marital status age threshold is 25, however, other values can also be used for the threshold value. In some embodiments, the marital status age threshold can vary by geographic region.

After assigning married or single to each user in the "family" unit at step 2116, the delivery system 106 checks for users under the child-age threshold in the "family" unit (2120). If users under the child-age threshold are identified, the delivery system 106 assigns a life stage value of child to these users and a life stage value of parent to the users identified in step 2114 (2126). If no users under the child-age threshold are identified, then husband and wife values are assigned to the life stage characteristics of the users identified in step 2114 (2128). In this example the child-age threshold is 18, however, other values can also be used for the threshold value. The child-age threshold can vary by geographic region.

After assigning single to each user in the "family" unit at step 2112, the delivery system 106 checks for users under the child-age threshold in the "family" unit (2118). If users under the child-age threshold are identified, the delivery system 106 assigns a life stage value of child to these users (2122) and a life stage value of adult to any other users (2124).

In some embodiments, the delivery system 106 can also assign a confidence score to the life stage and marital status characteristic values. Once the value is derived, the delivery system 106 can update the user's profile in the user profile database 120 and/or use the data during the session to aid in selecting appropriate invitational content.

After completing the derivation method 2100, there are a number of cases in which the delivery system 106 may need to repeat this action. Such scenarios include, but are not limited to, at the end of method 2100 the life stage and/or marital status characteristics are still unknown, an assigned confidence score is less than a threshold value, the user characteristics of one or more users in the "family" unit have changed, and/or a specified period of time has expired.

Figure 22:
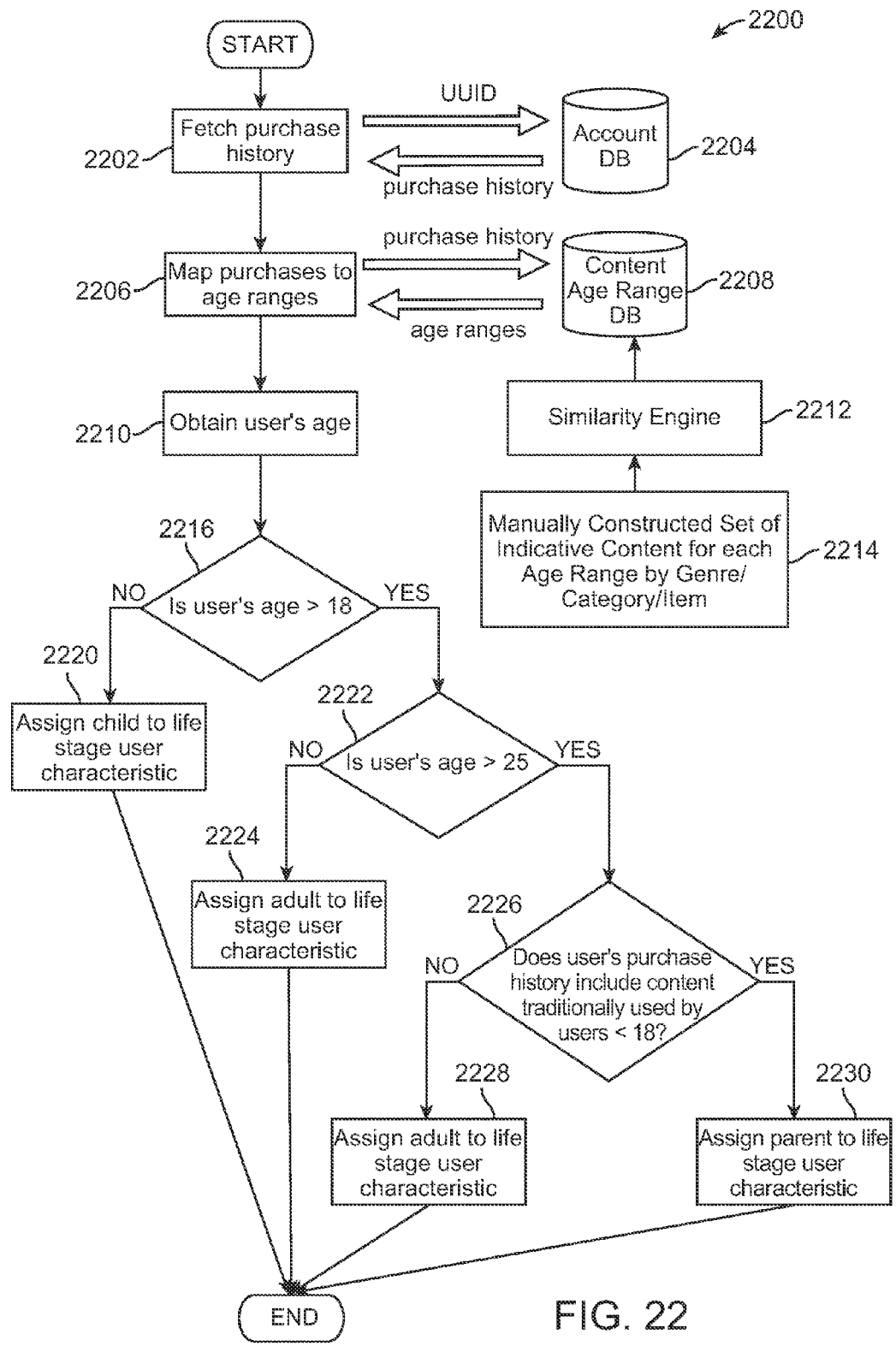
FIG. 22 illustrates an exemplary method for deriving a life stage user characteristic value.

FIG. 22 illustrates another example of deriving an uncertain user characteristic value. The method 2200 in FIG. 22 can be used to derive a life stage user characteristic value. The derivation method 2200 begins at 2202 where the delivery system 106 fetches the purchase history from an account database 2204. The account database 2204 could be the user profile database 120 or it could be another database, such as the ITUNES database maintained by Apple Inc. of Cupertino, Calif., which stores account information. After fetching the purchase history, the delivery system 106 maps the user's purchases to age ranges (2206). To map the purchased content to age ranges, the delivery system 106 queries the content age range database 2208. The content age range database 2208 contains associated age ranges for a variety of content. This database can be populated by first manually constructing sets of representative content for each age range by genre, category, item, etc. (2214). For example, educational apps could be assigned an age range of 5-13. This type of age range classification can be performed for all types of content available for purchase, e.g. apps, music, movies, television shows, books, etc. The representative sets can then be fed to a recommendation system or similarity engine, to expand the set(s) of items (2212).

The delivery system 106 also obtains the user's age (2210). In some cases, the delivery system 106 can obtain this information from the user profile database, from an account database, or by deriving the value from other user characteristic values known about the user. To derive the user's age, the delivery system can use method 2000 in FIG. 20 above or any other method for deriving a user's age. Once the delivery system has the user's age, the delivery system 106 checks if the user's age is greater than the child-age threshold (2216). If the user is under the child-age threshold, the delivery system 106 assigns child to the life stage user characteristic for the user (2220). In this example the child-age threshold is 18, however, other values can also be used for the threshold value. The child-age threshold can vary by geographic region.

If the user is over the child-age threshold value, the delivery system 106 checks if the user is over the parent-age threshold (2222). If the user is over the child-age threshold, but under the parent-age threshold, the delivery system 106 assigns adult to the life stage user characteristic for the user (2224). If the user is over the parent-age threshold, the delivery system 106 examines the user's purchase history, which has associated age classifications, to determine if the purchase history includes content traditionally used by user's under 18 (2226). If so the, the delivery system 106 assigns a life stage value of parent to the user (2230). If not, the delivery system 106 assigns a life stage value of adult to the user (2228). In this example the parent-age threshold is 25, however, other ages can be used to demarcate the adult and parent boundaries. Additionally, the parent-age threshold can vary by geographic region.

In some embodiments, the delivery system 106 can also assign a confidence score to the life stage characteristic. Once the value is derived, the delivery system 106 can update the user's profile in the user profile database 120 and/or use the data during the session to aid in selecting appropriate invitational content.

After completing the derivation method 2200, there are a number of cases in which the delivery system 106 may need to repeat this action. Such scenarios include, but are not limited to, at the end of method 2200 the life stage characteristic is still unknown, an assigned confidence score is less than a threshold value, the age and/or purchase history of the user have changed, and/or a specified period of time has expired.

Figure 23:
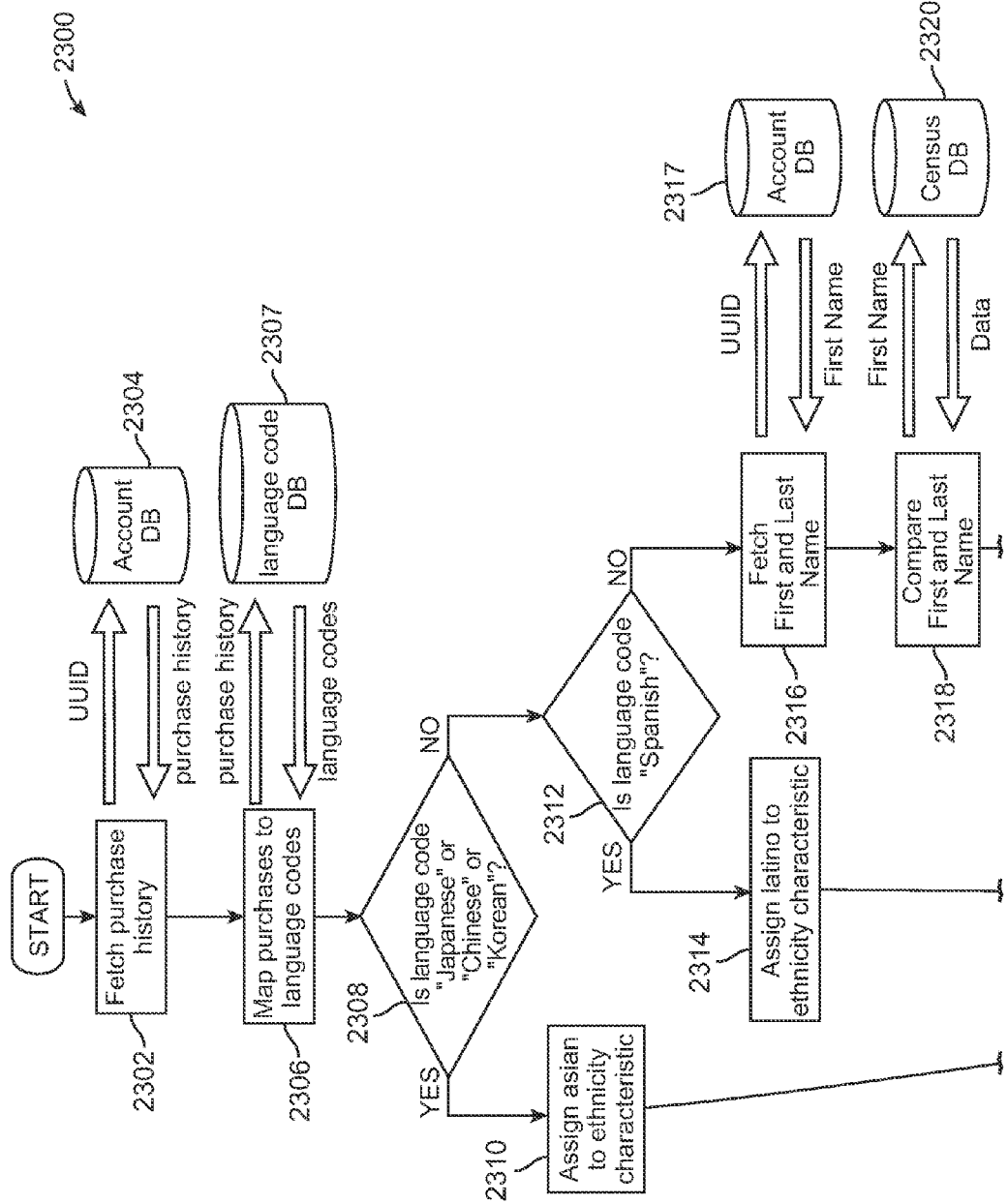
FIG. 23 illustrates an exemplary method for deriving an ethnicity user characteristic value.
Figure 23:
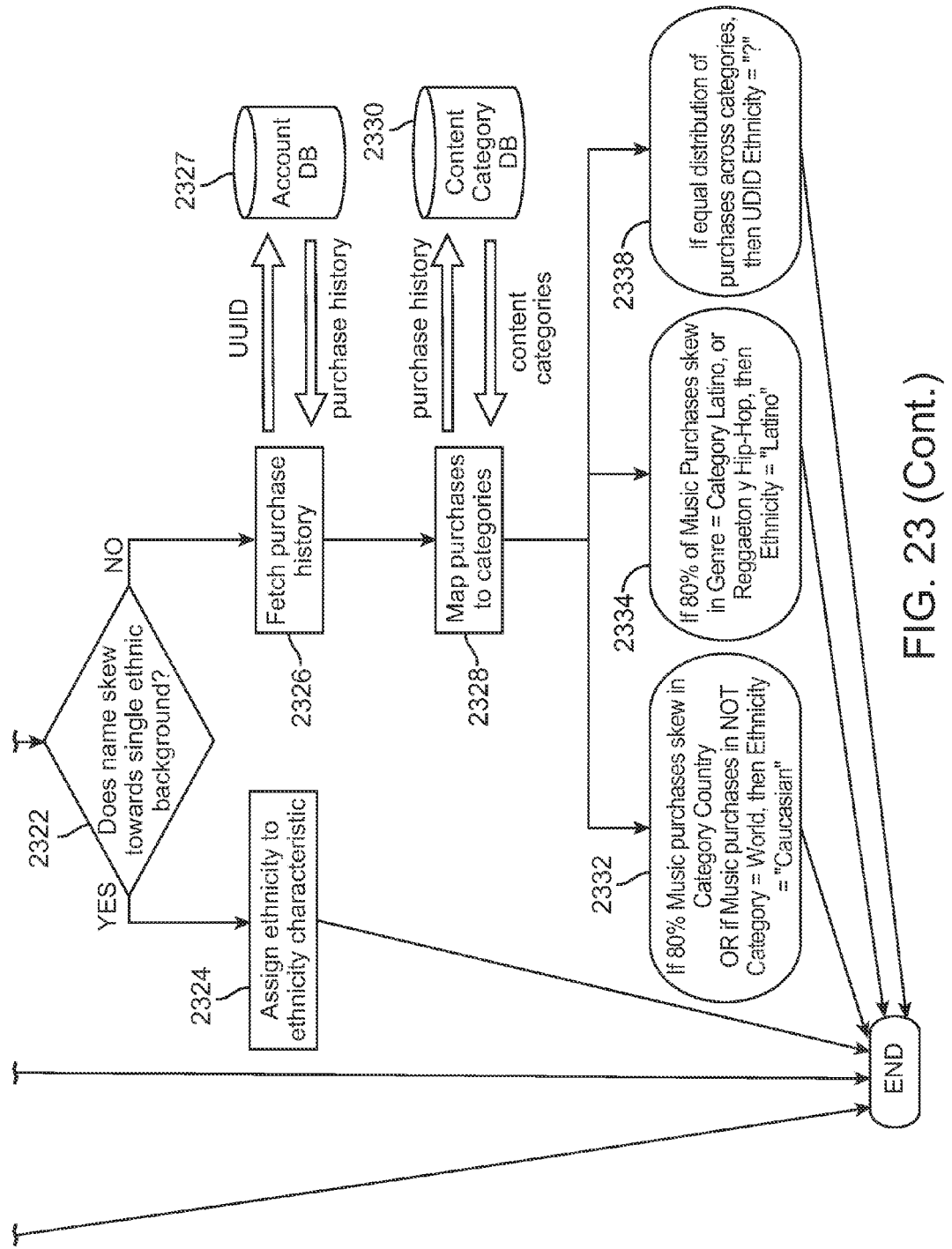

FIG. 23 illustrates another example of deriving an uncertain user characteristic value. The method 2300 in FIG. 20 can be used to derive an ethnicity characteristic value. The derivation method 2300 begins at 2302 where the delivery system 106 fetches the purchase history from an account database 2304. The account database 2304 could be the user profile database 120 or it could be another database, such as the ITUNES database maintained by Apple Inc. of Cupertino, Calif., which stores account information. After fetching the purchase history, the delivery system 106 maps the user's purchases to language codes (2306). To map the purchased content to language codes, the delivery system 106 queries the language code database 2307. The language code database 2307 can again be another database, such as the ITUNES database maintained by Apple Inc. of Cupertino, Calif., or any other database or multiple databases with such information. In some embodiments, the delivery system 106 may not need to perform step 2307 because the purchase history will already contain the associated language codes.

After obtaining the language codes, the delivery system 106 checks if the language codes are Japanese, Chinese, or Korean (2308). If the check at step 2308 is true, the delivery system 106 assigns Asian to the ethnicity characteristic (2310) and the derivation method is complete. However, if the check at step 2308 fails, the delivery system 106 checks if the language codes are Spanish (2312). If the check at step 2312 is true, the delivery system 106 assigns Latino to the ethnicity characteristic (2314) and the derivation method is complete.

If the check at step 2312 fails, the delivery system 106 can draw on other user characteristics to derive the ethnicity characteristic. First, the delivery system 106 fetches the user's first and last name from the account database 2317 (2316). In some embodiments, the account database 2317 can be the same database as account database 2304. Alternatively, the account database 2317 can be a separate database that stores user account information. The delivery system 106 then compares the user's first and last name at step 2318 with the U.S. Census database 2320, or any other census database. Using the Census data, the delivery system 106 checks if the data skews towards one single ethnic background (2322). If the data does lean towards a single ethnic background, the delivery system 106 assigns the ethnicity value to the ethnicity characteristic (2324). In some embodiments, the delivery system 106 can assign a confidence score to the ethnicity value at this point based on how heavily the data is skewed towards a single ethnic background.

If the census data does not skew towards a single ethnic background, the delivery system 106 can then examine the user's music purchase history to attempt to derive the user's ethnicity. First, the delivery system 106 fetches the user's music purchase history from the account database 2327 (2326). In some embodiments, the account database 2327 can be the same database as account database 2304 and/or account database 2317. In some embodiments, the delivery system 106 can skip step 2326 and instead extract the music purchase history from the purchase history information obtained in step 2302. Once the delivery system 106 obtains the music purchase history, the delivery system 106 maps it to content categories (2328), such as Country, Hip-Hop, Latino, World, etc. The mapping is accomplished by querying a content category database 2030. If the music purchase history indicates that 80% of purchases are in the Country music category or the music purchase history does not include any music from the World music category, then the delivery system 106 assigns Caucasian to the ethnicity characteristic (2332). If the purchase history indicates that 80% of purchases are in the Latino music category then the delivery system 106 assigns Latino to the ethnicity characteristic (2334). Otherwise, the delivery system 106 assigns "?" to the ethnicity characteristic (2338). Values other than "?" can also be used to indicate that the value is unknown. In some embodiments, other rules for analyzing the music categories to infer ethnicity can also be used.

In some embodiments, the delivery system 106 can also assign a confidence score to the ethnicity characteristic. Once the value is derived, the delivery system 106 can update the user's profile in the user profile database 120 and/or use the data during the session to aid in selecting appropriate invitational content.

After completing the derivation method 2300, there are a number of cases in which the delivery system 106 may need to repeat this action. Such scenarios include, but are not limited to, at the end of method 2300 the ethnicity characteristic is still unknown, an assigned confidence score is less than a threshold value, the user's purchase history has changed, and/or a specified period of time has expired.

Figure 24:
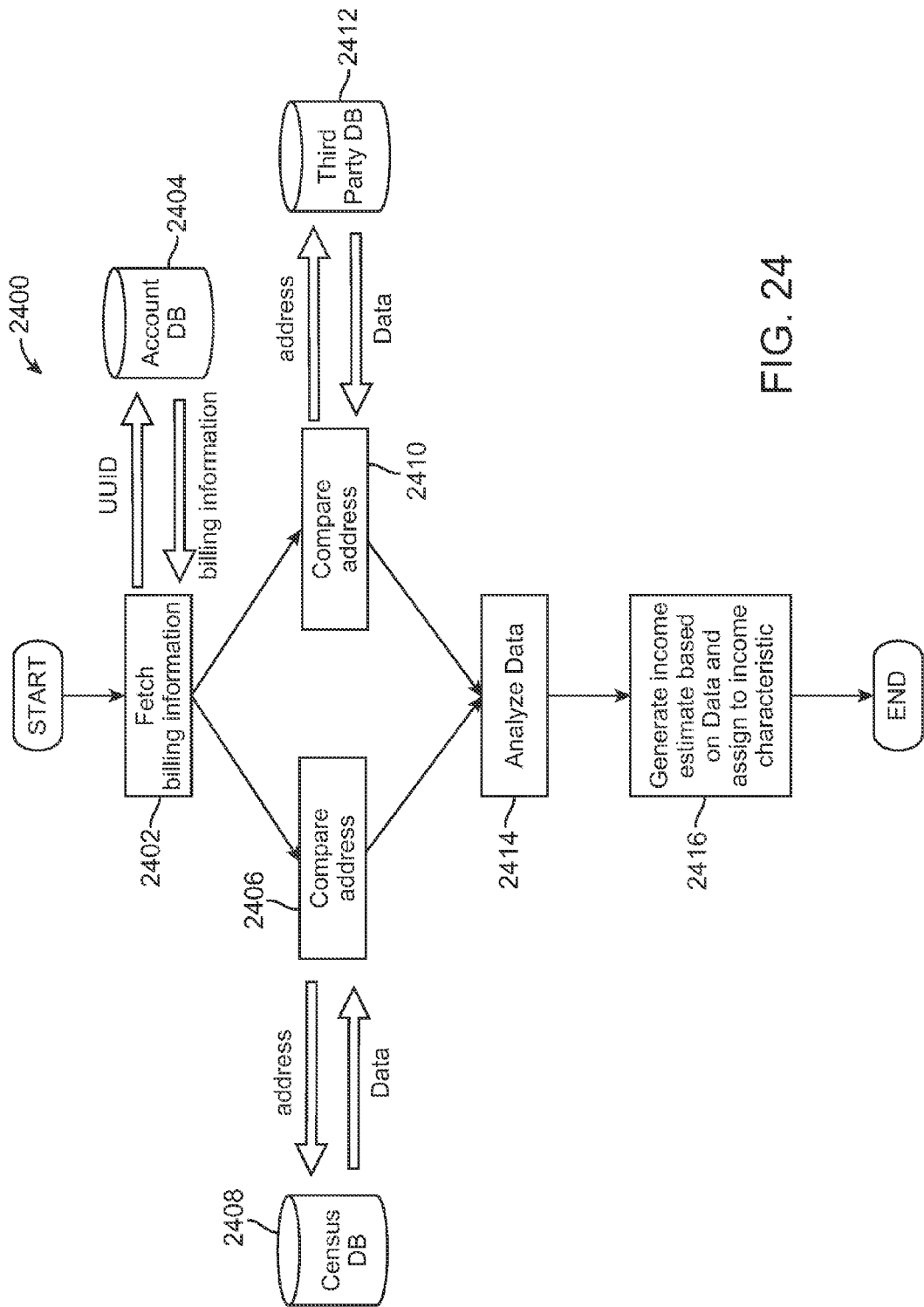
FIG. 24 illustrates an exemplary method for deriving an income user characteristic value.

FIG. 24 illustrates another example of deriving an uncertain user characteristic value. The method 2400 in FIG. 24 can be used to derive an income characteristic value. The derivation method 2400 begins at 2402, where the delivery system 106 fetches the user's billing information from an account database 2404. The account database 2404 can be the user profile database 120 or it could be another database, such as the ITUNES database maintained by Apple Inc. of Cupertino, Calif., which stores user account information. The delivery system 106 then compares the user's billing information at step 2406 with the U.S. Census database 2408, or any other census database, to obtain data on average income levels where the user lives. The delivery system 106 can also compare the user's billing information with one or more other third party databases 2412 (2410) to gather more data on income levels where the user lives. After obtaining data from a variety of sources, the delivery system 106 analyzes the data at step 2414. Based on the analysis, the delivery system generates an income estimate for the user and assigns it to the income characteristic (2416).

In some embodiments, the delivery system can use other information to infer the user's income. For example, if the delivery system 106 has access to the user's occupation this information could aid in refining an estimate of the user's income. Purchase history could also possibly aid in deriving the user's income.

In some embodiments, the delivery system 106 can also assign a confidence score to the income characteristic. Once the value is derived, the delivery system 106 can update the user's profile in the user profile database 120 and/or use the data during the session to aid in selecting appropriate invitational content.

After completing the derivation method 2400, there are a number of cases in which the delivery system 106 may need to repeat this action. Such scenarios include, but are not limited to, at the end of method 2400 the income characteristic is still unknown, an assigned confidence score is less than a threshold value, the user's account information has changed, and/or a specified period of time has expired.

Figure 25:
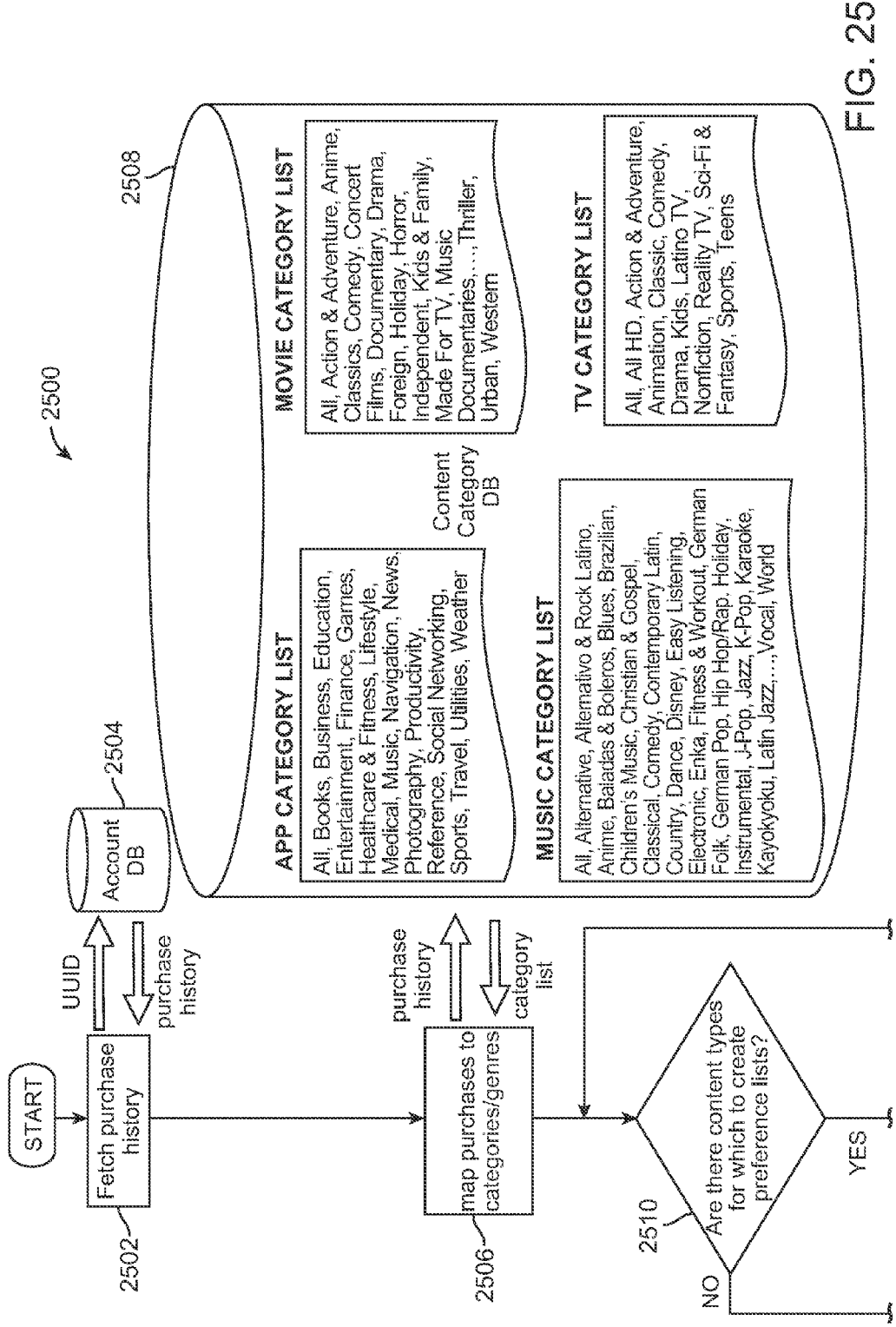
FIG. 25 illustrates an exemplary method for deriving a preferred purchase category user characteristic value.
Figure 25:
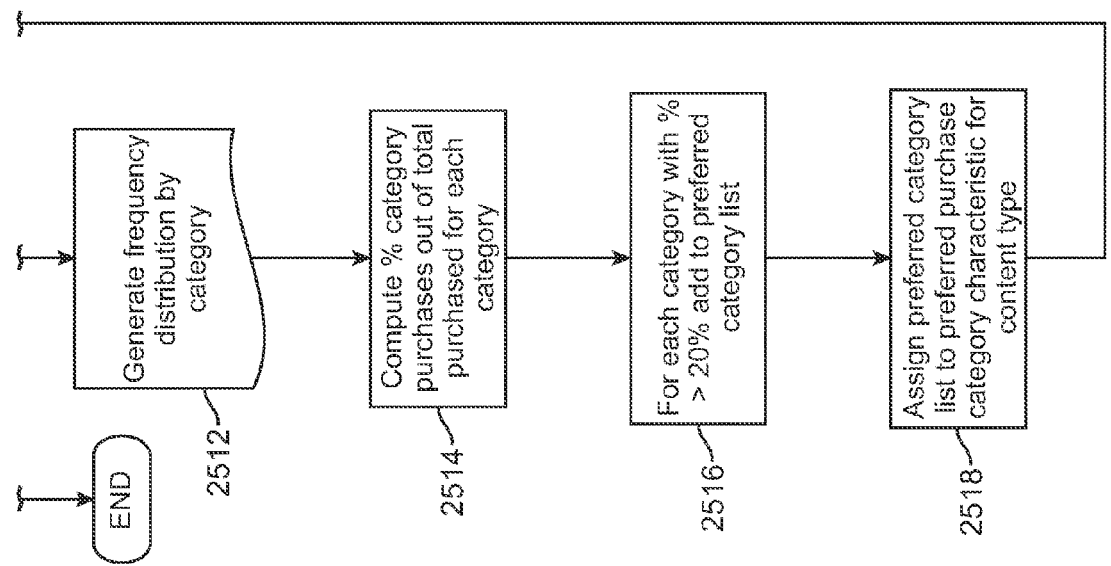

FIG. 25 illustrates another example of deriving an uncertain user characteristic value. The method 2500 in FIG. 25 can be used to derive a preferred purchase categories characteristic value. The derivation method 2500 begins at 2502 where the delivery system 106 fetches the purchase history from an account database 2504. The account database 2504 could be the user profile database 120 or it could be another database, such as the ITUNES database maintained by Apple Inc. of Cupertino, Calif., which stores account information. After fetching the purchase history, the delivery system 106 maps the purchased content to categories/genres (2506). To map the purchased content to categories/genres, the delivery system 106 queries the content category database 2508. The content category database 2508 can be another database, such as the ITUNES database maintained by Apple Inc. of Cupertino, Calif., or any other database or multiple databases with such information. Using the category mapping, the delivery system 106 examines the user's preferred purchase categories for each content type independently, e.g. apps, music, movies, television shows, etc. At step 2510, the delivery system checks if there are content types for which the system still needs to create a preference list. If there are, the delivery system 106 generates a frequency distribution for the purchases for the content type, e.g. app, by category at step 2512. Then the delivery system 106 computes the percentages each category represents out of the total purchases for the content type (2514). For example, if the app categories were social networking and sports, the delivery system would determine what percentage of app purchase were social networking apps and what percentage where sports apps. Then for each of the categories the delivery system adds the category to the preferred categories list if the percentage computed at step 2514 is greater than 20% (2516). In some embodiments, a higher or lower percentage can be used when determining whether a particular category should be considered preferred. Finally, the system assigns the list of preferred categories to the preferred categories characteristic for that content type (2518). After assigning the values to the characteristic, the delivery system loops back to step 2510 to check if there are other content types to process.

In some embodiments, the delivery system 106 can also assign a confidence score to the one or more preferred purchase categories characteristics. Once the value is derived, the delivery system 106 can update the user's profile in the user profile database 120 and/or use the data during the session to aid in selecting appropriate invitational content.

After completing the derivation method 2500, there are a number of cases in which the delivery system 106 may need to repeat this action. Such scenarios include, but are not limited to, at the end of method 2500 one or more preferred purchase category characteristics is still unknown, an assigned confidence score is less than a threshold value, the user's purchase history has changed, and/or a specified period of time has expired.

Figure 26:
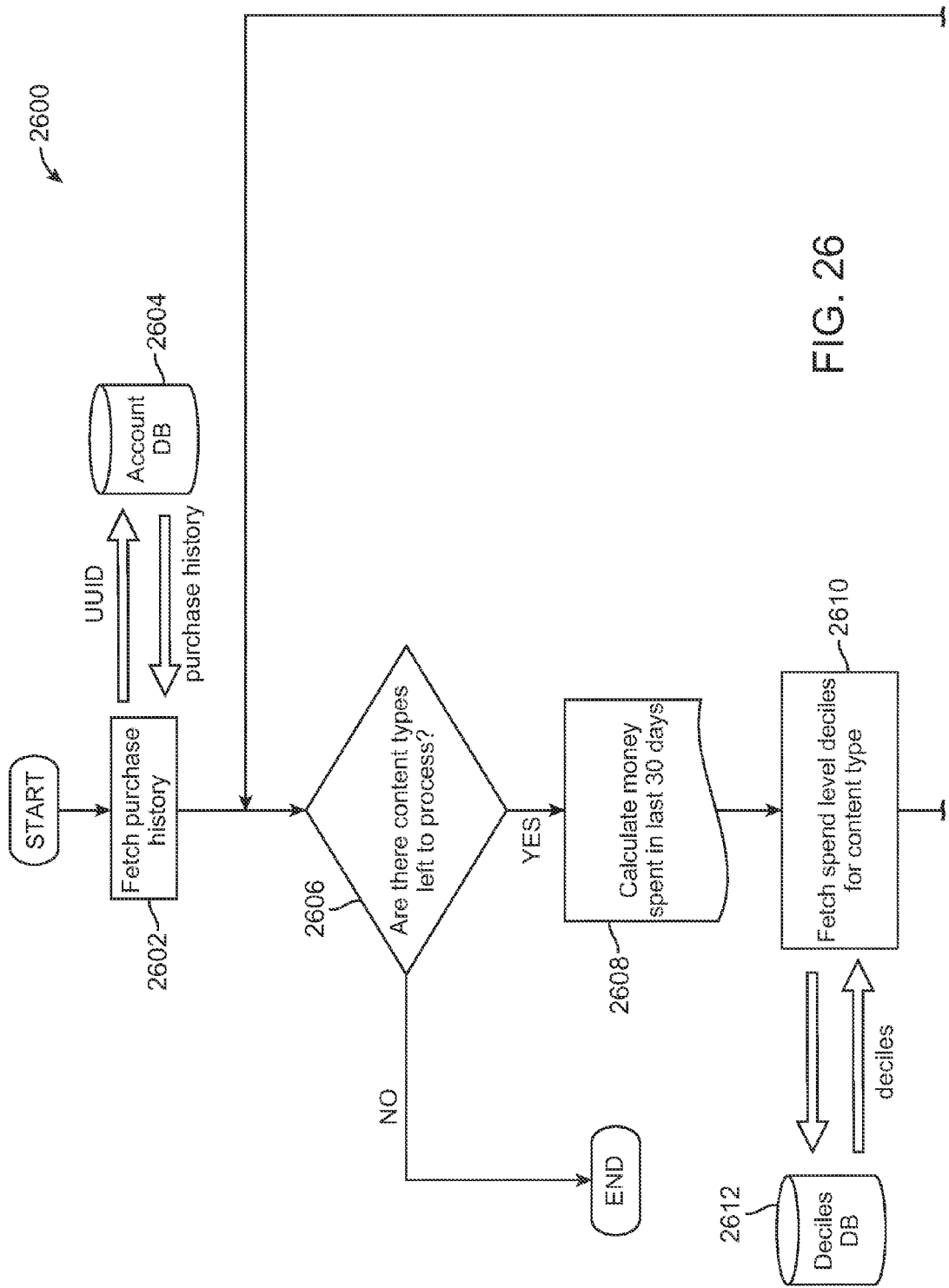
FIG. 26 illustrates an exemplary method for deriving a spend level user characteristic value.
Figure 26:
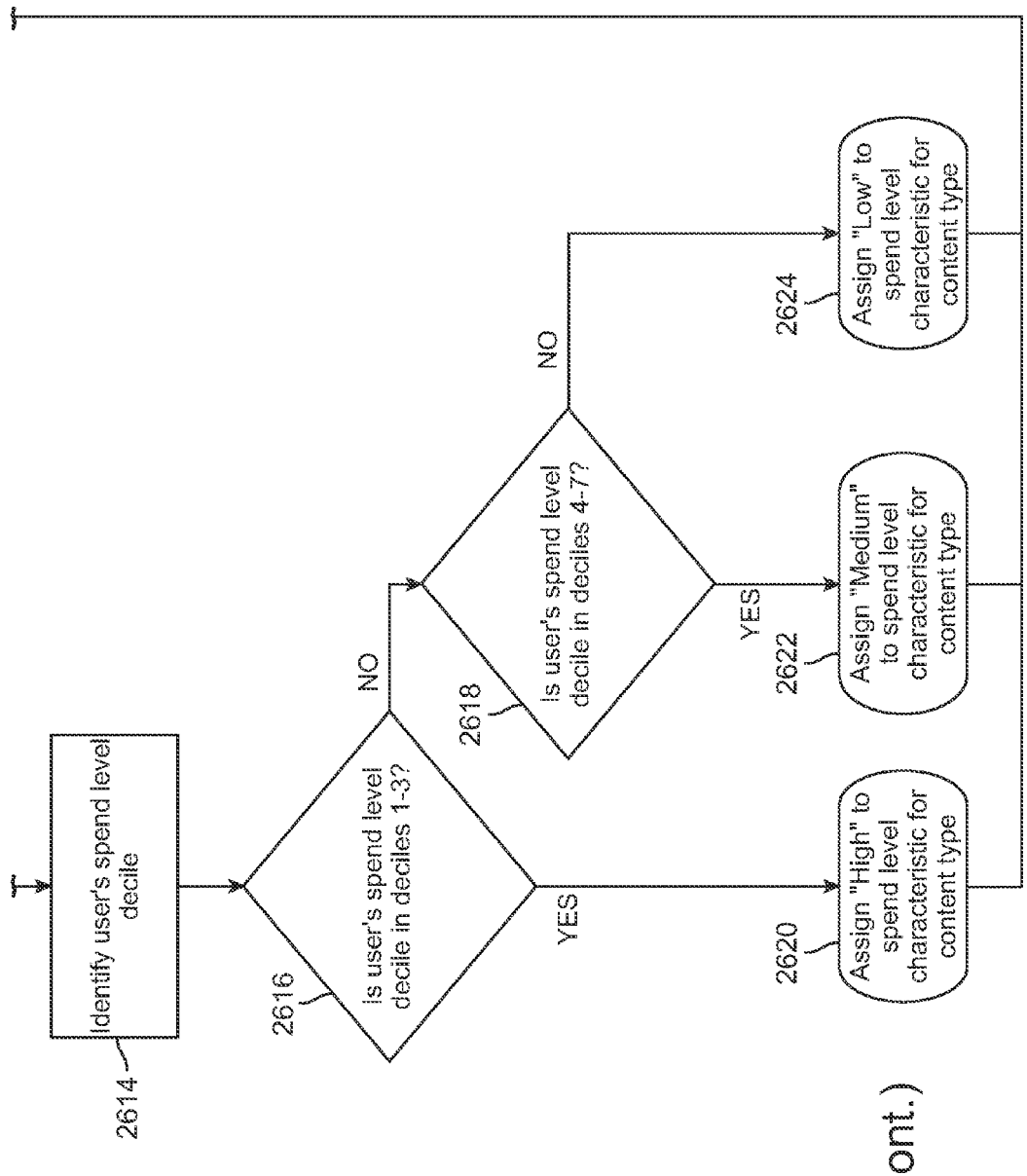

FIG. 26 illustrates another example of deriving an uncertain user characteristic value. The method 2600 in FIG. 26 can be used to derive a spend level characteristic value. The derivation method 2600 begins at 2602 where the delivery system 106 fetches the purchase history from an account database 2604. The account database 2604 could be the user profile database 120 or it could be another database, such as the ITUNES database maintained by Apple Inc. of Cupertino, Calif., which stores account information. At step 2606, the delivery system checks if there are content types for which the spend level characteristic still needs to be derived. If there are, the delivery system 106 calculates the total amount spent over the last 30 days for that content type, e.g. music (2608). In some embodiments, other time periods can also be used. For example the spend level can be based on a 1 year time period, 6 months, 1 week, etc.

In some embodiments, the spend level characteristic can be a relative characteristic where deciles are generated based on the spending habits of other users or deciles are generated based on a predefined scale. In either case, the delivery system 106 fetches the spend level deciles for the content type from the deciles database 2612 (2610). The deciles database 2612 can be the same database as the account database 2604 or any other database or even multiple databases. In some embodiments, the deciles database 2612 can be different databases for the different content types. After the delivery system 106 has calculated the amount spent by the user and obtained the spend level deciles, the delivery system 106 identifies the decile to which the user belongs (2614). In some embodiments, the deciles can be ranked and assigned numbers such as decile 1, decile 2, etc. In some embodiments, the deciles are simply ranges.

Once the delivery system 106 has identified the user's decile, the delivery system 106 checks if the user's decile is in the top 1-3 deciles (2616). If so, the delivery system 106 assigns "high" to the spend level characteristic for the content type, e.g. music spend level characteristic (2620). If the user is not in deciles 1-3, then the delivery system 106 checks if the user's decile is 4-7 (2618). If so, the delivery system 106 assigns "medium" to the user's spend level for the content type (2622). If the user is not in deciles 1-3 or 4-7 then the delivery system assigns "low" to the spend level characteristic for the content type (2624).

In some embodiments, the spend level characteristic can be derived for each category/genre of the content type. For example, the user's spend level can be calculated for each music genre, e.g. country music category spend level, reggae music category spend level, etc. In some embodiments, the spend level characteristic can be derived for all content types together.

In some embodiments, the delivery system 106 can also assign a confidence score to the one or more spend level characteristics. Once the value is derived, the delivery system 106 can update the user's profile in the user profile database 120 and/or use the data during the session to aid in selecting appropriate invitational content.

After completing the derivation method 2600, there are a number of cases in which the delivery system 106 may need to repeat this action. Such scenarios include, but are not limited to, at the end of method 2600 one or more spend level characteristics is still unknown, an assigned confidence score is less than a threshold value, the user's purchase history has changed, and/or a specified period of time has expired.

Figure 27:
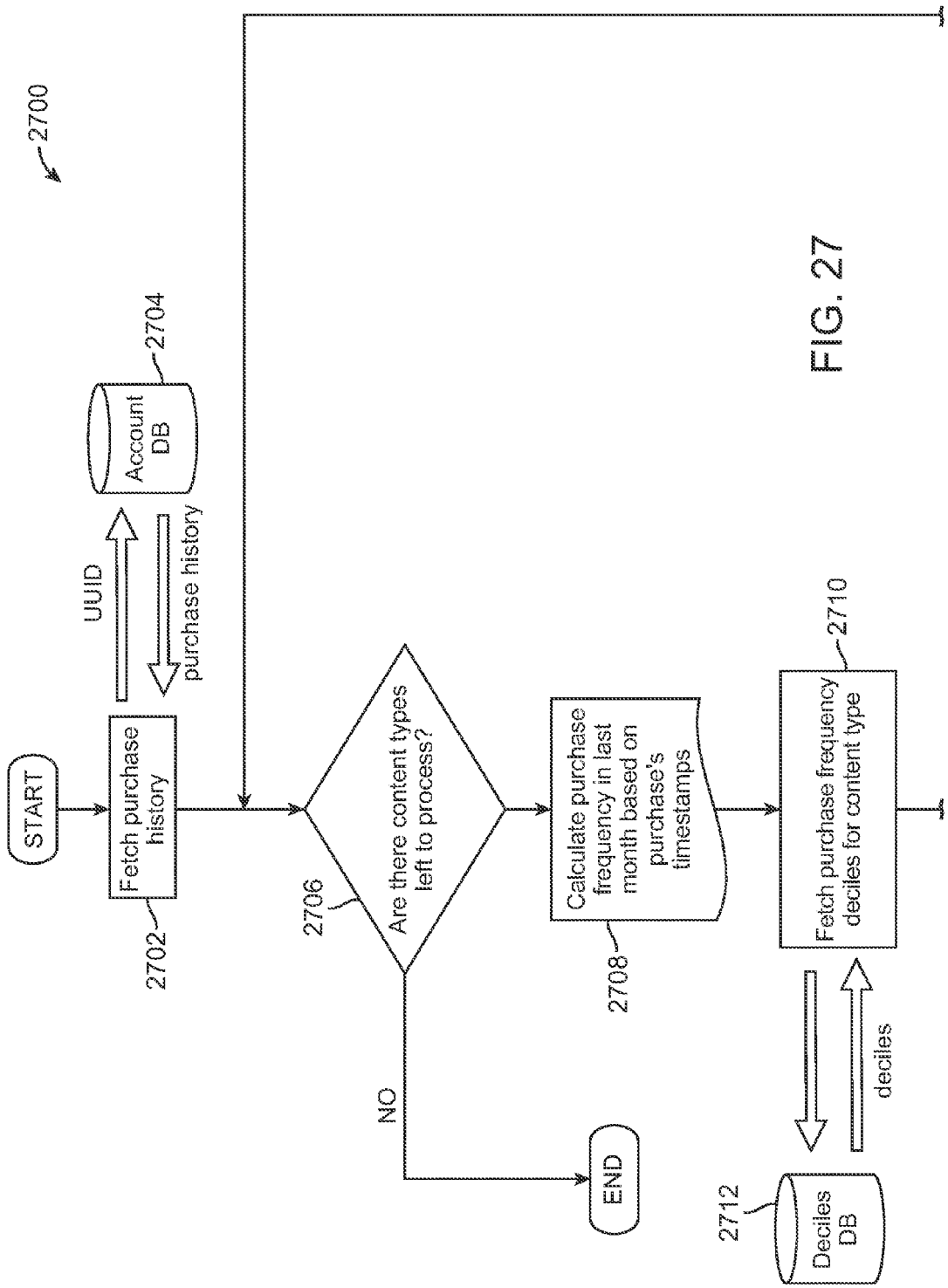
FIG. 27 illustrates an exemplary method for deriving a purchase frequency user characteristic value.
Figure 27:
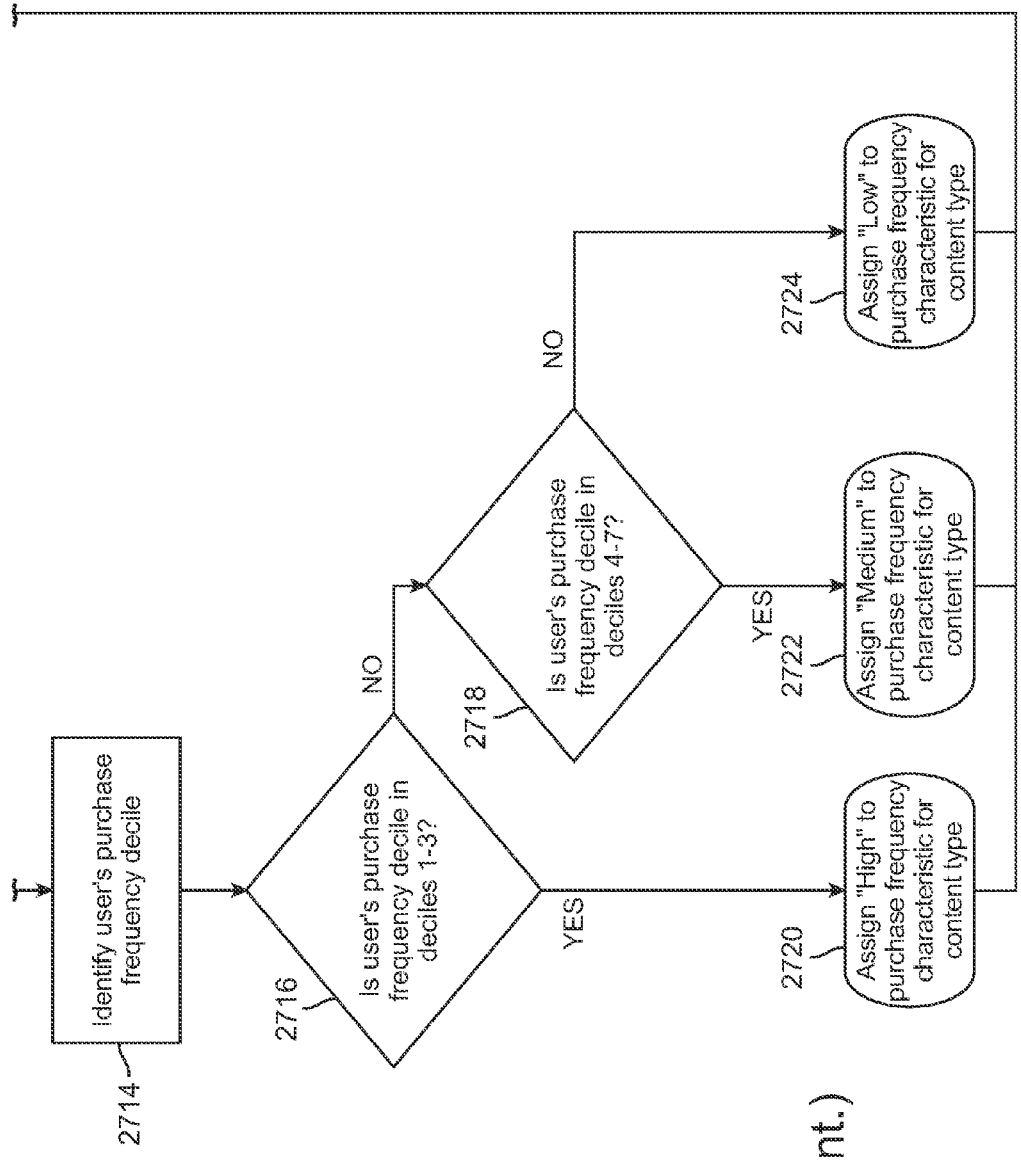

FIG. 27 illustrates another example of deriving an uncertain user characteristic value. The method 2700 in FIG. 27 can be used to derive a purchase frequency characteristic value. The derivation method 2700 begins at 2702 where the delivery system 106 fetches the purchase history from an account database 2704. The account database 2704 could be the user profile database 120 or it could be another database, such as the ITUNES database maintained by Apple Inc. of Cupertino, Calif., which stores account information. At step 2706, the delivery system checks if there are content types for which the purchase frequency characteristic still needs to be derived. If there are, the delivery system 106 calculates the purchase frequency based on the purchase's timestamps over the last month for that content type (2708). In some embodiments, other time periods can also be used. For example the purchase frequency can be based on a 1 year time period, 6 months, 1 week, etc.

In some embodiments, the purchase frequency characteristic can be a relative characteristic where deciles are generated based on the purchasing habits of other users or deciles can be generated based on a predefined scale. In either case, the delivery system 106 fetches the purchase frequency deciles for the content type from the deciles database 2712 (2710). The deciles database 2712 can be the same database as the account database 2704 or any other database or even multiple databases. In some embodiments, the deciles database 2712 can be different databases for the different content types.

After the delivery system 106 has calculated the purchase frequency by the user and obtained the purchase frequency deciles, the delivery system 106 identifies the decile to which the user belongs (2714). In some embodiments, the deciles can be ranked and assigned numbers such as decile 1, decile 2, etc. In some embodiments, the deciles are simply ranges.

Once the delivery system 106 has identified the user's decile, the delivery system 106 checks if the user's decile is in the top 1-3 deciles (2716). If so, the delivery system 106 assigns "high" to the purchase frequency characteristic for the content type, e.g. music purchase frequency characteristic (2720). If the user is not in deciles 1-3, then the delivery system 106 checks if the user's decile is 4-7 (2718). If so, the delivery system 106 assigns "medium" to the user's purchase frequency for the content type (2722). If the user is not in deciles 1-3 or 4-7 then the delivery system assigns "low" to the purchase frequency characteristic for the content type (2724).

In some embodiments, the purchase frequency characteristic can be derived for each category/genre of the content type. For example, the user's purchase frequency can be calculated for each music genre, e.g. country music category purchase frequency, reggae music category purchase frequency, etc. In some embodiments, the purchase frequency characteristic can be derived for all content types together.

In some embodiments, the delivery system 106 can also assign a confidence score to the one or more purchase frequency characteristics. Once the value is derived, the delivery system 106 can update the user's profile in the user profile database 120 and/or use the data during the session to aid in selecting appropriate invitational content.

After completing the derivation method 2700, there are a number of cases in which the delivery system 106 may need to repeat this action. Such scenarios include, but are not limited to, at the end of method 2700 one or more purchase frequency characteristics is still unknown, an assigned confidence score is less than a threshold value, the user's purchase history has changed, and/or a specified period of time has expired.

Figure 28:
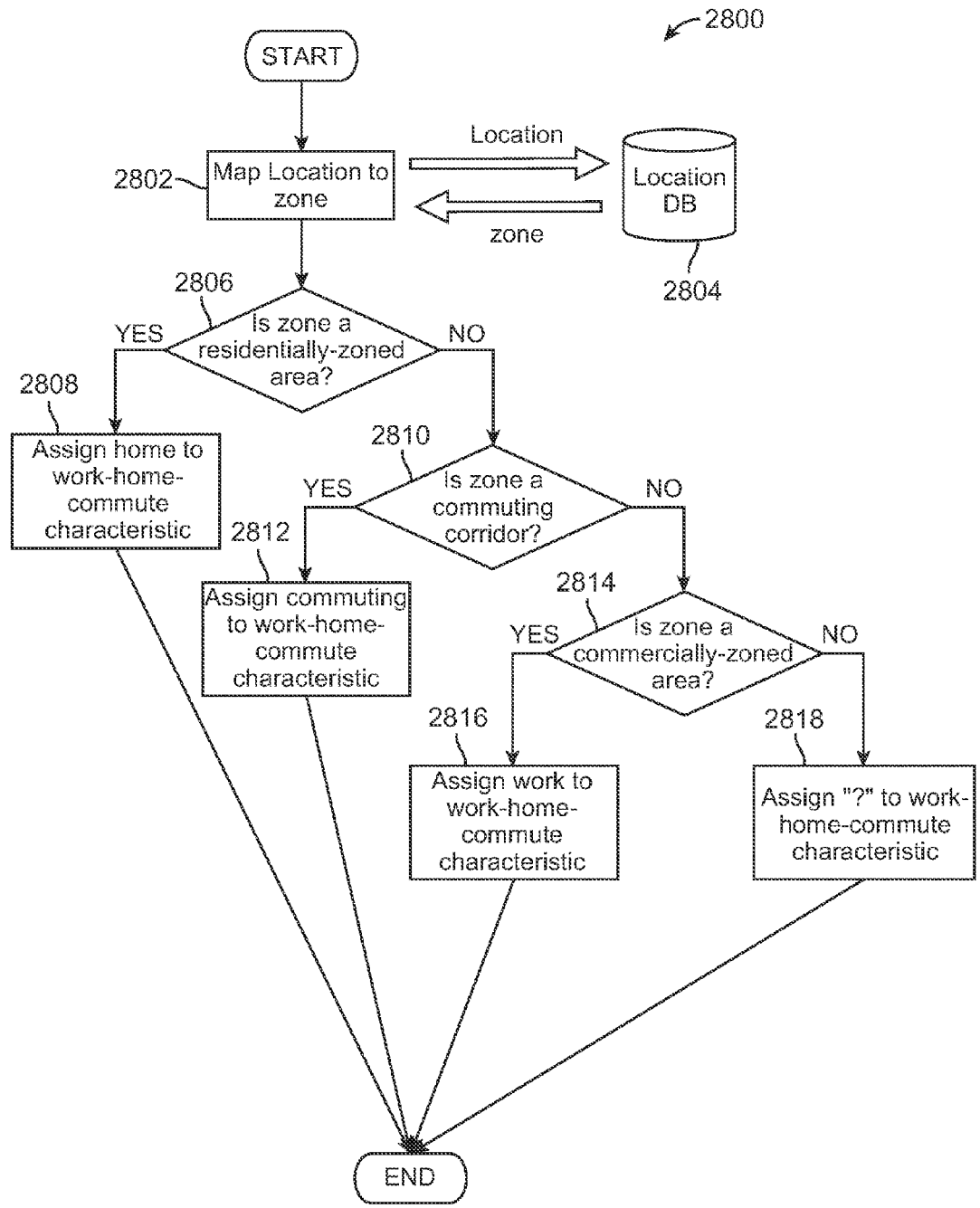
FIG. 28 illustrates an exemplary method for deriving a work-home-commute user characteristic value.

FIG. 28 illustrates another example of deriving an uncertain user characteristic value. The method 2800 in FIG. 28 can be used to derive a work-home-commute characteristic value. The derivation method 2800 begins at 2802, where the delivery system 106 maps the user's current location to a zone within a map of residentially-zoned areas, commuting corridors, and commercially-zoned areas. In some embodiments, the user's location can be provided as a latitude and/or longitude value, however, other methods of expressing location are also possible. The location value can be provided as part of the request for a content package or can be obtained through other interaction with the user. To map the location to a zone, the delivery system 106 queries the location database 2804. The delivery system 106 then checks if the value returned from the location database 2804 is a residentially-zoned area (2806). If so, the delivery system 106 assigns the value "home" to the work-home-commute characteristic (2808). If the user's zone is not in a residentially-zoned area, the delivery system 106 checks if the user's zone is in a commuting corridor (2810). If so, the delivery system 106 assigns the value "commuting" to the work-home-commute characteristic (2812). If not, the delivery system 106 checks if the user's zone is in a commercially-zoned area (2814). If so, the delivery system 106 assigns the value work to the work-home-commute characteristic (2816). If not, the delivery system 106 assigns the value "?" to the work-home-commute characteristic (2818). Values other than "?" can also be used to indicate that the value is unknown.

In some embodiments, the delivery system 106 can also assign a confidence score to the work-home-commute characteristic. Once the value is derived, the delivery system 106 can update the user's profile in the user profile database 120 and/or use the data during the session to aid in selecting appropriate invitational content.

After completing the derivation method 2800, there are a number of cases in which the delivery system 106 may need to repeat this action. Such scenarios include, but are not limited to, at the end of method 2800 the work-home-commute characteristic is still unknown, an assigned confidence score is less than a threshold value, the user's location changed, and/or a specified period of time has expired.

In some embodiments, the delivery system 106 is configured to permit content providers 109 and 110 to create custom targeted segments. Accordingly, a user interface (UI) can be provided for communicating with a user interface module 111 for performing such tasks. The UI for UI module 111 can be accessed via an end user terminal in communication with the delivery system 106. For example, the end user terminal can be a user interface device associated with any of content providers 109 and 110. The UI and UI module 111 can be configured to operate in a variety of client modes, including a fat client mode, a thin client mode, or a hybrid client mode, depending on the storage and processing capabilities of the delivery system 106 and/or the end user terminal. Therefore, a UI for UI module 111 can be implemented as a standalone application operating at the end user terminal in some embodiments. In other embodiments, a web browser-based portal can also be used to provide the UI for the UI module 111. Any other configuration to remotely or locally access the delivery system 111 can also be used in the various embodiments. The UI and UI module 111 can be configured to provide content providers the ability to manipulate, select, and customize targeted segments.

Figure 29:
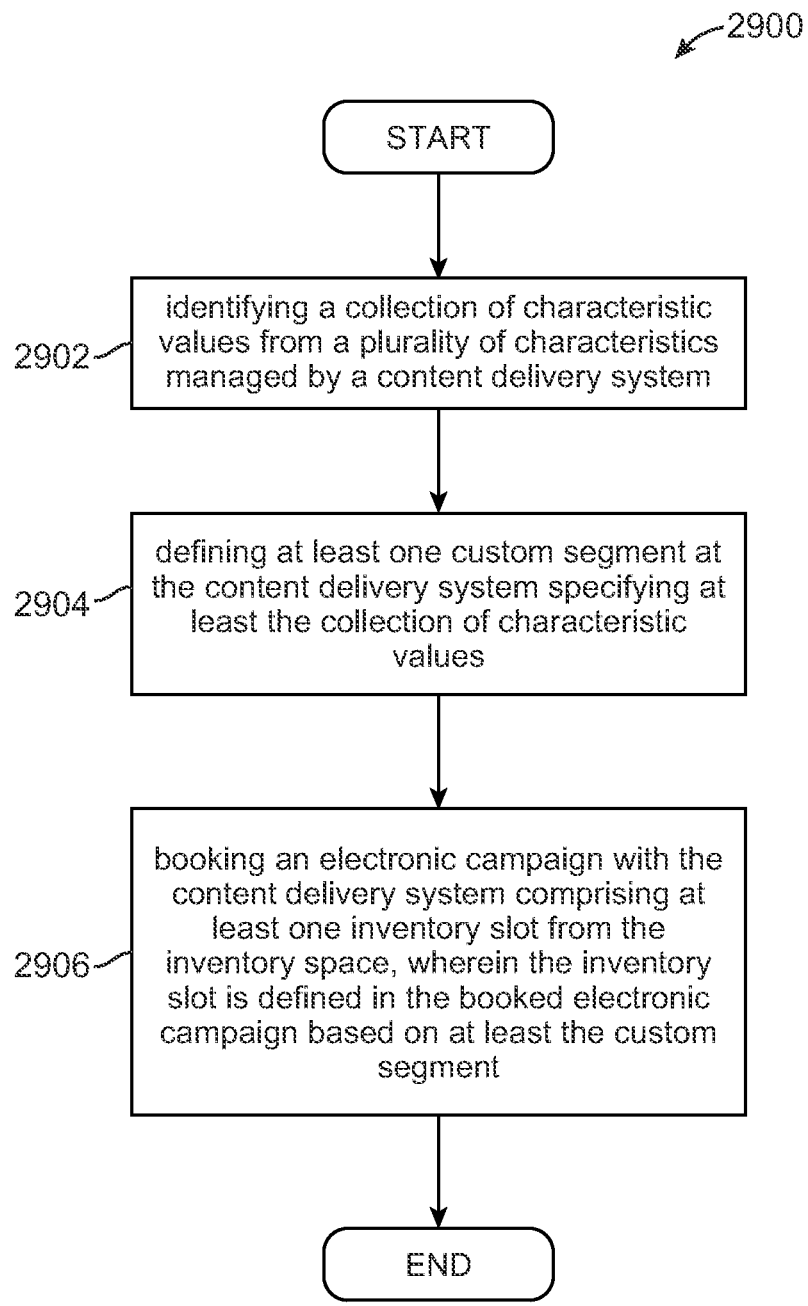
FIG. 29 illustrates an exemplary method embodiment for generating a custom targeted segment.

FIG. 29 is a flowchart illustrating steps in an exemplary method 2900 for generating custom targeted segments. For the sake of clarity, this method is discussed in terms of an exemplary system such as is shown in FIG. 1. Although specific steps are shown in FIG. 29, in other embodiments a method can have more or less steps than shown.

To generate a custom segment the delivery system 106 identifies a collection of characteristic values from a plurality of characteristics managed by the delivery system 106 (2902). The delivery system 106 can contain a set of predefined user characteristics such as any of the channel, demographic, behavioral, and/or spatial-temporal characteristics described above, including derived characteristics, and/or any other characteristics descriptive of a user or a user's interaction with one or more items of targeted content. For example, gender, age, and occupation are all demographic characteristics that can be predefined in the delivery system 106.

In some embodiments, the delivery system 106 analyzes a group of users to identify a collection of characteristics common to a specified percentage of the users. The group of users can be selected in any way, e.g. all users with a common characteristic value; users associated with a past electronic campaign that meet a specified performance criteria, e.g. all users that completed the associated conversion action, etc.

In some embodiments, the delivery system 106 identifies the collection of characteristic values based on input received from a content provider. In this case, the UI and UI module 111 can present the set of characteristics managed by the delivery system 106 to a content provider that is interested in using a custom targeted segment for content delivery. The content provider can then identify a collection of characteristics from that set. The collection of characteristics can be presented in a number of different ways such as through a graphical user interface (GUI) or a command-line interface.

In some embodiments, the UI can provide one or more selection objects (e.g. drop down boxes, check boxes, etc.) so as to enable selection of a user characteristic. In some cases, these selection objects can be linked. For example, if a country is selected in one drop down box, a state drop down box automatically filters the drop down values to only country-specific states, and so forth. In some configurations, once a user characteristic is selected, a user characteristic value selection object and/or input box appears. For example, an expandable check box can be used such that when the box is selected, the available associated values appear along with check boxes. The user characteristic value selection object can contain values specific to the associated user characteristic identifier. For example, for the gender characteristic, male and female check boxes can appear. The UI can also include a portion for content providers to input their own parameters (e.g. weights, Boolean operators, etc.).

The collection of characteristics can also be based upon the characteristics found in a pre-defined targeted segment. In this case, the UI can provide a selection object so as to enable selection of an existing targeted segment. Once selected, the UI can display the characteristics and any characteristic values used to define the existing targeted segment. Then the ability to add and/or remove characteristics and/or characteristic values can be provided.

The manner in which a content provider indicates a selection can vary with the configuration of the system. In a system configured where the collection of user characteristics is presented in a drop down box, the content provider can simply highlight a characteristic to select it. In a system configured where the collection of user characteristics is presented with an associated check box, selecting the associated check box can indicate a selection. Alternatively, entering a user characteristic in an input box can indicate a selection.

In some embodiments, one or more user characteristic values can be associated with a user characteristic. The delivery system 106 can contain a set of predefined values for each contextual characteristic identifier. The UI and UI module 111 can present the set of values in a number of different ways such as through a drop down box in a graphical user interface. In this case, the content provider could simply select the one or more user characteristic values desired. Alternatively, a text box can be presented and the content provider can enter a desired value. The user characteristic value can take a variety of different forms. For example, it can be a single value, e.g. female; multiple values, e.g. Jazz, Blues, Pop; or a range of values, e.g. 19-21.

In some embodiments, the delivery system 106 can provide feedback regarding the segment of users that fit within the custom segment as a content provider selects user characteristics and user characteristic values. This feedback can be in the form of a percentage of the users and/or total number of users included in the custom segment. In some configurations, the feedback can be a visual representation of the segment of the user population to which the custom targeted segment would apply. Other methods of providing feedback are also possible. This feedback can aid a content provider in creating a custom segment that precisely meets their needs.

Once the delivery system 106 identifies the collection of characteristic values, the delivery system 106 defines at least one custom segment at the content delivery system 106 specifying at least the collection of characteristic values (2904).

In some embodiments, the delivery system 106 can combine the one or more characteristics through the use of one or more Boolean operators, such as AND, OR, or NOT. The Boolean operator can be applied to the user characteristics and/or the user characteristic values. For example, a custom targeted segment could specify the gender characteristic AND the age characteristic. In this case, when the delivery system 106 uses the custom targeted segment for content delivery, the delivery system 106 will only deliver content associated with this segment to users that satisfy both the gender and age requirements. As a second example, a custom targeted segment can specify a location characteristic. Associated with that characteristic the custom segment can specify two user characteristic values: a particular home designated market area and NOT a particular home zip code. In this case, when the delivery system 106 uses the custom targeted segment for content delivery, the delivery system 106 will deliver content associated with the targeted segment to users with characteristic values that match the home designated market area specified in the custom segment unless their home zip code characteristic value matches the home zip code value specified in the custom segment.

In some embodiments, the delivery system 106 can assign a weight to one or more user characteristics and/or user characteristic values. For example, a characteristic and/or characteristic value can be assigned a weight in the range [0, 1], where 0 indicates no weight and 1 indicates full weight. Other relative scales can also be used. In some configurations, weights can be used to indicate that the delivery system 106 can present invitational content associated with the custom targeted segment even if the rule is not fully satisfied, so long as the characteristics and/or characteristic values with higher weight are satisfied.

In some embodiments, the delivery system 106 can assign an identifier to the custom targeted segment. In some configurations, the content provider who created the custom targeted segment can supply the identifier. For example, in a system configured with a GUI, the GUI can include an input box for the purpose of naming the segment. Alternatively, the UI and UI module 111 can include a save option that prompts the user for a segment name as part of the saving process. Other methods of receiving an identifier from the content provider are possible. In some configurations, the UI and UI module 111 can automatically create an identifier for the custom segment. For example, the identifier can be based on the name of the content provider.

In some embodiments, the delivery system 106 can assign a weight to the custom targeted segment. As described above, a variety of scales can be used to assign a weight. In some configurations, weights can be used to indicate that when more than one segment can be used to deliver invitational content, content associated with the segment with a higher weight should be selected first. The weight can be used for other purposes as well.

In some configurations, the segment identifier can be used to identify the segment at a later time. In some embodiments, the delivery system 106 saves the custom targeted segment to a storage location such as the segment database 114. By saving the custom targeted segment, the delivery system 106 can use the segment at a later point to identify targeted content to present to a user. In some configurations, the segment identifier can be used to locate the saved custom targeted segment. However, the delivery system 106 can use the custom targeted segment to select invitational content without saving the segment.

Finally, the delivery system 106 books an electronic campaign with the content delivery system comprising at least one inventory slot from the inventory space, wherein the inventory slot is defined in the booked electronic campaign based on at least the custom segment (2906). The booking step can include associating one or more items of invitational content with the custom segment and/or specifying a campaign goal.

In some embodiments, as part of the booking step, the delivery system 106 can associate one or more content providers with the custom targeted segment. In some configurations, the delivery system 106 can associate a single content provider with a custom targeted segment. In this case, only the single associated content provider can use the segment to deliver targeted content. In other configurations, the delivery system 106 can associate any number of content providers with the custom targeted segment, and thus, any of the associated content providers can use the custom targeted segment to deliver targeted content to a user.

In some configurations, as part of the booking step, the delivery system 106 can identify all of the target users that fit with the custom targeted segment. Based on this identification the delivery system 106 can assign the user to the custom segment and/or select targeted content to deliver to the users.

Figure 30:
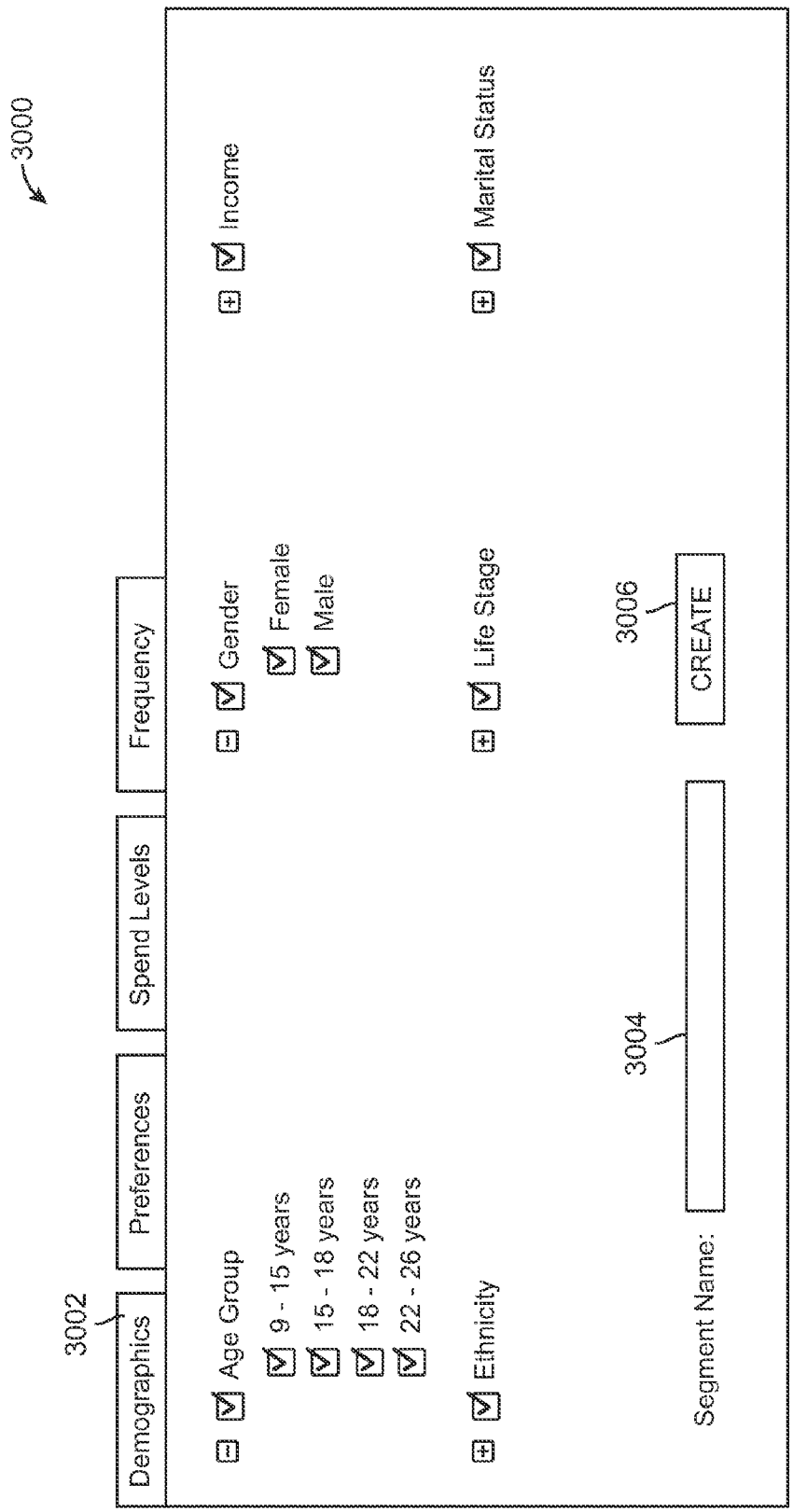
FIG. 30 illustrates an exemplary graphical user interface for creating a custom targeted segment.

FIG. 30 illustrates an exemplary graphical user interface (GUI) 3000 for generating a custom segment. The GUI 3000 includes 4 tabbed panels, i.e. demographics, preferences, spend levels, and frequency; each presenting a particular category of user characteristics. The panel selected in this example is the demographics panel 3002. In this case, the collection of available user characteristics includes: age group, gender, income, ethnicity, life stage, and marital status, which are each presented with an associated check box. To include a characteristic in the custom segment, a content provider simply selects the associated box. Additionally, each characteristic is presented with an expandable list of available user characteristic values. For example, the gender characteristic can be expanded to permit the selection of male and/or female values. This makes it possible for a content provider to create a custom segment that targets users with particular user characteristic values, e.g. only male users or only female users. The GUI 3000 also includes an input box 3004 that can be used to assign an identifier, i.e. a name, to the custom targeted segment. Finally, the GUI 3000 includes a create button 3006 to finalize the process of creating the custom targeted segment.

In some embodiments, the delivery system 106 is configured to assign users to a targeted segment of the user population. Accordingly, a segment assigner module 124 can be provided for performing the assignments. The delivery system 106 can also include a segment database 114 that stores previously defined targeted segments. The previously defined targeted segments can be based on channel, demographic, behavioral, and/or spatial-temporal characteristics. The definition of a targeted segment can include one or more user characteristics. For example, a targeted segment can be defined to target a segment of the population shaped by gender and age. Additionally, a user characteristic value for a characteristic can be a single value, multiple values, a range of values, multiple ranges of values, or any combination thereof. For example, for the age characteristic, acceptable values include 19; 19-24; 25-29; etc. In some embodiments, a user characteristic value can be a wildcard value, which indicates that any value is an acceptable match for the user characteristic.

Having defined segments to work with, the assigner module 124 can analyze one or more user characteristic values and one or more targeted segment definitions to determine if the user fits within a population segment defined by a targeted segment. The delivery system 106 can then use the segment assignments to select invitational content targeted at the assigned segment to send to the user.

Figure 31:
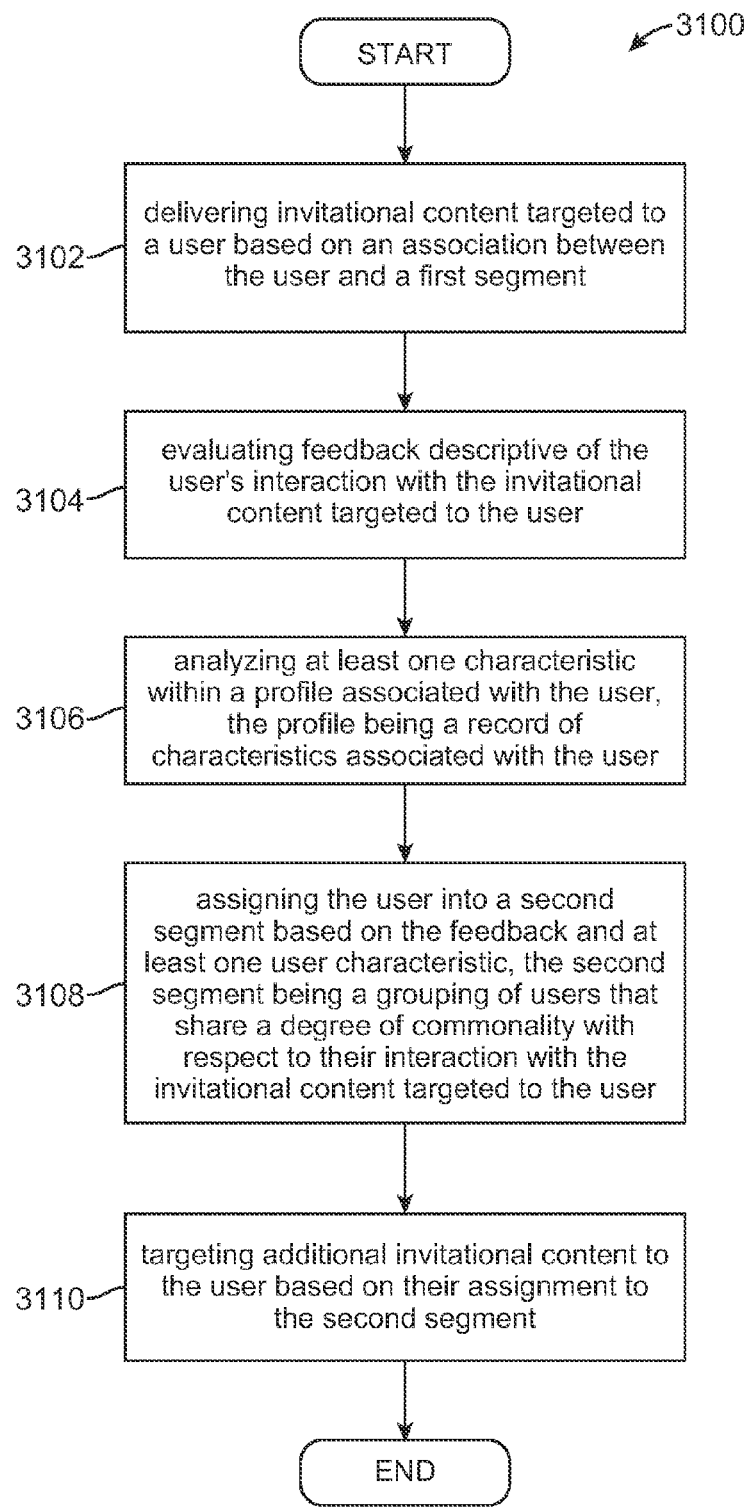
FIG. 31 illustrates an exemplary method embodiment for selecting invitational content to send to the user based on demographic segmentation.

FIG. 31 is a flowchart illustrating steps in an exemplary method 3100 for selecting invitational content to send to the user based on demographic segmentation. For the sake of clarity, this method is discussed in terms of an exemplary system such as is shown in FIG. 1. Although specific steps are shown in FIG. 31, in other embodiments a method can have more or less steps than shown. When a request for content is received, the delivery system 106 delivers invitational content targeted to a user based on an association between the user and a first segment (3102).

After delivering invitational content, the delivery system evaluates feedback descriptive of the user's interaction with the invitational content targeted to the user (3104). This feedback can include any information regarding the user's interaction with the content such as whether the user clicked on any links; how long the user interacted with the content; whether the user completed the associated conversion action; if the user did not complete a conversion, where on the conversion continuum the user abandoned the process, etc. Information regarding the user's interaction with the content can also include a user's depth of interaction with the targeted content i.e., how far into the targeted content the user navigated, which is a measure of the quality of the user's interaction. Such feedback can be used to infer user characteristics, interests and a user's present context.

Periodically, the delivery system 106 analyzes at least one characteristic within a profile associated with the user, the profile being a record of characteristics associated with the user (3106). In some embodiments, the delivery system 106 can include a user profile database 120. A user profile can include information descriptive of the user and/or the user's interaction with various items of content including purchased content. In this case, the delivery system 106 can fetch the user profile from the user profile database 120 and then select the characteristics from the user profile. In some embodiments, the delivery system 106 can determine the at least one characteristic in real-time based on the identified user's activities during the current session. Alternatively, the at least one characteristic can be included with the request for an item of invitational content.

In some cases, one or more user characteristic values used define a targeted segment of the population of users is uncertain. To address this issue, the delivery system 106 can infer/derive the value from trusted values. The delivery system 106 can use the derivation method 3100 described in FIG. 31 above or any other method to infer/derive the uncertain value. The delivery system 106 can also use other user characteristic values to infer unknown characteristic values.

As part of the derivation method, the delivery system 106 can assign a confidence score to the derived value, where the confidence score represents the likelihood that the particular characteristic is valid and/or correct. For example, a characteristic can be assigned a value in the range [0,1], where 0 indicates no confidence and 1 indicates full confidence. Other relative indicators of confidence can also be used such as a percentage. As described above, the calculation of the confidence score can depend on the user characteristic, how the characteristic is obtained, the number of characteristics considered, the number of users considered, etc.

After analyzing the at least one characteristic, the delivery system 106 assigns the user into a second segment based on the feedback and at least one user characteristic, the second segment being a grouping of users that share a degree of commonality with respect to their interaction with the invitational content targeted to the user (3108). The segment assigner module 124 can assign the user to a targeted segment based on the user characteristic values. In some cases, a characteristic value can have an associated confidence score and the system 106 can be configured to only use characteristic values that exceed a specified threshold when assigning a user to a targeted segment. In some configurations, the delivery system 106 can assign a confidence score to the targeted segment assignment. In this case, any confidence scores associated with any user characteristic values can be factored into the confidence score for the segment assignment. In some embodiments, the delivery system 106 can use the segment assignment confidence score in determining whether the segment should be used in selecting invitational content for the user. For example, if the confidence score is below a specified threshold, the delivery system 106 may not use the segment assignment for selecting invitational content. The delivery system 106 can update the user profile database 120 to reflect the segment assignments.

Finally, the delivery system 106 targets additional invitational content to the user based on their assignment to the second segment (3110). In some embodiments, a content provider can associate one or more items of invitational content with the targeted segment associated with the inferred value. The delivery system can then select from the items of invitational content associated with the targeted segment.

In some embodiments, the methods illustrated in FIG. 8-28 can be used to infer one or more demographic values. These inferred demographic values can serve as the bases for one or more targeted segments and can be used to target invitational content to the identified user.

In some embodiments, method 3100 is performed only when the delivery system 106 receives a request for invitational content. In other configurations, the delivery system 106 can monitor the user characteristics associated with one or more users. When one or more values changes, the system can re-infer and re-assign the one or more users to targeted segments. For example, for a period of time the user might purchase all of their music from the Jazz category. Based on this contextual characteristic, the user might be assigned to a segment that targets Jazz listeners. At some later period, the user might begin to purchase music from the Blues category. These purchases will alter the value for the recent purchase frequency characteristic. When this occurs, the system 106 can re-analyze the set of user characteristics against the one or more rules. Based on the new analysis, the system 106 can update the segments to which the user is assigned. In this example, the user may no longer be assigned to the segment that targets Jazz listeners. In some configurations, the delivery system 106 can periodically re-infer and re-assign the users to targeted segments.

Figure 32:
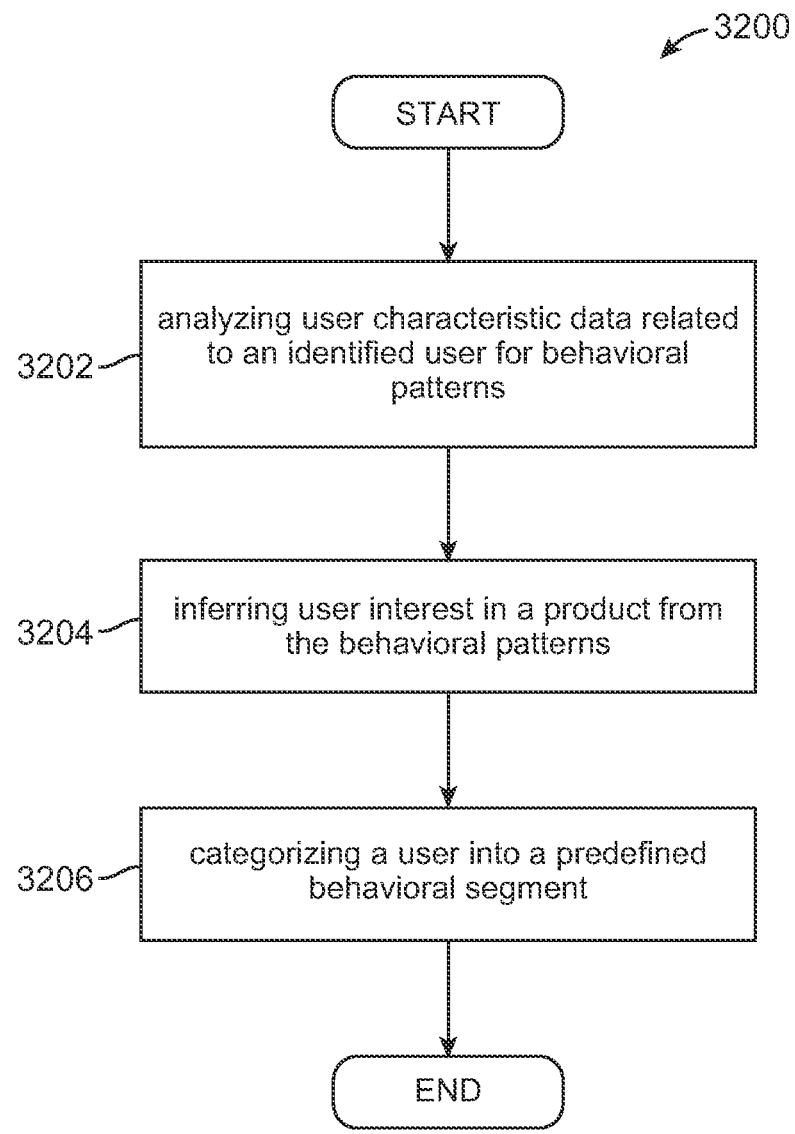
FIG. 32 illustrates an exemplary method embodiment for selecting invitational content to send to the user based on behavioral segmentation.

FIG. 32 is a flowchart illustrating steps in an exemplary method 3200 for assigning a user to a behavioral targeted segment and using the segment assignment to select invitational content to send to the user. For the sake of clarity, this method is discussed in terms of an exemplary system such as is shown in FIG. 1. Although specific steps are shown in FIG. 32, in other embodiments a method can have more or less steps than shown.

First, the delivery system 106 analyzes user characteristic data related to an identified user for behavioral patterns (3202). Behavioral patterns that can be identified based on the user characteristic data include for example patterns that can indicate a user's present or long-term intent or interest. Some examples include identifying the users propensity to convert or click on an item of invitational content; identifying when a user is about to, or is traveling; identifying when a user is researching a product or content, etc. From the analysis of the user characteristic data the system can infer interests in various products or user intent (3204) and categorize the user into a behavioral segment representative of that interest or intent (3206).

The analyzing step can be conducted using one or more rules, of which some examples are below, but in some embodiments, machine learning algorithms, and predictive algorithms can be used to predict user intents and interests.

In some embodiment classifying algorithms can be used for the behavioral segmentation. The following are several descriptive examples of such:

Cross-channel Mavens—users that access content on a cellular network, wireless network, and wired network in the same session more than 3 times per week.

Affluentials—users are both affluent and influential—that have a household income greater than $120,000 and that complete more than 3 conversions per week.

Money and Brains—users that have a household income greater than $150,000 and that interact with financial and technology content in more than 10 sessions per week.

Comfort Zone—users that interacted with content from their home location less than an hour ago and the user performed a search for local content in the past hour.

Out of Comfort Zone—users that interacted with content from a location that is not their home location less than an hour ago and searched for travel content in the past hour.

InTransit—users that interact with content from more than one location in a single session.

Home Based—users that interact with content from their home location.

Biz Traveler—users that interact with content from more than 5 locations in a single month and interact with content from a private Internet Protocol address.

Leisure Travel—users that interact with content from a resort location and search for local content from a location outside of their home location.

Heavy Sports User—users where more than 80% of the content they interact with via a cellular or wireless network is sports content and the user spends more than 4 minutes per day interacting with sports content.

Converter or Click Lookalikes—users that matches the behavior pattern of a user who has completed the associated conversion action for the content.

Gizmo Geek—users that have more than 5 page views on technology sites and 4 utility applications and clicked on mobile site and targeted laptop product category in last 5 days.

Auto Enthusiast—users that have more than 5 page views on auto sites in the past 14 days.

Globetrotters—users that consistently have an observed location greater than 1000 miles from their home location every 2 months.

Affluent Auto Intender—users that have a household income greater than $120,000, have interacted with auto sites in more than 10 sessions in the past 5 days, and optionally have viewed auto reviews and/or auto videos.

Social Butterflies—users that interact with a social networking application more than 5 times in a single day.

Entertainment Buffs targeted segment—users that have more than 5 page views on entertainment sites in a week, more than 3 video applications, and more than 70% of cellular network usage is video or more than 4 music purchases per week.

Deal Follower targeted segment—defined to target users that are in transit and whose location is equal distance from two competitive retail locations.

Tween Device Persona—users that use portable multimedia player devices that are not connected to a cellular network.

As evident from many of the targeted segments identified above, real-time or at least frequently refreshed user characteristic data is used to assign users to these segments. In such instances, the data can be discarded after the user has been classified into the segments. In some embodiments purging some data also serves the benefit of needing to store less sensitive information about a user. Such purging is not only useful with respect to behavioral data, but can also be used with respect to recording user characteristics (which can themselves be derived from some real time data) or any other segmentation. Once the data is used to identify the sought after characteristics it can be discarded because it is no longer needed.

As may be evident from the above discussion, a user can potentially be grouped into many segments and thus eligible to receive targeted content for each of those segments. However, some segments can be more important or valuable or have more content than others. In some embodiments, the delivery system 106 is configured to create a prioritized list of targeted segments assigned to a user. Accordingly, a segment prioritizing module 128 can be provided for performing the prioritization. The prioritizing module 128 can be configured to take a list of targeted segments and order the list based on a specified goal. In some cases, the specified goal can be a campaign goal provided by a content provider and/or an optimization.

Figure 33:
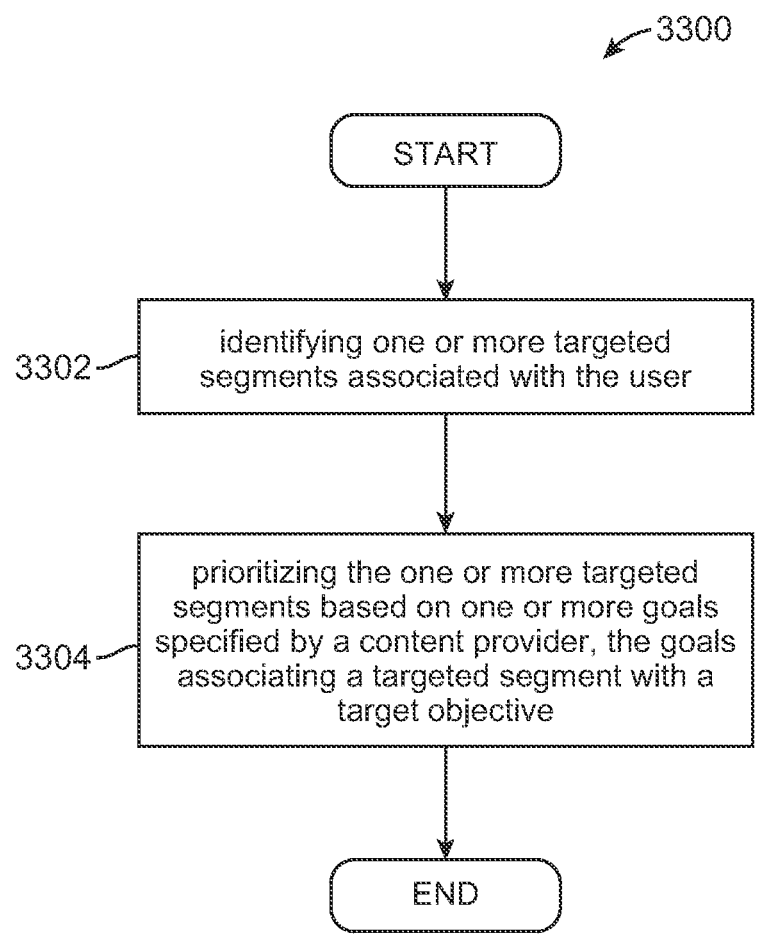
FIG. 33 illustrates an exemplary method embodiment for prioritizing targeted segments associated with a user.

FIG. 33 is a flowchart illustrating steps in an exemplary method 3300 for prioritizing segments assigned to a user. For the sake of clarity, this method is discussed in terms of an exemplary system such as is shown in FIG. 1. Although specific steps are shown in FIG. 33, in other embodiments a method can have more or less steps than shown. First, the content delivery system 106 identifies one or more targeted segments associated with the user (3302). In some cases, the delivery system 106 can assign the user to one or more targeted segments based on an analysis of the user characteristics and the targeted segments maintained by the delivery system 106. The delivery system 106 can use methods 3100 in FIGS. 31 and 3200 in FIG. 32 in the segment assignment or any other segment assignment methods. In some embodiments, the delivery system 106 may have already performed the segment assignments and the assignments are stored in the user profile in the user profile database 120.

Next, the delivery system 106 prioritizes the one or more targeted segments based on a specified goal, the goal associating a targeted segment with a target objective (3304). The goal can be specified by a content provider and/or the delivery system 106. In some embodiments, a campaign goal can specify one or more targeted segments and a target objective. The target objective can be expressed in several ways. For example, the target objective can specify a maximum budget not to be exceeded. In another example, the target objective can specify a budget that varies based on segment. That is, different cost objectives can be specified for different targeted segments. Additionally, other types of target objects can also be used. For example, these can include performance metrics, such as click-through rate (CTR), an effective cost per thousand impressions (eCPM), a target conversion rate, a target fill rate, user engagement, to name a few. Further, any combination of target objectives can be used in the present technology. For example, a target objective can specify both CTR and eCPM.

The prioritizing module 128 can analyze the list of targeted segments assigned to a user and determine the ideal ordering of those segments with respect to the associated target objective. In some embodiments, the prioritizing module 128 can perform the analysis based on characteristics of the user. The prioritizing module 128 can obtain these characteristics in a number of ways. In some cases, the characteristics can be stored in the user profile database 120, which the prioritizing module 128 can access. The characteristics can also be provided as part of the request to perform the prioritization.

In some configurations, the delivery system 106 considers the user's context in ranking the assigned segments. In this case, the delivery system 106 ranks higher those segments that are more relevant to the user's current context. For example, if the delivery system 106 detects that the user is traveling, then the delivery system 106 will rank travel related segments higher.

In some configurations, the delivery system 106 makes a prediction as to the level of interest of the user with respect to one or more items of invitational content. In this case, the delivery system 106 ranks higher those segments that are more likely to be of interest to the user. For example, if the delivery system 106 detects that the user is more likely to be interested in content offered by one rental car company rather than another, segments associated with that content will be ranked higher.

In some configurations, the delivery system 106 can rank the segments considering both context and level of interest. In this case, a segment might have a high ranking when considering the user's content, but end up with a lower ranking because the level of interest is low. For example, if the delivery system 106 detects that the user is traveling, the delivery system 106 can rank rental car content high, but content from a particular car rental company can be ranked lower in the list because the user is unlikely to be interested in the content. In some cases, one or more segments that are assigned to the user will not be ranked because the content is not applicable to the context, the user is unlikely to be interested, there is not content applicable to the current campaign goals, etc.

In the case where a campaign goal specifies more than one target objective, the prioritizing module 128 can integrate the one or more target objectives in the prioritization to create a balance between the objectives. For example, one objective could be to maximize CTR while a second could be to minimize cost. In some configurations, a weight can be assigned to the target objectives and the weights can be considered when integrating the one or more target objectives.

The segment prioritization can occur at various times. For example, the delivery system 106 can be configured to trigger the prioritizing module 128 at specified intervals. Alternatively, the prioritizing module 128 can order the segments when the delivery system 106 receives a request for invitational content. In some configurations, the prioritizing module 128 can monitor the user characteristics and/or target objective and perform the prioritization when a change in the user characteristics and/or target objective is detected.

In some configurations, a campaign goal can additionally specify a match criteria for the one or more segments specified in the goal. That is, for at least one of the targeted segments in the goal, the goal can include acceptable variations in the user characteristic identifiers and/or user characteristic values. For example, the goal can specify a targeted segment with a location user characteristic and the city of San Francisco as the user characteristic value. The associated match criteria can specify a user characteristic value of northern California for the location user characteristic identifier.

Such a match criteria can make it possible to match the goal with a greater number of targeted segments.

After prioritizing the segments, the delivery system 106 can use the ordered list to aid in selecting invitational content to deliver to the user. To illustrate, suppose a user is assigned to segments a, b, c, and d and the associated target objective for these segments is to maximize the CTR. After analyzing the characteristics of the user, the prioritizing module 128 determines the user is most likely to click through on content related to segment c followed by b, d, and a. When the delivery system 106 receives a request for invitational content for the user, the delivery system 106 will first attempt to deliver content associated with segment c. If no content exists for segment c, the delivery system 106 will go down the prioritized list and pick content associated with the next best segment.

Figure 34:
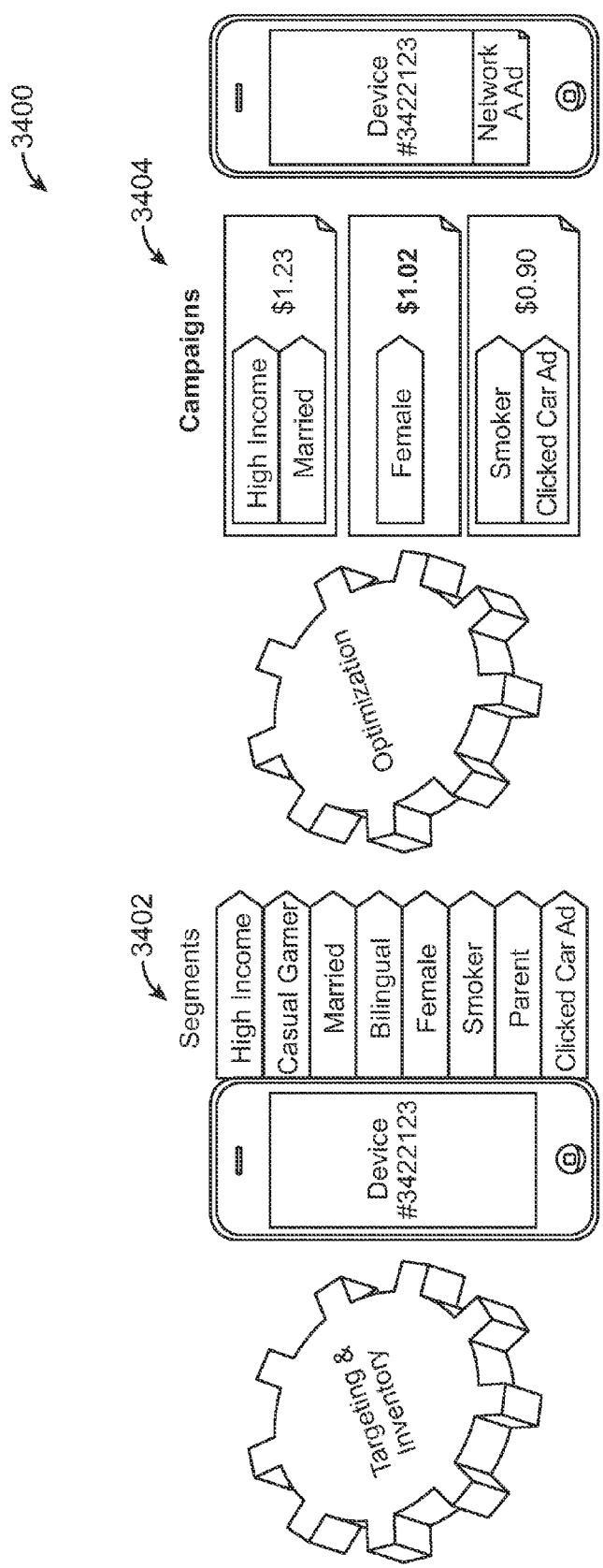
FIG. 34 illustrates an exemplary segment assignment prioritization process.

FIG. 34 illustrates an exemplary segment assignment prioritization process 3400. In this example, User 3422123 is assigned to 8 segments (3402). The prioritizing module takes these 8 segments along with their associated campaign goals and ranks the segments in a manner that optimizes the campaign goals (3404). It should be noted that in this example, that the user was assigned to 8 segments, but after prioritizing the segments only a subset of the segments are currently used for targeting content. As mentioned above, the user's context and the currently available content/campaign goals are used in determining the prioritization. In this case, a couple of the segments were not applicable to the user's context and/or the campaign goals.

Also factoring into the segment prioritization scheme is a predictive performance module, which predicts the effect of prioritizing one segment over another and how it can affect other system priorities. For example if the segments are being ordered to ensure that each item of invitational content is interacted with a specified number of times, the predictive performance module can run a variety of virtual "what if scenario" models to predict if a particular prioritization of segments will achieve the systems goals. In one example of how this can work, if the goal is to get five clicks on targeted content directed to rental cars from two competitor companies, the predictive performance module will rule out any ordering of segments that will always provide targeted content from one company before the other because it will reduce the likelihood that the second item of invitational content presented to the user will be clicked on. Accordingly, the predictive performance module would select a different ordering of segments and ultimately choose the best ordering to optimize the system to meet its goals.

Figure 35:
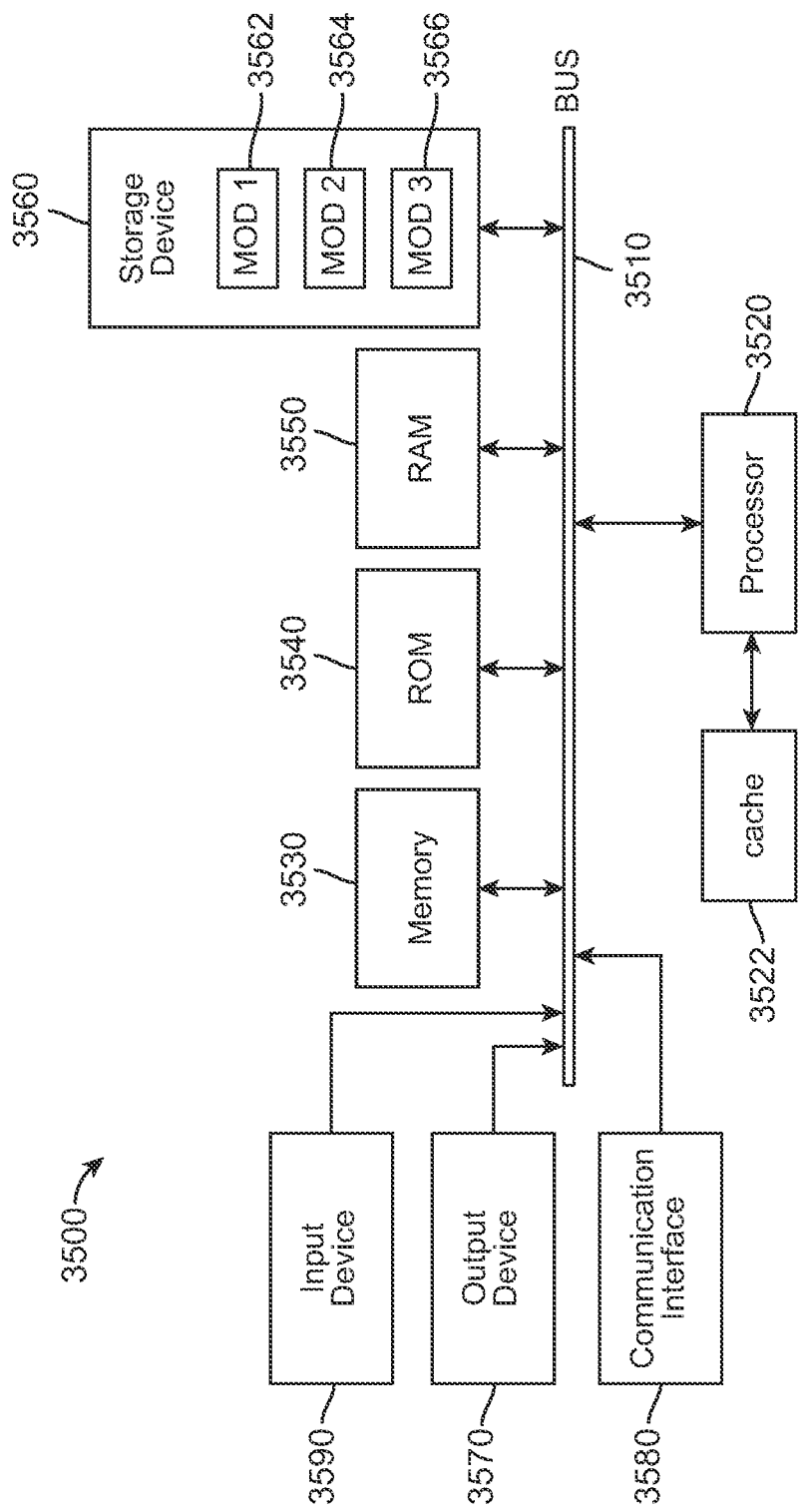
FIG. 35 illustrates an example system embodiment.

With reference to FIG. 35, an exemplary system 3500 includes a general-purpose computing device 3500, including a processing unit (CPU or processor) 3520 and a system bus 3510 that couples various system components including the system memory 3530 such as read only memory (ROM) 3540 and random access memory (RAM) 3550 to the processor 3520. The system 3500 can include a cache 3522 of high speed memory connected directly with, in close proximity to, or integrated as part of the processor 3520. The system 3500 copies data from the memory 3530 and/or the storage device 3560 to the cache 3522 for quick access by the processor 3520. In this way, the cache 3522 provides a performance boost that avoids processor 3520 delays while waiting for data. These and other modules can be configured to control the processor 3520 to perform various actions. Other system memory 3530 may be available for use as well. The memory 3530 can include multiple different types of memory with different performance characteristics. It can be appreciated that the disclosure may operate on a computing device 3500 with more than one processor 3520 or on a group or cluster of computing devices networked together to provide greater processing capability. The processor 3520 can include any general purpose processor and a hardware module or software module, such as module 1 3562, module 2 3564, and module 3 3566 stored in storage device 3560, configured to control the processor 3520 as well as a special-purpose processor where software instructions are incorporated into the actual processor design. The processor 3520 may essentially be a completely self-contained computing system, containing multiple cores or processors, a bus, memory controller, cache, etc. A multi-core processor may be symmetric or asymmetric.

The system bus 3510 may be any of several types of bus structures including a memory bus or memory controller, a peripheral bus, and a local bus using any of a variety of bus architectures. A basic input/output (BIOS) stored in ROM 3540 or the like, may provide the basic routine that helps to transfer information between elements within the computing device 3500, such as during start-up. The computing device 3500 further includes storage devices 3560 such as a hard disk drive, a magnetic disk drive, an optical disk drive, tape drive or the like. The storage device 3560 can include software modules 3562, 3564, 3566 for controlling the processor 3520. Other hardware or software modules are contemplated. The storage device 3560 is connected to the system bus 3510 by a drive interface. The drives and the associated computer readable storage media provide nonvolatile storage of computer readable instructions, data structures, program modules and other data for the computing device 3500. In one aspect, a hardware module that performs a particular function includes the software component stored in a non-transitory computer-readable medium in connection with the necessary hardware components, such as the processor 3520, bus 3510, display 3570, and so forth, to carry out the function. The basic components are known to those of skill in the art and appropriate variations are contemplated depending on the type of device, such as whether the device 3500 is a small, handheld computing device, a desktop computer, or a computer server.

Although the exemplary embodiment described herein employs the hard disk 3560, it should be appreciated by those skilled in the art that other types of computer readable media which can store data that are accessible by a computer, such as magnetic cassettes, flash memory cards, digital versatile disks, cartridges, random access memories (RAMs) 3550, read only memory (ROM) 3540, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 3500, an input device 3590 represents any number of input mechanisms, such as a microphone for speech, a touch-sensitive screen for gesture or graphical input, keyboard, mouse, motion input, speech and so forth. An output device 3570 can also be one or more of a number of output mechanisms known to those of skill in the art. In some instances, multimodal systems enable a user to provide multiple types of input to communicate with the computing device 3500. The communications interface 3580 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 3520. The functions these blocks represent may be provided through the use of either shared or dedicated hardware, including, but not limited to, hardware capable of executing software and hardware, such as a processor 3520, that is purpose-built to operate as an equivalent to software executing on a general purpose processor. For example the functions of one or more processors presented in FIG. 35 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 3540 for storing software performing the operations discussed below, and random access memory (RAM) 3550 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 3500 shown in FIG. 35 can practice all or part of the recited methods, can be a part of the recited systems, and/or can operate according to instructions in the recited non-transitory computer-readable storage media. Such logical operations can be implemented as modules configured to control the processor 3520 to perform particular functions according to the programming of the module. For example, FIG. 35 illustrates three modules Mod1 3562, Mod2 3564 and Mod3 3566 which are modules controlling the processor 3520 to perform particular steps or a series of steps. These modules may be stored on the storage device 3560 and loaded into RAM 3550 or memory 3530 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

The invention claimed is:

1. A computer-implemented method of assigning a user to one or more segments of a population comprising:
    delivering invitational content to a client device associated with the user, the invitational content selected based on an association between the user and a first segment, wherein the invitational content is designed to elicit user interaction corresponding to at least one associated conversion action;
    evaluating feedback descriptive of the user's interaction with the invitational content on the client device, the feedback capturing a position along a conversion continuum tied to the at least one associated conversion action;
    analyzing, via a processor, at least one characteristic within a profile associated with the user, the profile being a record of characteristics associated with the user;
    assigning the user into a second segment based on the feedback and at least one user characteristic, the second segment being a grouping of users that share a degree of commonality with respect to their interaction with the invitational content targeted to the user, the degree of commonality corresponding to the position along the conversion continuum tied to the at least one associated conversion action; and
    targeting additional invitational content to the user based on assignment to the second segment.

2. The computer-implemented method of claim 1, wherein the second segment is a grouping of users that share a degree of commonality amongst the same multiple behavioral characteristics.

3. The computer-implemented method of claim 2, wherein the user is assigned to the second segment when the analysis of the at least one characteristic reveals that the user connects to a content delivery system greater than a determined number of times a week using two or more network-connection types, the network-connection types comprising a cellular network connection, a wireless network connection, and a wired network connection.

4. The computer-implemented method of claim 2, wherein the second segment includes users with an inferred intent to convert an item and an ability to purchase the item, the user being assigned to the second segment when the analysis of the at least one characteristic reveals that the user is presented with a determined number of opportunities to convert an item and the user falls into an income category sufficient to convert the item, wherein an opportunity corresponds to an invitational content item.

5. The computer-implemented method of claim 2, wherein the second segment includes educated users within a specified income range, the user being assigned to the second segment when the analysis of the at least one characteristic and the evaluation of the feedback reveals that the user commonly visits financial and/or technological content and the user falls into a specified income range.

6. The computer-implemented method of claim 1, wherein the second segment is a grouping of users that share a degree of commonality amongst the same characteristics including a combination of at least a behavioral characteristic and a spatial-temporal characteristic.

7. The computer-implemented method of claim 6, wherein the second segment includes users within a predefined distance from their home with an interest in local businesses, the user being assigned to the second segment when the analysis of the at least one characteristic and the evaluation of the feedback reveals that the user is within the predefined distance from his home and has searched for a local business within a predefined period of time.

8. The computer-implemented method of claim 6, wherein the second segment includes users that are away from the user's home with an interest in a location away from the user's home, the user being assigned to the second segment when the analysis of the at least one characteristic and the evaluation of the feedback reveals that the user is greater than a predefined distance from the user's home and the user has searched for a location greater than a predefined distance from the user's home.

9. The computer-implemented method of claim 6, wherein the second segment includes users that are traveling, the user being assigned to the second segment when the analysis of the at least one characteristic and the evaluation of the feedback reveals that the user's device has made a request for content from several different locations in a session of interaction with a network.

10. The computer-implemented method of claim 6, wherein the user is assigned to the second segment when the analysis of the at least one characteristic and the evaluation of the feedback reveals that the user has interacted with a network from more than five different zip codes from a private Internet Protocol Address within the last month.

11. The computer-implemented method of claim 6, wherein the user is assigned to the second segment when the analysis of the at least one characteristic and the evaluation of the feedback reveals that the user has searched for locations outside the user's home zip code and the user's searches originated from an Internet Protocol address or zip code associated with a resort.

12. The computer-implemented method of claim 1, wherein the second segment relates to a type of product or content in which the user has an inferred interest.

13. The computer-implemented method of claim 12, wherein the user is assigned to the second segment when the analysis of the at least one characteristic and the evaluation of the feedback reveals that a majority of the content that the user views is related to sports and the user spends at least a predefined average amount of time with sport content per day.

14. The computer-implemented method of claim 12, wherein the user is assigned to the second segment when the analysis of the at least one characteristic and the evaluation of the feedback reveals that the user has viewed at least a determined number of automobile content items within a determined period.

15. The computer-implemented method of claim 12, wherein the user is assigned to the second segment when the analysis of the at least one characteristic and the evaluation of the feedback reveals that the user has viewed at least a determined number of social networking content items within a determined period.

16. The computer-implemented method of claim 1, further comprising:
selecting the at least one characteristic for the analysis when a confidence score that is associated with the at least one characteristic is greater than a specified threshold value.

17. A non-transitory computer-readable medium having computer-readable code stored thereon for causing a computer to perform a method of assigning a user to one or more segments of a population, the method comprising:
delivering invitational content to a client device associated with the user, the invitational content selected based on an association between the user and first segment, wherein the invitational content is designed to elicit user interaction corresponding to at least one associated conversion action;
evaluating feedback descriptive of the user's interaction with the invitational content on the client device, the feedback capturing a position along a conversion continuum tied to the at least one associated conversion action;
analyzing at least one characteristic associated with the user;
assigning the user into a second segment based on the feedback and at least one user characteristic, the second segment being a grouping of users that share a degree of commonality with respect to the at least one characteristic and their interaction with the invitational content targeted to the user, the degree of commonality corresponding to the position along the conversion continuum tied to the at least one associated conversion action; and
targeting additional invitational content to the user based on assignment to the second segment.

18. The non-transitory computer-readable medium of claim 17, wherein the second segment is a grouping of users that share a degree of commonality amongst the same multiple behavioral characteristics.

19. The non-transitory computer-readable medium of claim 17, wherein the second segment is a grouping of users that share a degree of commonality amongst the same characteristics including at least one demographic characteristic.

20. The non-transitory computer-readable medium of claim 19, wherein the user is assigned to the second segment when the analysis of the at least one characteristic reveals that the user is within a specified age range.

21. The non-transitory computer-readable medium of claim 19, wherein the user is assigned to the second segment when the analysis of the at least one characteristic reveals that the user is within a specified age range and a specific gender.

22. The non-transitory computer-readable medium of claim 19, wherein the user is assigned to the second segment when the analysis of the at least one characteristic reveals that the user is a resident of specified geographic region.

23. The non-transitory computer-readable medium of claim 17, wherein the second segment is a grouping of users that share a degree of commonality amongst the same characteristics including a combination of at least a behavioral characteristic and a spatial-temporal characteristic.

24. The non-transitory computer-readable medium of claim 17, wherein the second segment is a grouping of users that share a degree of commonality amongst the same characteristics including a combination of at least a behavioral characteristic and a demographic characteristic.

25. The non-transitory computer-readable medium of claim 24, wherein the second segment is a grouping of users exhibiting a behavior indicating an interest in a product and a demographic indicating an ability to purchase the product.

26. The non-transitory computer-readable medium of claim 17, wherein the second segment is a grouping of users that share a degree of commonality amongst the same characteristics including a combination of at least a demographic characteristic and a spatial-temporal characteristic.

27. The non-transitory computer-readable medium of claim 17, wherein the second segment relates to a type of product or content in which the user has an inferred interest.

28. The non-transitory computer-readable medium of claim 17, further comprising:
  selecting a user characteristic value for the analysis when a confidence score that is associated with the user characteristic value is greater than a specified threshold value.

29. A system for assigning a user to one or more segments of a population comprising:
  a processor;
  a first module configured to control the processor to deliver invitational content to a client device associated with the user, the invitational content selected based on an association between the user and first segment, wherein the invitational content is designed to elicit user interaction corresponding to at least one associated conversion action;
  a second module configured to control the processor to evaluate feedback descriptive of the user's interaction with the invitational content on the client device, the feedback capturing a position along a conversion continuum tied to the at least one associated conversion action;
  a third module configured to control the processor to analyze at least one characteristic within a profile associated with the user, the profile being a record of characteristics associated with the user;
  a fourth module configured to control the processor to assign the user into a second segment based on the feedback and at least one user characteristic, the second segment being a grouping of users that share a degree of commonality with respect to their interaction with the invitational content targeted to the user, the degree of commonality corresponding to the position along the conversion continuum tied to the at least one associated conversion action; and
  a fifth module configured to control the process to target additional invitational content to the user based on assignment to the second segment.

30. The system of claim 29, wherein the second segment is a grouping of users that share a degree of commonality amongst the same characteristics including at least one demographic characteristic.

31. The system of claim 30, wherein the user is assigned to the second segment when the analysis of the at least one characteristic reveals that the user is within a specified age range.

32. The system of claim 30, wherein the user is assigned to the second segment when the analysis of the at least one characteristic reveals that the user is within a specified age range and a specific gender.

33. The system of claim 30, wherein the user is assigned to the second segment when the analysis of the at least one characteristic reveals that the user is a resident of a specified geographic region.

34. The system of claim 29, wherein the second segment is a grouping of users that share a degree of commonality amongst the same multiple behavioral characteristics.

35. The system of claim 29, wherein the second segment is a grouping of users that share a degree of commonality amongst the same characteristics including a combination of at least a behavioral characteristic and a spatial-temporal characteristic.

36. The system of claim 29, wherein the second segment relates to a type of product or content in which the user is likely interested.

37. The system of claim 29, further comprising:
  a sixth module configured to control the processor to select a user characteristic value for the analysis when a confidence score that is associated with the user characteristic value is greater than a specified threshold value.

* * * * *